(12) United States Patent
Kim et al.

(10) Patent No.: US 11,356,945 B2
(45) Date of Patent: Jun. 7, 2022

(54) METHOD AND APPARATUS FOR APPLYING DISCONTINUOUS RECEPTION MODE IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Himke Van Der Velde, Zwolle (NL); Jaehyuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 46 days.

(21) Appl. No.: 16/791,468

(22) Filed: Feb. 14, 2020

(65) Prior Publication Data

US 2020/0187116 A1    Jun. 11, 2020

Related U.S. Application Data

(63) Continuation of application No. 15/751,079, filed as application No. PCT/KR2016/008705 on Aug. 8, 2016, now Pat. No. 10,568,028.

(Continued)

(51) Int. Cl.
*H04B 7/00* (2006.01)
*H04W 52/02* (2009.01)
(Continued)

(52) U.S. Cl.
CPC ....... *H04W 52/0216* (2013.01); *H04W 48/12* (2013.01); *H04W 68/02* (2013.01);
(Continued)

(58) Field of Classification Search
CPC ....... H04W 4/20; H04W 28/16; H04W 52/02; H04W 52/0209; H04W 52/0219;
(Continued)

(56) References Cited

U.S. PATENT DOCUMENTS 8,169,957 B2    5/2012    Damnjanovic
8,750,154 B2    6/2014    Kim
(Continued)

FOREIGN PATENT DOCUMENTS

WO    WO 2012/093884    7/2012
WO    WO 2013/169000    11/2013
WO    WO 2015/016530    2/2015

OTHER PUBLICATIONS

PCT/ISA/210 Search Report dated Oct. 31, 2016 issued on PCT/KR2016/008705 (pp. 4).
(Continued)

*Primary Examiner* — Dmitry Levitan
(74) *Attorney, Agent, or Firm* — The Farrell Law Firm, P.C.

(57) ABSTRACT

The disclosure relates to a 5G or pre-5G communication system. A method performed by a terminal, includes receiving, from a BS, first system information including first information for an extended DRX mode; receiving, from a BS, second system information including second information associated with a DRX cycle; determining whether to request activation of the extended DRX mode based on the first information; when it is determined to request the activation of the extended DRX mode, transmitting, to an MME, a request message including third information for an operation in the extended DRX mode; receiving, from the MME, a response message based on the request message; when the response message includes fourth information for the operation in the extended DRX mode, performing the operation in the extended DRX mode based on the second information and the fourth information; and when the response message does not include the fourth information, performing an operation in a regular DRX mode based on the second information.

12 Claims, 33 Drawing Sheets

Related U.S. Application Data

(60) Provisional application No. 62/202,416, filed on Aug. 7, 2015.

(51) Int. Cl.
*H04W 68/02* (2009.01)
*H04W 48/12* (2009.01)
*H04W 76/28* (2018.01)
*H04W 72/04* (2009.01)

(52) U.S. Cl.
CPC ..... *H04W 72/042* (2013.01); *H04W 72/0433* (2013.01); *H04W 76/28* (2018.02); *Y02D 30/70* (2020.08)

(58) Field of Classification Search
CPC ......... H04W 52/0222; H04W 72/0433; H04W 72/0473; H04W 76/028
USPC ................... 370/310, 311, 328, 458, 465
See application file for complete search history.

(56) References Cited

U.S. PATENT DOCUMENTS

| | | | |
|---|---|---|---|
| 9,179,407 B2* | 11/2015 | Donthi | ............ H04W 76/28 |
| 9,326,207 B2 | 4/2016 | Jha | |
| 9,712,982 B2 | 7/2017 | Urabayashi | |
| 9,749,951 B2 | 8/2017 | Terry | |
| 10,091,723 B2 | 10/2018 | Wang | |
| 10,091,763 B2* | 10/2018 | Bergman | ............ H04W 72/048 |
| 10,206,091 B2 | 2/2019 | Ryu | |
| 10,568,028 B2* | 2/2020 | Kim | ............ H04W 72/042 |
| 10,779,354 B2* | 9/2020 | Nagasaka | ......... H04W 52/0225 |
| 2008/0232310 A1 | 9/2008 | Xu | |
| 2013/0287009 A1 | 10/2013 | Ahn et al. | |
| 2015/0195782 A1 | 7/2015 | Terry et al. | |
| 2016/0192323 A1 | 6/2016 | Kim | |
| 2017/0208521 A1* | 7/2017 | Wu | ............ H04W 36/14 |
| 2018/0234917 A1* | 8/2018 | Kim | ............ H04W 52/0216 |
| 2018/0338281 A1 | 11/2018 | Bangolae | |
| 2020/0187116 A1* | 6/2020 | Kim | ............ H04W 52/0216 |

OTHER PUBLICATIONS

PCT/ISA/237 Written Opinion dated Oct. 31, 2016 issued on PCT/KR2016/008705 (pp. 6).

3GPP TS 24.301 V13.2.0 (Jun. 2015), 3rd Generation Partnership Project; Technical Specification Group Core Network and Terminals; Non-Access-Stratum (NAS) protocol for Evolved Packet System (EPS); Stage 3 (Release 13); pp. 14.

* cited by examiner

METHOD AND APPARATUS FOR APPLYING DISCONTINUOUS RECEPTION MODE IN WIRELESS COMMUNICATION SYSTEM

CROSS-REFERENCE TO RELATED APPLICATION(S)

This application is a continuation of U.S. patent application Ser. No. 15/751,079, which was filed in the U.S. Patent and Trademark Office (USPTO) on Feb. 7, 2018, which is a National Phase Entry of PCT International Application No. PCT/KR2016/008705, which was filed on Aug. 8, 2016, and claims priority to U.S. Provisional Patent Application No. 62/202,416, which was filed in the USPTO on Aug. 7, 2015, the entire content of each of which is incorporated herein by reference.

BACKGROUND

1. Field

The present invention relates to a mobile communication system and, more particularly, to a method and apparatus for applying a discontinuous reception mode in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology. Accordingly, various attempts are now made to apply the 5G communication system to the IoT network. For example, technologies such as a sensor network, machine-to-machine (M2M), and machine type communication (MTC) are implemented by techniques such as beamforming, MIMO, and array antennas which belong to the 5G communication technology. To apply a cloud radio access network (cloud RAN) for the above-mentioned big data processing technology is an example of the fusion of the 5G technology and the IoT technology.

In general, wireless communication systems have been developed for the purpose of providing communication while maintaining user's mobility. Recently, the wireless communication technology has achieved a significant growth, and also the communication system technology is steadily evolving. With the rapid progress of such technologies, the wireless communication system has reached the stage of providing a high-speed data communication service as well as voice communication. In recent years, the next generation mobile communication system is evolving from human-to-human (H2H) communication into human-to-machine (H2M) communication and machine-to-machine (M2M) communication.

On the other hand, as a terminal becomes more sophisticated, there is a need of a method for reducing the power consumption of the terminal in order to improve battery performance. To reduce power consumption, the terminal may operate in a discontinuous reception (DRX) mode. The terminal may perform a reception operation to receive a paging signal from a base station. However, since the paging signal is not transmitted frequently, the power loss becomes large if the terminal performs the reception operation even during no arrival of the paging signal. Therefore, in order to reduce power consumption, the reception operation for receiving the paging signal may be periodically performed only during a specific time period. This is referred to as DRX.

Further, a method for increasing a DRX cycle to improve power consumption is being discussed. This is referred to as extended DRX (eDRX). However, some terminal, some base station, and some mobility management entity (MME) may not support the eDRX. Therefore, a method for operating in the eDRX mode by identifying whether such entities support the eDRX is needed.

In addition, the base station may notify a change of system information to the terminal through a paging message. However, when the extended DRX is applied, there may be a case incapable of receiving the paging message, and the terminal may fail to know whether the system information is changed. Therefore, the terminal needs a method for identifying whether the system information is changed.

SUMMARY

In order to solve the above problems, the present invention provides a method for a terminal to apply the eDRX after identifying whether a base station and an MME support the eDRX.

In addition, when the eDRX is applied, the present invention provides a method for a terminal to identify whether system information is changed, and to receive the changed system information.

According to an aspect of the disclosure, a method of a terminal is provided, which includes receiving, from a base station, first system information including first information for an extended DRX mode; receiving, from a base station, second system information including second information associated with a DRX cycle; determining whether to request activation of the extended DRX mode based on the first information; in case that it is determined to request the activation of the extended DRX mode, transmitting, to an MME, a request message including third information for an operation in the extended DRX mode;

receiving, from the MME, a response message based on the request message; in case that the response message includes fourth information for the operation in the extended DRX mode, performing the operation in the extended DRX mode based on the second information and the fourth information; and in case that the response message does not include the fourth information for the operation in the extended DRX mode, performing an operation in a regular DRX mode based on the second information.

According to the present invention, the terminal can reduce power consumption thereof by identifying whether the base station and the MME support the eDRX and then by applying the eDRX.

In addition, according to the present invention, even when the eDRX is applied, the terminal can efficiently perform the eDRX operation by identifying whether the system information is changed, and by receiving the changed system information.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
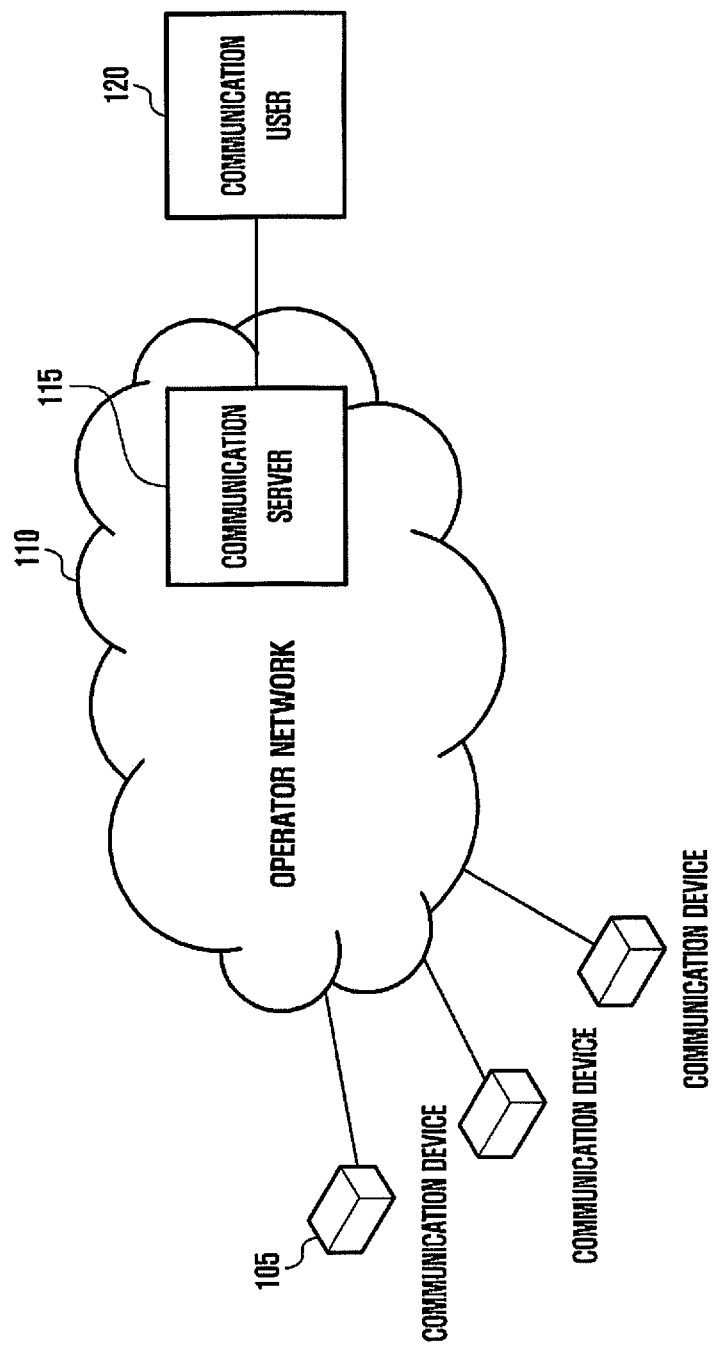
FIG. 1 is a diagram illustrating a communication scenario according to the present invention.

Hereinafter, embodiments of the present invention will be described with reference to the accompanying drawings.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

FIG. 1 is a diagram illustrating a communication scenario according to the present invention.

Referring to FIG. 1, communication devices 105 may be connected to a wireless operator network 110.

For example, machine-type communication devices may be defined in general as various unmanned devices such as meters or automatic vending machines, and have various features. Also, the machine-type communication devices may have different features depending on their types.

In one cell, there may be very many communication devices having various features. A communication server 115 that has information about the communication devices may not only perform authentication, but also collect information from the communication devices and transmit the collected information to a communication user 120. The communication server may exist within or outside the wireless operator network. The communication user 120 may refer to an end-user who needs information delivered from the communication device. In this disclosure, for convenience of explanation, a machine-type communication device that performs machine-to-machine communication will be described as an example of the communication device. However, the scope of the present invention is not limited thereto. The communication device may include a communication device that performs human-to-human communication, a communication device that performs human-to-machine communication, and the like. That is, the present invention may be applied to all communication devices that require the reduction of power consumption.

As mentioned above, machine-type communication has various different features. Also, such features may be classified into various types according to the purposes of using the machine-type communication. For example, communication devices that require communication only a given number of times a day, regardless of time, have a time tolerant feature. In addition, machine-type communication devices installed in a certain place and collecting specific information without mobility have a low mobility feature. The wireless operator should provide services in consideration of such various features of machine-type communication and coexistence with existing terminals.

Among machine-type communication devices, devices related to tracking animals, freight vehicles, etc. are generally supplied with power by using a battery or autonomously generating electric power. Therefore, such machine-type communication devices should use limited power, so that it is desirable to efficiently use limited power. Such a machine-type communication device has an extra low power consumption mode and may be set to use low power in this mode.

As described above, one of ways to improve power consumption is to increase a DRX cycle. In this disclosure, the DRX that operates in a typical cycle (hereinafter referred to as a first cycle or a first DRX cycle) may be referred to as first DRX, and the DRX that operates in an increased cycle (hereinafter referred to as a second cycle or a second DRX cycle) may be referred to as eDRX or second DRX. Accordingly, in this disclosure, the first DRX may be defined as the DRX that operates in the first cycle, and the second DRX may be defined as the DRX that operates in the second cycle. The second cycle may be longer than the first cycle.

In the LTE system, the first DRX operation of UEs placed in the idle state may be performed through Equation 1 below. A system frame number (SFN) may be increased by one every radio frame. When a paging signal is transmitted in a radio frame that satisfies Equation 1, the UE may perform a reception operation by the first DRX. Hereinafter, a radio frame in which a paging signal is transmitted may be referred to as a paging frame (PF). In addition, a subframe for transmitting a paging signal within a paging frame may be referred to as a paging occasion (PO).

$$\text{SFN mod } T = (T \text{ div } N)*(UE\_ID \text{ mod } N) \qquad \text{<Equation 1>}$$

Where,

SFN: system frame number. This may be composed of 10 bits. (MSB 8 bits explicit, LBS 2 bits implicit)

T: first DRX cycle information of the UE. This may be transmitted on a system information block 2 (SIB2). ENUMERATED {rf32, rf64, rf128, rf256}

N: min(T, nB)

Paging-related first parameter nB: This may be transmitted on SIB2. ENUMERATED {4T, 2T, T, T/2, T/4, T/8, T/16, T/32}

UE_ID: IMSI mod 1024 (IMSI may mean a unique number assigned to each UE)

Specifically, the SFN may be transmitted to the UE through a master information block (MIB). In the MIB transmitted on the physical broadcast channel (PBCH), 8 bits may indicate the SFN.

The first DRX cycle information (T) and the paging-related first parameter (nB) may be provided through the SIB. For example, the first DRX cycle information (T) and the paging-related first parameter (nB) may be included in the SIB2 (SystemInformationBlockType2) and provided from eNB. The first DRX cycle information (T) may have one value from among {rf32, rf64, rf128, rf256}, where r32 may represent the length of 32 radio frames. That is, r32 may mean 320 ms. In addition, the paging-related first parameter (nB) may indicate the number of times of paging or the frequency of paging. In this disclosure, the first DRX cycle information (T) and the paging-related first parameter (nB), provided through the SIB, may be referred to as first DRX configuration information or first DRX parameters.

Figure 2:
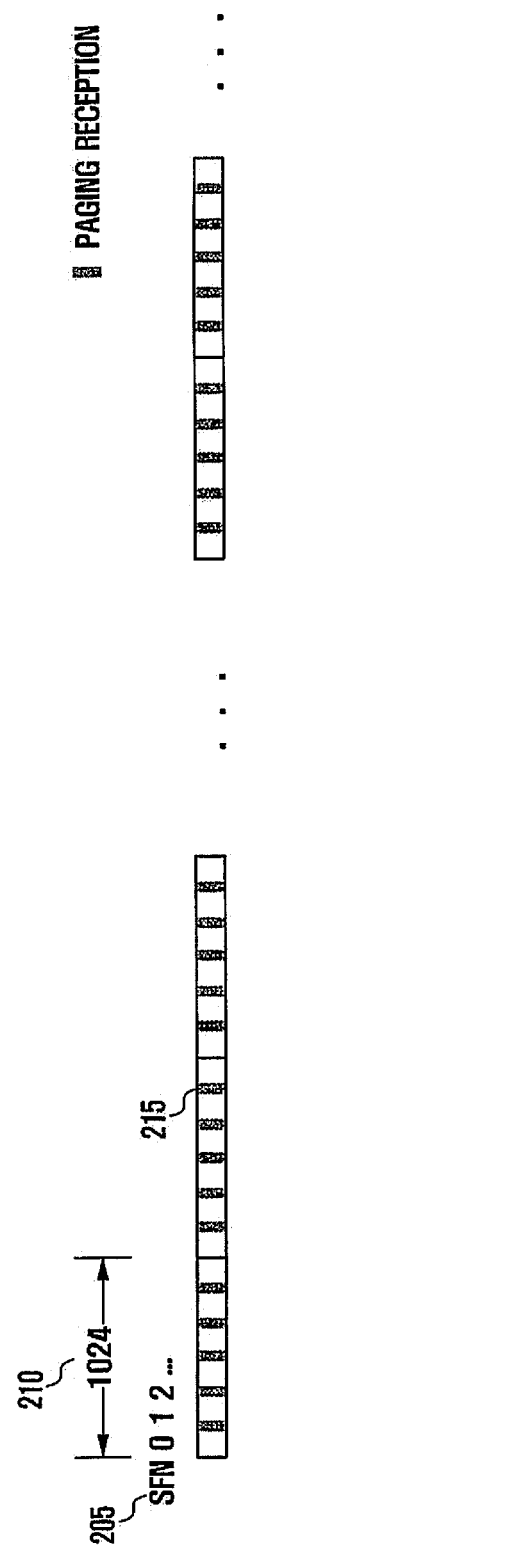
FIG. 2 is a diagram illustrating paging occasions in the first DRX.

FIG. 2 is a diagram illustrating paging occasions in the first DRX.

Referring to FIG. 2, the SFN 205 may be increased by one every radio frame. In addition, the value of the SFN may be reset to zero in a 1024 cycle 210.

Referring to Equation 1, the same pattern of paging 215 may be repeated every SFN cycle. From Equation 1, it can be seen that the maximum cycle of the first DRX is 2.56 seconds, and it can be seen that the first DRX cycle, even though being maximally increased, cannot exceed the SFN cycle, i.e., 10.24 seconds. In other words, if it is required to increase the first DRX cycle more than 10.24 seconds for reduction of power consumption, the SFN cycle should be also increased.

Accordingly, in order to increase the SFN cycle, the present invention may include an additional SFN bit in a typical or new SIB and define UE operation for receiving this. The SFN bit is increased by one every SFN cycle. The value indicated by the additional SFN bit may be referred to as a hyper SFN (HFN).

All the UEs do not need to receive the SIB including the additional SFN bit, and only the UE to which a very long DRX cycle is applied may attempt reception. In addition, system information change related information (systemInfoValueTag value (one information (IE) included in the SIB1)), which is increased by one every time of SIB information change, and a system information change indicator (systemInfoModification IE), which is included in paging and indicates whether system information (SI) is changed, are not affected by a change of the SFN bit value. That is, even if the SFN bit value is changed, the SI change related information (systemInfoValueTag IE) is not updated, and the SI change indicator (systeminfoModification IE) is not transmitted through paging.

Figure 3:
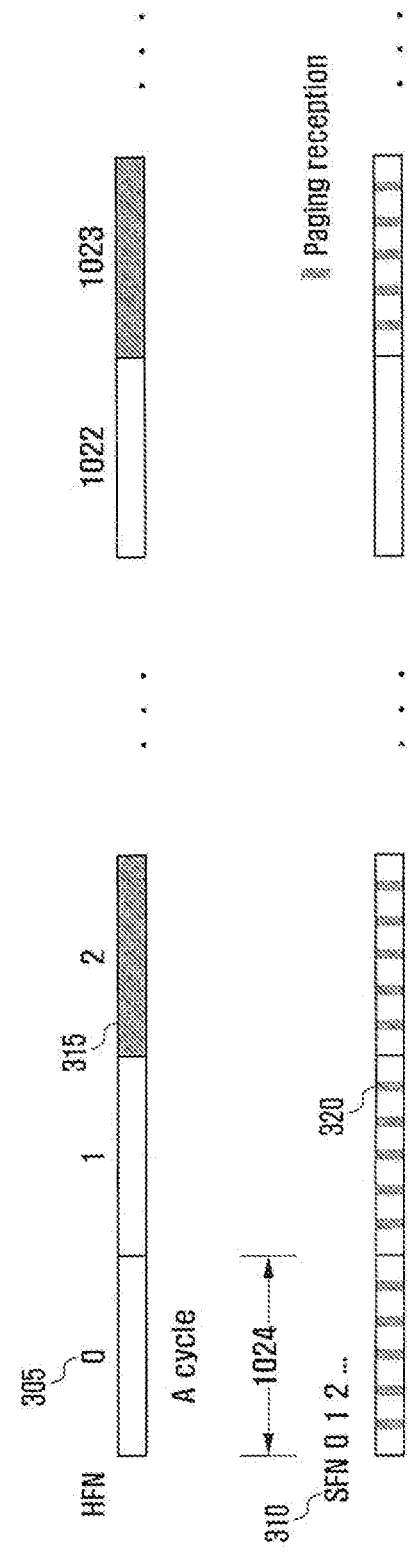
FIG. 3 is another diagram illustrating paging occasions according to the present invention.

FIG. 3 is another diagram illustrating paging occasions according to the present invention.

As described above, the HFN may be increased by one every SFN cycle. That is, the HFN 305 may be composed of 1024 SFNs 310. Also, the SFN 310 may be increased by one every radio frame. The eNB may generate paging 320 by Equation 1 in the SFN cycle determined by Equation 2 to be described below.

Specifically, assumed in the present invention is a method for receiving a paging signal several times during a predetermined DRX period in order to increase the DRX cycle and also increase the probability of success in receiving the paging signal. For this, the paging occasion may be determined through a two-step process.

1) First step: Determine the SFN cycle (or HFN) in which the paging will occur

2) Second step: Determine the radio frame in which the paging will occur, in the SFN cycle (or HFN) determined at the first step At the first step, the SFN cycle in which the paging will occur may be determined. The added SFN bits may have a value increased by one every SFN cycle. As described above, a value represented by the added SFN bits may be defined as a hyper system frame number (HFN).

Using Equation 2, the UE may identify the SFN cycle in which the paging will occur. In the present invention, the SFN cycle (or HFN) in which the paging will occur may be referred to as a paging hyper frame (PHF).

$$\text{HFN mod } T' = (T' \text{ div } N')*(UE\_ID \text{ mod } N') \qquad \text{<Equation 2>}$$

Where

N': min(T', nB')

UE_ID: IMSI mod 1024 (or MTC device group ID mod 1024)

The second DRX cycle information (T') and the paging-related second parameter (nB') may be provided from the eNB via the SIB. The second DRX cycle information (T') and the paging-related second parameter (nB') may be included in the SIB2, as the first DRX cycle information (T) and the paging-related first parameter (nB), or included in another SIB.

In the present invention, the second DRX cycle information (T') and the paging-related second parameter (nB') provided through the SIB may be referred to as second DRX configuration information or a second DRX parameter.

The UE identifier (UE_ID) may be derived by the same IMSI module operation as in the normal UE. In case of a machine-type communication device, the device may be represented in the form of a group ID, so that the group ID may be applied. After determining the PHF which is the SFN cycle in which the paging will occur, the UE may determine, in the SFN cycle, the specific radio frames in which the paging will occur. Using Equation 1, the UE may identify the radio frame in which the paging will occur in the SFN cycle.

If the paging occurrence occasion is defined in two steps as discussed above and if the communication devices have the DRX cycle accordingly, the power consumption may be greatly reduced. In addition, since the paging may repeatedly occur in the SFN cycle determined at the first step according to setting of the first DRX cycle information (T) and the paging-related first parameter (nB), the paging reception probability may be increased.

Specifically, the UE that operates in the second DRX may perform the DRX operation according to the first cycle during a specific period when the second cycle arrives. Herein, the specific period may be referred to as a paging time window (PTW). Like this, by allowing the paging to be repeatedly received during the specific period, the paging reception probability may be increased.

However, the second DRX having an increased cycle as described above may have a problem of whether it is supported by the UE, the eNB and the MME. Accordingly, proposed hereinafter is a method for determining the DRX cycle by identifying whether the entity supports the second DRX, and operating in the DRX according to the determined cycle.

First Embodiment

Figure 4:
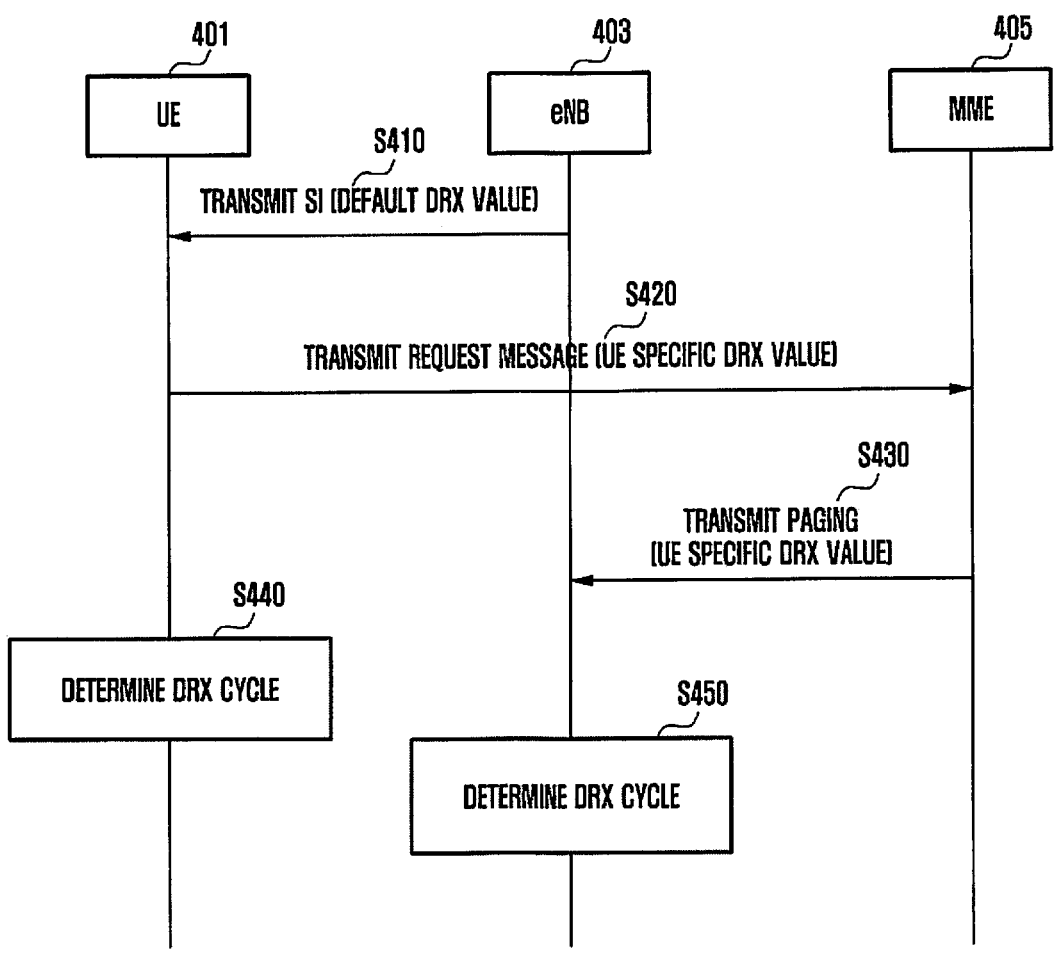
FIG. 4 is a diagram illustrating a process of determining a first DRX cycle by UE.

FIG. 4 is a diagram illustrating a process of determining a first DRX cycle by UE.

The eNB 405 may transmit system information to the UE at step S410. Specifically, using the SIB2 which is one of system information broadcasted to the UE, the eNB 405 may provide the first DRX-related first information (e.g., a default DRX value) to the UE 400. In the present invention, the first DRX-related first information may refer to first DRX cycle information provided to the UE by the eNB.

The UE that receives the system information may transmit a request message to the MME at step S420. In this case, the request message may include, for example, an attach request message or a tracking area update (TAU) message. The request message may be transmitted as a non-access stratum message to the MME via the eNB.

If the UE desires a shorter DRX cycle than the received first DRX-related first information (the default DRX value), the UE may transmit a desired DRX cycle to the MME through an ATTACH process. That is, the UE may include the first DRX-related second information (e.g., a UE specific DRX value) in the request message and transmit the request message to the MME 410. In this case, the first DRX-related second information (the UE specific DRX value) may include the first DRX cycle information desired by the UE.

Thereafter, if there is paging for the UE, the MME may transmit a paging message to the eNB at step S430. At this time, the MME may transmit the first DRX-related second information (the UE specific DRX value), received from the UE, to the eNB together with the paging.

At step S440, the UE may determine the first DRX cycle by selecting a smaller value between the first DRX-related second information (the UE specific DRX value) transmitted to the MME and the first DRX-related first information (the default DRX value) received from the eNB.

Also, at step S450, the eNB may determine the first DRX cycle by selecting a smaller value between the first DRX-related second information (the UE specific DRX value) received from the MME and the first DRX-related first information (the default DRX value) being broadcasted by itself.

In this way, the UE and the eNB may select the same first DRX cycle, and the eNB may determine a paging frame (PF), based on the first DRX cycle, and then transmit the paging to the UE.

Meanwhile, when the second DRX (eDRX) using an increased DRX cycle is applied, the present invention proposes a method for determining whether the second DRX (eDRX) is supported by the UE, the eNB, and the MME. A first method independently considers whether the MME and the eNB support the second DRX (eDRX), and a second method considers only whether the eNB supports the second DRX (eDRX).

First Method.

The first method is characterized in that the MME notifies the UE whether the second DRX (eDRX) is supported, by using a response message (e.g., an ATTACH ACCEPT or TAU ACCEPT message) corresponding to the request message received from the UE. Considering both whether the MME supports the second DRX (eDRX) and whether a serving cell supports the second DRX (eDRX), the UE may determine whether to apply the second DRX (eDRX).

Figure 5:
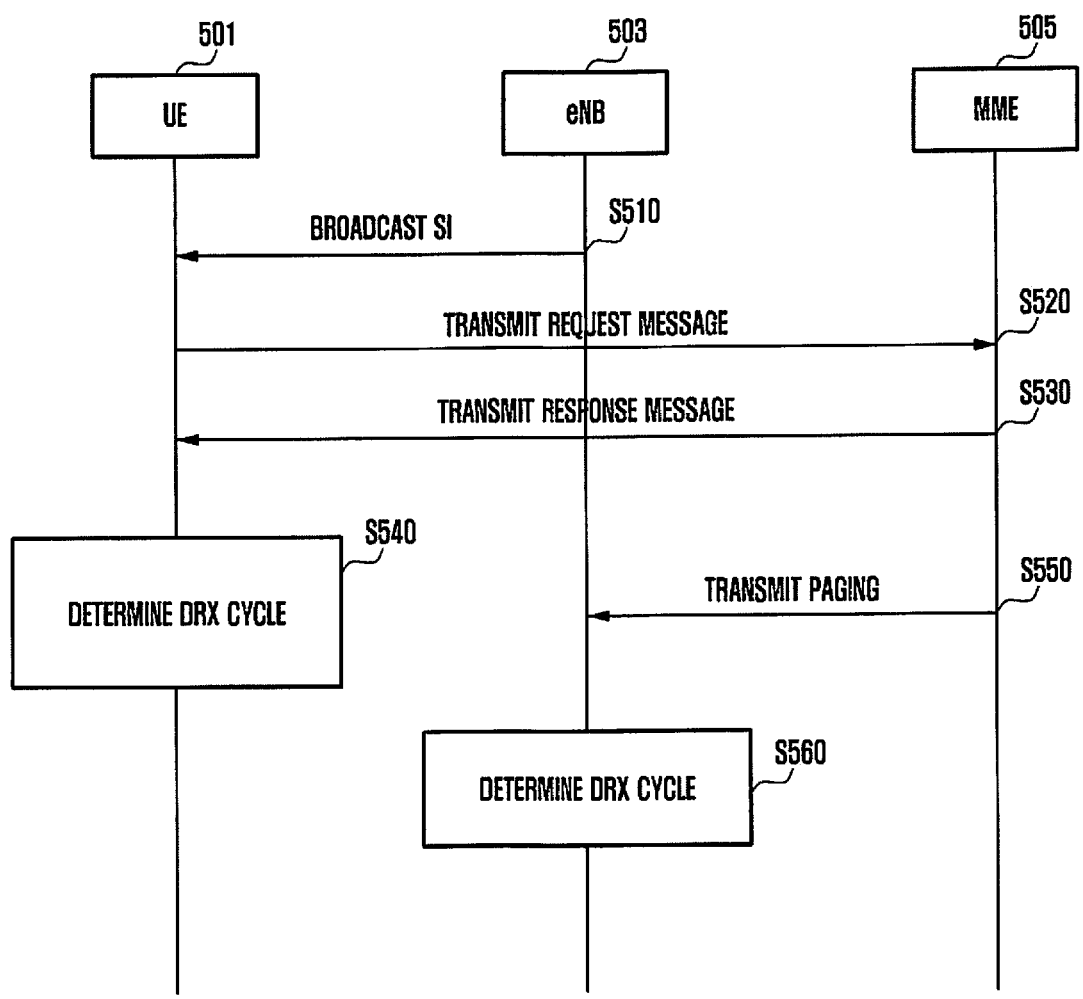
FIG. 5 is a diagram illustrating a process of determining a second DRX cycle by UE according to a first method of a first embodiment of the present invention.

FIG. 5 is a diagram illustrating a process of determining a second DRX cycle by UE according to a first method of a first embodiment of the present invention.

Referring to FIG. 5, the eNB may broadcast system information at step S510. In case of supporting the second DRX (eDRX), the eNB 503 may broadcast the system information including the second DRX-related first information. For example, the eNB may provide SIB2 and SIBx. In this case, the SIB2 may include the first DRX-related first information (the typical default DRX value), and the SIBx may include the second DRX-related first information.

The second DRX-related first information may include information (an indicator) indicating whether the second DRX is supported, or a default eDRX value. The second DRX-related first information may be included in a typical SIB or a newly defined SIB. For example, the second DRX-related first information may be included in SIB1.

At step S520, the UE may transmit a request message to the eNB. Using the request message (an ATTACH REQUEST or TAU REQUEST message), the UE may transmit the first DRX-related second information (a UE specific DRX value) and the second DRX-related second information (a UE specific eDRX value) to the MME.

Specifically, if the eNB is broadcasting the first DRX-related first information, and if the UE decides that it is necessary to apply the second DRX (eDRX), the UE may provide the second DRX-related second information (e.g., a desired UE specific DRX value) to the MME 505. At this time, the second DRX-related second information may include the second DRX cycle information desired by the UE.

As described above, the first DRX-related second information may include cycle information desired by the UE for the first DRX, and the second DRX-related second information may include cycle information desired by the UE for the second DRX.

The reason that the UE transmits the first DRX-related second information (the UE specific DRX value) to the MME even though desiring to apply the second DRX (eDRX) is that, if the MME does not support the second DRX (eDRX), the UE desires to apply the first DRX according to the first DRX (the typical DRX) application procedure.

In addition, even when the second DRX (eDRX) is applied, the paging frame (PF) and the paging occasion (PO) for actual transmission of the paging within the hyper frame number (HFN) are determined according to the first DRX configuration information (the typical DRX configuration information). Therefore, in order to derive the first DRX cycle (the typical DRX value), the first DRX-related second information should be provided to the MME.

Thereafter, at step S530, the MME may transmit a response message corresponding to the request message to the UE.

If the MME supports the second DRX (eDRX), the MME may transmit the second DRX-related third information to the UE by using a response message (an ATTACH ACCEPT or TAU ACCEPT message).

The second DRX-related third information may include allowed second DRX cycle information, and the MME may provide the second DRX (eDRX) cycle information to the UE through the response message. Alternatively, by including the second DRX-related third information in the response message, the MME may notify the UE that the MME supports the second DRX.

In the present invention, the second DRX cycle information transmitted by the MME may be referred to as allowed second DRX parameter (allowed eDRX parameter). The allowed second DRX (eDRX) cycle information may be the same as or different from the second DRX-related second information (the UE specific eDRX value) provided to the MME by the UE through the request message (the ATTACH REQUEST or TAU REQUEST message).

Alternatively, the second DRX-related third information may include an indicator indicating whether the second DRX is supported. This indicator may be formed of 1-bit information. In case of simply providing whether the second DRX is supported, the second DRX-related third information included in the response message may mean that the second DRX-related second information (the UE specific eDRX value) can be supported. In this case, the second DRX-related third information may be the same as the second DRX-related second information.

The UE that receives the response message may determine the DRX cycle at step S540.

If the second DRX-related third information is included in the response message received from the MME, the UE may determine the second DRX cycle by using the second DRX-related third information. In this case, if the second DRX-related third information transmitted by the MME is identical with the second DRX-related second information transmitted by the UE, the UE may select the second DRX-related second information or the second DRX-related third information as the second DRX cycle.

On the other hand, if the second DRX-related third information and the second DRX-related second information are different from each other, the UE may select the second DRX-related third information as the second DRX cycle.

In addition, If the UE receives the second DRX-related third information from the MME and thereby confirms that the MME supports the second DRX (eDRX), the UE may determine the first DRX cycle (T) by selecting a smaller value between the first DRX-related first information (the default DRX value) and the first DRX-related second information (the UE specific DRX).

Alternatively, in order to determine the second DRX cycle, the UE may determine the second DRX (eDRX) cycle (T') by selecting a smaller or larger value between the second DRX-related first information value and the second DRX-related second information (the UE specific eDRX).

If it is determined that the MME does not support the second DRX (eDRX), the UE may determine the DRX cycle (T) by selecting a smaller value between the first DRX-related first information (the default DRX value) and the first DRX-related second information (the UE specific DRX).

Meanwhile, the MME that transmits the response message may transmit paging to the eNB at step S550. At this time, the MME may transmit the first DRX-related second information (the UE specific DRX) and the second DRX-related third information to the eNB together with the paging for the UE.

However, if the MME does not support the second DRX (eDRX), only the first DRX-related second information (the UE specific DRX) may be provided to the eNB together with the paging as in a typical case.

Accordingly, the eNB may determine the DRX cycle at step S560. Upon confirming that the MME supports the second DRX (eDRX), the eNB may determine the second DRX cycle by using the second DRX-related third information transmitted by the MME. Also, the eNB may determine the DRX cycle (T) by selecting a shorter value between the first DRX-related first information (the default DRX value) and the first DRX-related second information (the UE specific DRX) received from the MME.

Alternatively, with respect to the second DRX cycle, the eNB may determine the second DRX (eDRX) cycle (T') by selecting a smaller or larger value between the second DRX-related first information and the second DRX-related third information (the allowed eDRX parameter) received from the MME.

Accordingly, using the determined second DRX cycle and the first DRX cycle, the UE may perform the DRX operation.

Meanwhile, the UE may move and, after performing cell reselection, camp on a new serving cell. The UE may acquire system information broadcasted by the serving cell, for example, the first DRX-related first information (the default DRX cycle) and the paging-related first parameter (the nB value) from the SIB 2, and the second DRX-related first information and the paging-related second parameter (the nB' value) from the SIB x. At this time, if the following two conditions are satisfied, the UE determines to apply the second DRX (eDRX).

(1) The second DRX-related third information (the allowed UE eDRX parameter) is received from the MME in the current tracking area (TA).

(2) The second DRX-related first information (or the second DRX (eDRX) parameter) is included in the system information of the current serving cell.

On the other hand, if either of the following conditions is satisfied, the UE does not apply the second DRX (eDRX).

(1) The second DRX-related third information (the allowed UE eDRX parameter) is not received from the MME in the current TA.

(2) Although the second DRX-related third information (the allowed UE eDRX parameter) is received from the MME in the current TA, the UE does not include the second DRX-related first information (or the second DRX (eDRX) parameter) in the system information of the current serving cell.

If the UE determines to apply the second DRX (eDRX), the UE may select the second DRX-related third information received from the MME as the second DRX cycle. Alternatively, the UE may determine the second DRX cycle (T') by selecting a smaller or larger value between the second DRX-related first information and the second DRX-related second information (Min (or Max) [default eDRX, UE eDRX]).

In addition, the UE may determine the first DRX cycle (T) by selecting a smaller value between the first DRX-related first information and the first DRX-related second information (Min [default DRX, UE DRX]). Therefore, the UE may determine the PHF by using the second DRX cycle (T') and determine the PF by using the first DRX cycle (T). As described above, the UE does not perform paging monitoring in the hyper frame (HF) which is not the PHF, and may perform the paging monitoring in the PF of the HF which is the PHF. The HF may refer to a frame indicated by the HFN.

If the UE determines to apply the first DRX (not to apply the second DRX), the UE may determine the first DRX cycle (T) by selecting a smaller value between the first DRX-related first information and the first DRX-related second information (Min [default DRX, UE DRX]). The second DRX cycle (T') may be regarded as 1 (that is, all the HFs are regarded as the PHF), or the paging-related second parameter (nB') may be set as the second DRX cycle (T') (likewise, all the HFs may be regarded as the PHF). Therefore, the UE may perform the paging monitoring in the PF of all the HFs.

Thereafter, the MME may receive incoming data from an S-GW. If the current TA of target UE to which the incoming data is to be transmitted is TA x, if all serving cells of the TA x support the second DRX (eDRX), and if the MME transmits the second DRX-related third information (the allowed UE eDRX parameter) to the UE, the MME may generate a paging message including the first DRX-related second information (the UE DRX cycle) and the second DRX-related third information (the allowed UE eDRX cycle) and transmit the generated paging message to the eNB.

If the serving cells of the TA x do not support the second DRX (eDRX), or if the MME does not transmit the second DRX-related third information (the allowed UE eDRX parameter), a paging message including the first DRX-related second information (the UE DRX cycle) may be generated and transmitted to the eNB.

In the present invention, the first DRX-related first information may be referred to as a default DRX cycle, a default DRX value, or the like. Also, the first DRX-related second information may be referred to as a UE specific DRX value, a UE specific DRX cycle, a UE DRX cycle, a UE DRX, or the like. Similarly, the second DRX-related second information may be referred to as a UE specific eDRX value, a UE specific eDRX cycle, a UE eDRX cycle, a UE eDRX, or the like, and the second DRX-related third information may be referred to as an allowed UE eDRX parameter, an allowed UE eDRX cycle, or the like. Although used names are different, the contents included in each information may be the same.

Figure 6:
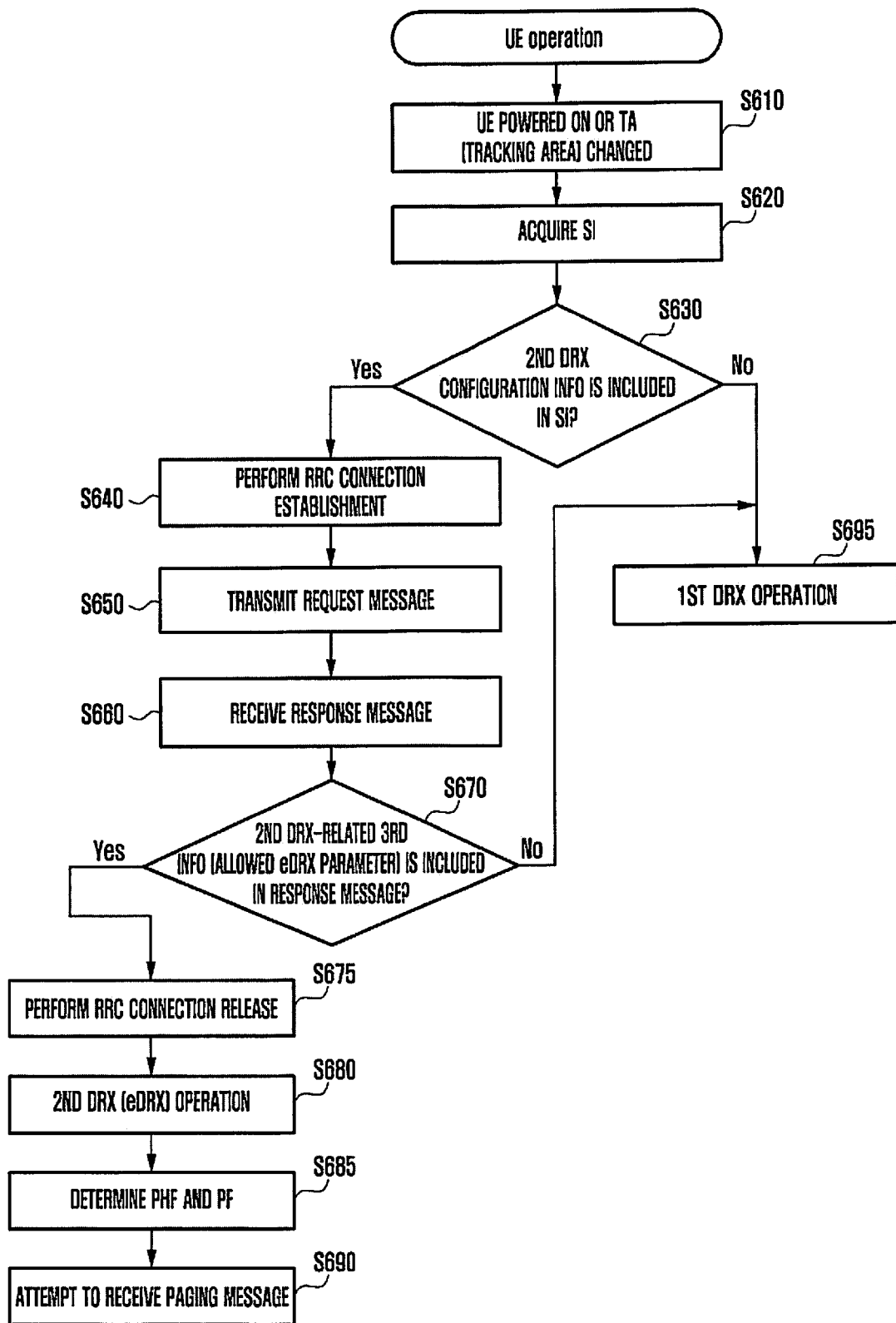
FIG. 6 is a diagram illustrating a UE operation according to the first method of the first embodiment of the present invention.

FIG. 6 is a diagram illustrating a UE operation according to the first method of the first embodiment of the present invention.

Referring to FIG. 6, at step S610, the UE may be powered on, or the tracking area (TA) may be changed.

At step S620, the UE may acquire system information from the eNB.

At step S630, the UE that acquires the system information may identify whether the system information includes the second DRX configuration information. That is, the UE may determine whether the system information includes the second DRX-related first information and the paging-related second parameter (the nB' value).

If the system information includes the second DRX-related first information and the paging-related second parameter (the nB' value), the UE may perform an RRC connection establishment process at step S640.

After the RRC connection is completed, the UE may transmit a request message at step S650. If the UE prefers to apply the second DRX (eDRX) or if the UE supports the second DRX, the UE may include the first DRX-related second information (the UE specific DRX) and the second DRX-related second information (the UE specific eDRX value) in the request message (the ATTACH REQUEST or TAU REQUEST message) and transmit the request message to the MME. In this case, the first DRX-related second information may include the first DRX cycle information preferred by the UE, and the second DRX-related second information may include the second DRX cycle information preferred by the UE. The cycle information preferred by the UE may mean cycle information determined to be applied by the UE.

In addition, at step S660, the UE may receive a response message (e.g., the ATTACH ACCEPT or TAU ACCEPT message) corresponding to the request message from the MME.

At step S670, the UE that receives the response message may determine whether the response message includes the second DRX-related third information (the allowed eDRX parameter). The second DRX-related third information (the allowed eDRX parameter) may include information indicating whether the MME supports the second DRX (eDRX), or the second DRX cycle information (the eDRX cycle information) having to be applied by the UE.

If the response message includes the second DRX-related third information, the UE may perform an RRC connection release process at step S675.

At step S680, the UE that releases the RRC connection may operate by applying the second DRX (eDRX).

For this, at step S685, the UE may derive the second DRX cycle (T') and the first DRX cycle (T) by using the above-described method, and then determine the PHF and the PF. This step may be performed before the RRC connection release.

In addition, at step S690, the UE may attempt to receive the paging message thereof at the paging reception timing indicated by the determined PHF and PF.

Meanwhile, if the eNB does not broadcast the second DRX-related first information and the paging-related second parameter (nB') at step S630, or if the MME does not transmit the second DRX-related third information (the allowed eDRX parameter) at step S670, the UE may perform only the first DRX (typical DRX) process at step S695.

Figure 7:
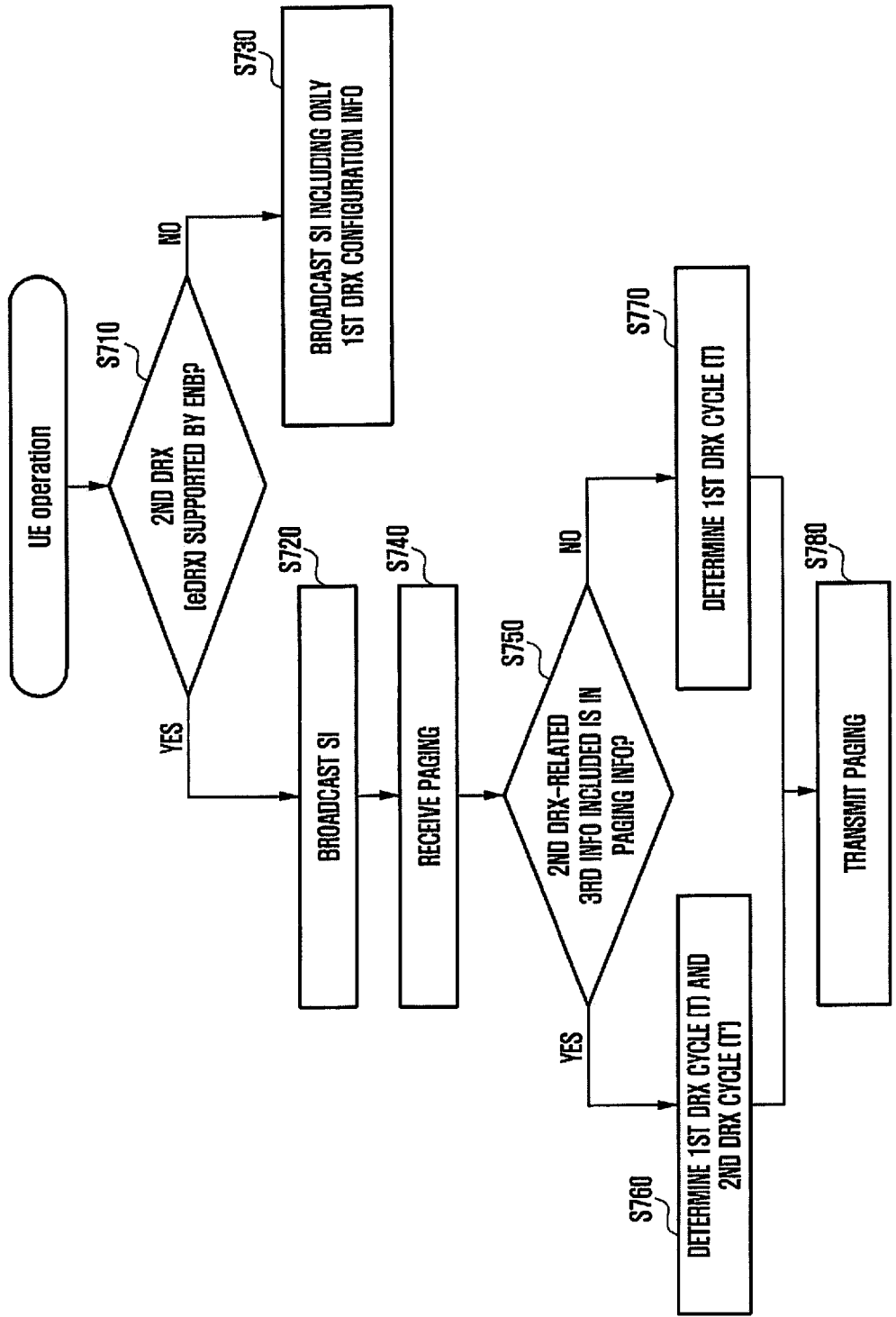
FIG. 7 is a diagram illustrating an eNB operation according to the first method of the first embodiment of the present invention.

FIG. 7 is a diagram illustrating an eNB operation according to the first method of the first embodiment of the present invention.

Referring to FIG. 7, at step S710, the eNB may determine whether the eNB supports the second DRX (eDRX).

At step S720, the eNB may broadcast system information. If the eNB supports the second DRX, the eNB may broadcast, to the UE, the system information including the second DRX-related first information and the paging-related second parameter (nB') as well as the first DRX-related first information and the paging-related first parameter which are the first DRX configuration information.

If the eNB does not support the second DRX, the eNB may broadcast the system information including only the first DRX configuration information at step S730. If the eNB does not support the second DRX, the eNB may operate according to the first DRX as described with reference to FIG. 4, and a detailed description will be omitted.

If the eNB supports the second DRX, the eNB may receive paging for specific UE from the MME at step S740.

At step S750, the eNB that receives the paging may determine whether the paging information includes the second DRX-related third information.

If the paging information includes the second DRX-related third information, the eNB may determine at step S760 the first DRX cycle (T) by selecting a smaller value between the first DRX-related first information (the default DRX) and the first DRX-related second information (the UE specific DRX value). In addition, the eNB may select, as the second DRX cycle, the second DRX cycle information indicated by the second DRX-related third information included in the paging information.

Alternatively, the eNB may determine the second DRX (eDRX) cycle (T') by selecting a smaller value (or larger value) between the second DRX-related first information and the second DRX-related third information received from the MME.

If the paging information does not include the second DRX-related third information, the eNB may determine at step S770 the first DRX cycle (T) by selecting a smaller value between the first DRX-related first information (the default DRX) and the first DRX-related second information (the UE specific DRX value).

Thereafter, at step S780, the eNB may transmit the paging by calculating the PHF, PF, and PO based on at least one of the second DRX cycle (T') and the first DRX cycle (T). That is, if the second DRX-related third information is not included in the paging information received from the MME, the eNB may transmit the paging by using only the first DRX cycle. Also, if the second DRX-related third information is included in the paging information received from the MME, the eNB may transmit the paging based on the second DRX cycle (T') and the first DRX cycle (T). Specifically, when the second DRX cycle arrives, the eNB may repeatedly transmit the paging in a specific period (PTW) according to the first DRX cycle. At this time, even when the second DRX cycle arrives, the starting point of the first DRX cycle may be changed depending on the UE.

Figure 8:
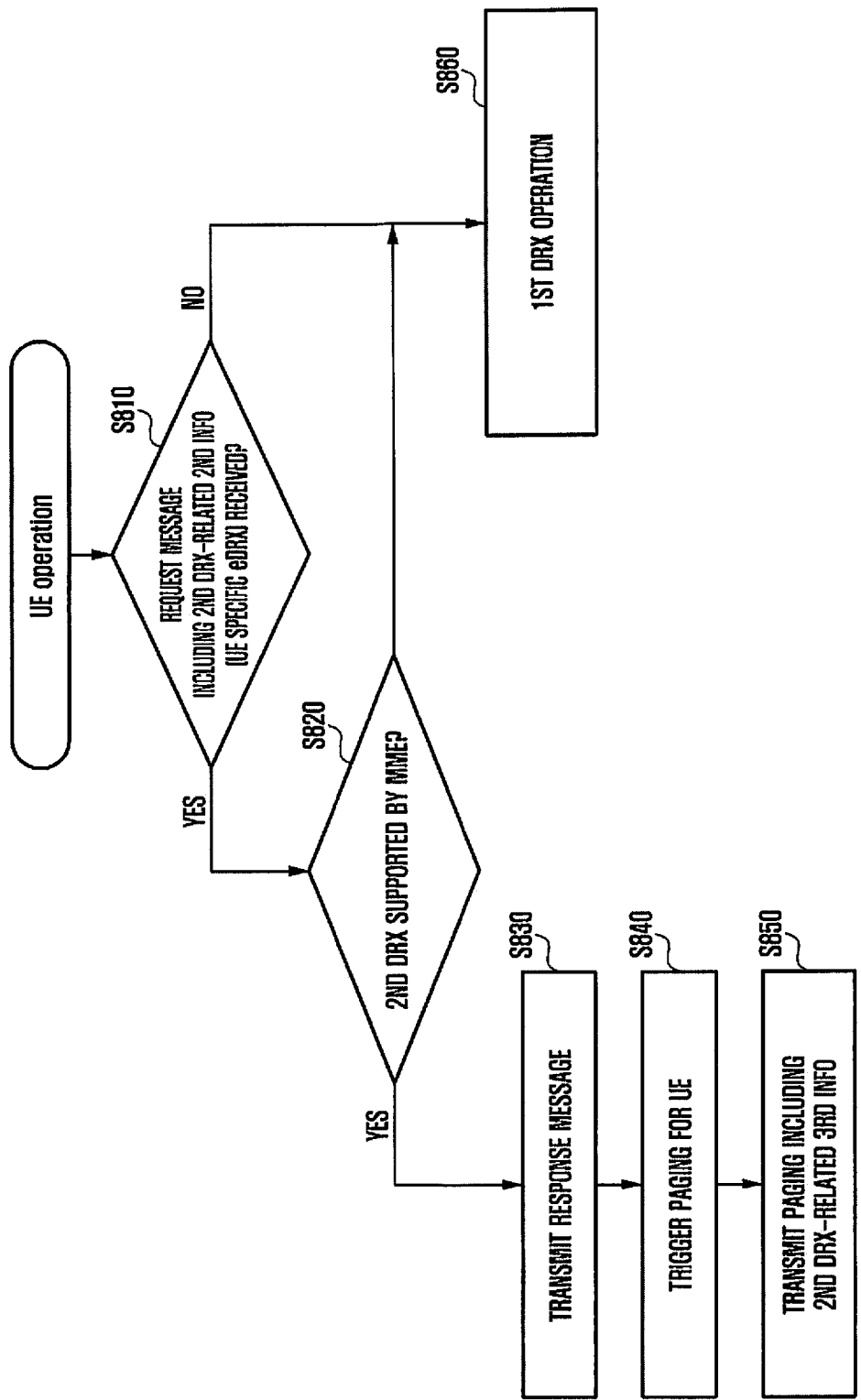
FIG. 8 is a diagram illustrating an MME operation according to the first method of the first embodiment of the present invention.

FIG. 8 is a diagram illustrating an MME operation according to the first method of the first embodiment of the present invention.

Referring to FIG. 8, the MME may receive a request message from the UE. At step S810, the MME may determine whether the request message (the ATTACH REQUEST or TAU REQUEST message) including the second DRX-related second information (the UE specific eDRX) is received from the UE.

If the request message including the second DRX-related second information is received, the MME may determine at step S820 whether the MME can support the second DRX (eDRX).

If the MME supports the second DRX, the MME may transmit a response message at step S830. At this time, the MME may include the second DRX-related third information (the allowed eDRX parameter) in the response message (the ATTACH ACCEPT or TAU ACCEPT message) and transmit it to the UE. In this case, the second DRX-related third information may be identical with the second DRX-related second information or include the second DRX cycle information determined by the MME.

Thereafter, at step S840, the paging for the UE may be triggered.

When the paging is triggered, the MME may further provide the second DRX-related third information together with the paging to the eNB at step S850. That is, the MME may transmit the paging including the second DRX-related third information to the eNB.

If the second DRX-related second information is not received from the UE, or if the MME does not support the second DRX (eDRX), the MME may perform an operation according to the first DRX at step S860. That is, the MME may transmit the response message to the UE and transmit the paging message including the first DRX-related second information to the eNB.

Second Method

The second method is characterized in that the eNB broadcasts the second DRX (eDRX) configuration information (or the second DRX parameter) only when all the eNBs and MMEs forming one TA support eDRX.

The eNB may broadcast the second DRX (eDRX) parameter as the system information when all the MMEs connected thereto support the second DRX (eDRX). Therefore, contrary to the first method, the MME does not need to notify the UE whether the second DRX (eDRX) is supported, using a response message (the ATTACH ACCEPT or TAU ACCEPT message).

Figure 9:
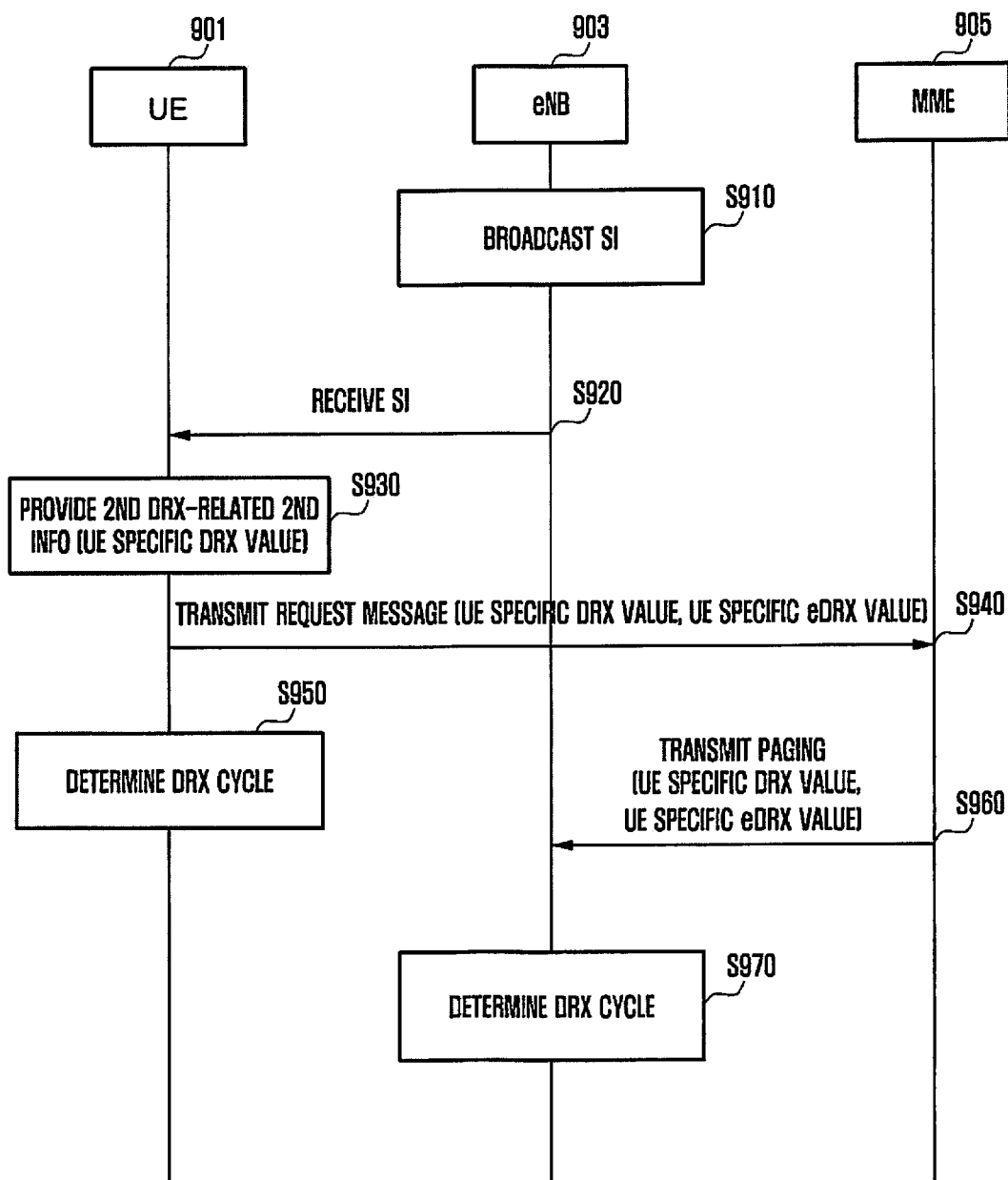
FIG. 9 is a diagram illustrating a process of determining a second DRX cycle by UE according to a second method of the first embodiment of the present invention.

FIG. 9 is a diagram illustrating a process of determining a second DRX cycle by UE according to a second method of the first embodiment of the present invention.

Referring to FIG. 9, the eNB 903 may broadcast the system information at step S910. If all the eNBs forming the TA and related MMEs support the second DRX (eDRX), the eNB 903 may broadcast the second DRX-related first information.

Therefore, the UE 901 may receive the system information from the eNB at step S920. For example, the UE may receive SIB2 and SIBx. In this case, the SIB2 may include the first DRX-related first information (the typical default DRX value), and the SIBx may include the second DRX-related first information.

The second DRX-related first information may include information (an indicator) indicating whether the second DRX is supported, or a default eDRX value. The second DRX-related first information may be included in a typical SIB or a newly defined SIB. For example, the second DRX-related first information may be included in SIB 1.

In addition, at step S930, the UE may provide the second DRX-related second information to the MME. Specifically, if the eNB is broadcasting the second DRX-related first information, and if the UE decides that it is necessary to apply the second DRX (eDRX), the UE may provide the second DRX-related second information (a desired UE specific DRX value) to the MME 905. At this time, the second DRX-related second information may include the second DRX cycle information desired by the UE.

The UE may transmit a request message to the MME at step S940. Using the request message (e.g., the ATTACH REQUEST or TAU REQUEST message), the UE may transmit the first DRX-related second information (the UE specific DRX value) and the second DRX-related second information (the UE specific eDRX value).

As described above, the first DRX-related second information may include cycle information desired by the UE for the first DRX, and the second DRX-related second information may include cycle information desired by the UE for the second DRX.

In addition, at step S950, the UE may determine the DRX period.

The UE may determine the first DRX cycle (T) by selecting a smaller value between the first DRX-related first information (the default DRX value) and the first DRX-related second information (the UE specific DRX). Also, the UE may select, as the second DRX cycle, the second DRX-related second information transmitted to the MME. Alternatively, the UE may determine the second DRX (eDRX) cycle (T') by selecting a smaller or larger value between the second DRX-related first information and the second DRX-related second information (the UE specific eDRX).

If the second DRX-related first information is not broadcasted from the eNB, the UE may determine only the first DRX cycle (T) by using a smaller value between the first DRX-related first information (the typical default DRX value) and the first DRX-related second information (the UE specific DRX).

Meanwhile, the MME that receives the request message may transmit paging to the eNB at step S960. At this time, together with the paging for the UE, the MME may transmit the first DRX-related second information (the UE specific DRX) and the second DRX-related second information (the UE specific eDRX value) to the eNB.

However, if the eNB does not broadcast the second DRX-related first information, only the first DRX-related second information may be included in the paging.

Therefore, the eNB may determine the DRX cycle at step S970. The eNB may determine the DRX cycle (T) by selecting a smaller value between the first DRX-related first information (the default DRX value) and the first DRX-related second information (the UE specific DRX).

In addition, the eNB may determine, as the second DRX, the second DRX-related second information received from the MME. Alternatively, the eNB may determine the second DRX (eDRX) cycle (T') by selecting a smaller or larger value between the second DRX-related first information and the second DRX-related second information (the UE specific eDRX). However, if the eNB does not broadcast the second DRX-related first information, the process of determining the second DRX cycle may be omitted.

Accordingly, using the determined second DRX cycle and the first DRX cycle, the UE may perform the DRX operation.

Meanwhile, the UE may move and, after performing cell reselection, camp on a new serving cell. The UE may acquire system information broadcasted by the serving cell, for example, the first DRX-related first information (the default DRX cycle) and the paging-related first parameter (the nB value) from the SIB 2, and the second DRX-related first information and the paging-related second parameter (the nB' value) from the SIB x. At this time, if the following two conditions are satisfied, the UE determines to apply the second DRX (eDRX).

(1) The second DRX-related second information (the UE eDRX) is transmitted to the MME in the current TA.

(2) The second DRX-related first information (or the second DRX (eDRX) parameter) is included in the system information of the current serving cell.

On the other hand, if either of the following conditions is satisfied, the UE does not apply the second DRX (eDRX).

(1) The second DRX-related second information (the UE eDRX) is not transmitted to the MME in the current TA.

(2) Although the second DRX-related second information is transmitted to the MME in the current TA, the second DRX-related first information (or the second DRX (eDRX) parameter) is not included in the system information of the current serving cell.

If the UE determines to apply the second DRX (eDRX), the UE may select, as the second DRX cycle, the second DRX-related second information transmitted to the MME. Alternatively, the UE may determine the second DRX cycle (T') by selecting a smaller or larger value between the second DRX-related first information and the second DRX-related second information (Min (or Max) [default eDRX, UE eDRX]).

In addition, the UE may determine the first DRX cycle (T) by selecting a smaller value between the first DRX-related first information and the first DRX-related second information (Min [default DRX, UE DRX]). Therefore, the UE may determine the PHF by using the second DRX cycle (T') and determine the PF by using the first DRX cycle (T). As described above, the UE does not perform the paging monitoring in the HF which is not the PHF, and may perform the paging monitoring in the PF of the HF which is the PHF.

On the other hand, if the UE determines to apply the first DRX (not to apply the second DRX), the UE may determine the first DRX cycle (T) by selecting a smaller value between the first DRX-related first information and the first DRX-related second information (Min [default DRX, UE DRX]). At this time, the second DRX cycle (T') may be regarded as 1 (that is, all the HFs are regarded as the PHF), or the paging-related second parameter (nB') may be set as the second DRX cycle (T) (likewise, all the HFs may be regarded as the PHF). Therefore, the UE may perform the paging monitoring in the PF of all the HFs.

Thereafter, the MME may receive incoming data from the S-GW. If the current TA of target UE to which the incoming data is to be transmitted is TA x, and if all serving cells of the TA x support the second DRX (eDRX), the MME may generate a paging message including the first DRX-related second information (the UE DRX cycle) and the second DRX-related second information (the UE specific eDRX cycle) and transmit the generated paging message to the eNB.

If the serving cells of the TA x do not support the second DRX (eDRX), or if the second DRX-related second information (the UE specific eDRX value) is not received from the UE, the MME may generate a paging message including the first DRX-related second information (the UE DRX cycle) and transmit it to the eNB.

Figure 10:
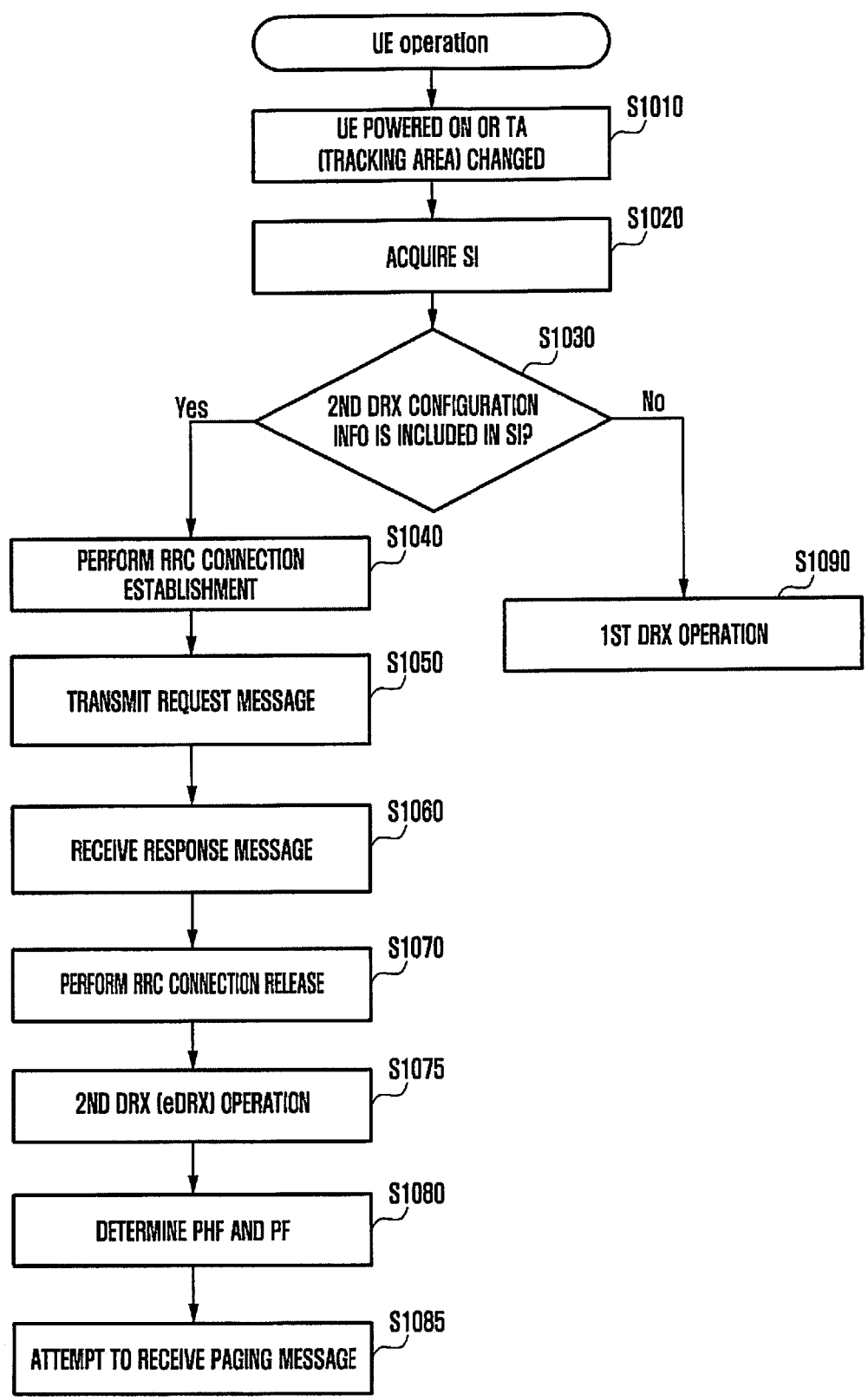
FIG. 10 is a diagram illustrating a UE operation according to the second method of the first embodiment of the present invention.

FIG. 10 is a diagram illustrating a UE operation according to the second method of the first embodiment of the present invention.

Referring to FIG. 10, at step S1010, the UE may be powered on, or the tracking area (TA) may be changed.

At step S1020, the UE may acquire system information from the eNB.

At step S1030, the UE that acquires the system information may identify whether the system information includes the second DRX configuration information. That is, the UE may determine whether the system information includes the second DRX-related first information and the paging-related second parameter (the nB' value).

If the system information includes the second DRX-related first information and the paging-related second parameter (the nB' value), the UE may perform an RRC connection establishment process at step S1040.

After the RRC connection is completed, the UE may transmit a request message to the MME at step S1050. If the UE prefers to apply the second DRX (eDRX) or if the UE supports the second DRX, the UE may include the first DRX-related second information (the UE specific DRX) and the second DRX-related second information (the UE specific eDRX value) in the request message (the ATTACH REQUEST or TAU REQUEST message) and transmit the request message to the MME. As described above, the first DRX-related second information may include the first DRX cycle information preferred by the UE, and the second DRX-related second information may include the second DRX cycle information preferred by the UE. The cycle information preferred by the UE may mean cycle information determined to be applied by the UE.

In addition, at step S1060, the UE may receive a response message (e.g., the ATTACH ACCEPT or TAU ACCEPT message) corresponding to the request message from the MME.

At step S1070, the UE that receives the response message may perform an RRC connection release process.

At step S1075, the UE that releases the RRC connection may operate by applying the second DRX (eDRX).

For this, at step S1080, the UE may derive the second DRX cycle (T') and the first DRX cycle (T) by using the above-described method, and then determine the PHF and the PF. This step may be performed before the RRC connection release.

In addition, at step S1085, the UE may attempt to receive the paging message thereof at the paging reception timing indicated by the determined PHF and PF.

Meanwhile, if the eNB does not broadcast the second DRX-related first information and the paging-related second parameter (nB') at step S1030, the UE may perform only the first DRX (typical DRX) process at step S1090.

Figure 11:
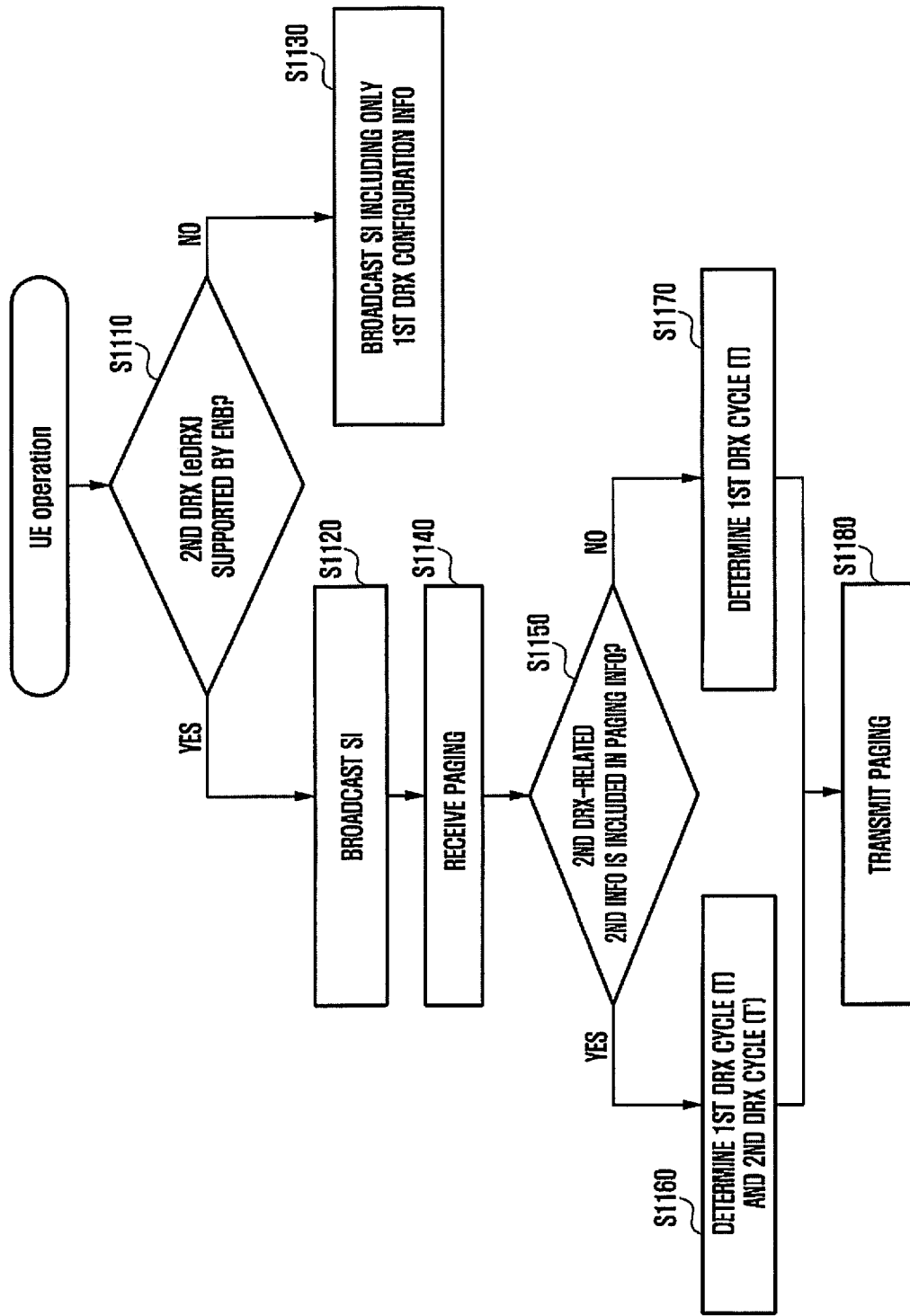
FIG. 11 is a diagram illustrating an eNB operation according to the second method of the first embodiment of the present invention.

FIG. 11 is a diagram illustrating an eNB operation according to the second method of the first embodiment of the present invention.

Referring to FIG. 11, at step S1110, the eNB may determine whether all the eNBs and MMEs forming its own TA support the second DRX (eDRX).

At step S1120, the eNB may broadcast system information. If all the eNBs and MMEs support the second DRX, the eNB may broadcast, to the UE, the system information including the second DRX-related first information and the paging-related second parameter (nB') as well as the first DRX-related first information and the paging-related first parameter which are the first DRX (typical DRX) configuration information.

If all the eNBs and MMEs do not support the second DRX, the eNB may broadcast the system information including only the first DRX (typical DRX) configuration information at step S1130. If the eNB does not support the second DRX, the eNB may operate according to the first DRX as described with reference to FIG. 4, and a detailed description will be omitted.

If all the eNBs and MMEs support the second DRX, the eNB may receive paging for the UE from the MME at step S1140.

At step S1150, the eNB that receives the paging may determine whether the paging information includes the second DRX-related second information (the UE specific eDRX value).

If the paging information includes the second DRX-related second information, the eNB may determine at step S1160 the first DRX cycle (T) by selecting a smaller value between the first DRX-related first information (the default DRX) and the first DRX-related second information (the UE specific DRX value). In addition, the eNB may select, as the second DRX cycle, the second DRX-related second information included in the paging information.

Alternatively, the eNB may determine the second DRX (eDRX) cycle (T') by selecting a smaller value (or larger value) between the second DRX-related first information and the second DRX-related second information (the UE specific eDRX value).

If the paging information does not include the second DRX-related second information, the eNB may determine at step S1170 the first DRX cycle (T) by selecting a smaller value between the first DRX-related first information (the default DRX) and the first DRX-related second information (the UE specific DRX value).

Thereafter, at step S1180, the eNB may transmit the paging by calculating the PHF, PF, and PO based on at least one of the second DRX cycle information (T') and the first DRX cycle information (T). That is, if the second DRX-related second information is not included in the paging information received from the MME, the eNB may transmit the paging by using only the first DRX cycle information. Also, if the second DRX-related second information is included in the paging information received from the MME, the eNB may transmit the paging based on the second DRX cycle information (T') and the first DRX cycle information (T).

Specifically, when the second DRX cycle arrives, the eNB may repeatedly transmit the paging in a specific period (PTW) according to the first DRX cycle. At this time, even when the second DRX cycle arrives, the starting point of the first DRX cycle may be changed depending on the UE.

Figure 12:
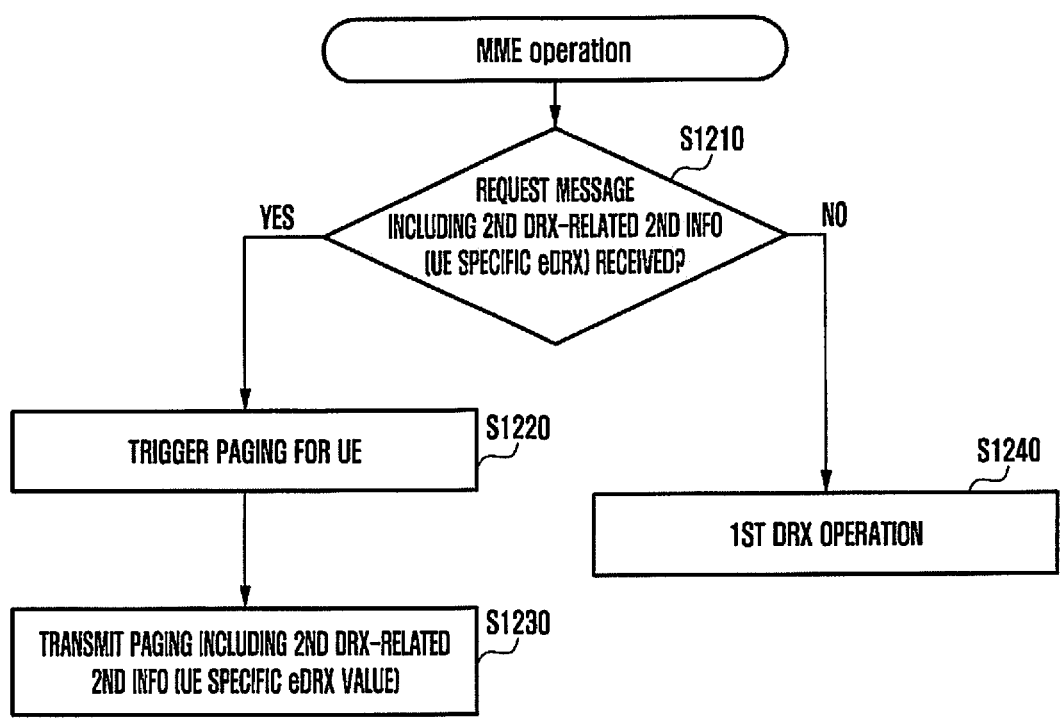
FIG. 12 is a diagram illustrating an MME operation according to the second method of the second embodiment of the present invention.

FIG. 12 is a diagram illustrating an MME operation according to the second method of the second embodiment of the present invention.

Referring to FIG. 12, the MME may receive a request message from the UE. At step S1210, the MME may determine whether the request message (the ATTACH REQUEST or TAU REQUEST message) including the second DRX-related second information (the UE specific eDRX) is received from the UE.

If the request message including the second DRX-related second information is received, the paging for the UE may be triggered at step S1220.

When the paging is triggered, the MME may further provide the second DRX-related second information (the UE specific eDRX value) together with the paging to the eNB at step S1230. That is, the MME may transmit the paging including the second DRX-related second information to the eNB.

If the second DRX-related second information (the UE specific eDRX value) is not received from the UE, or if the MME does not support the second DRX (eDRX), the MME may perform an operation according to the first DRX at step S1240. That is, the MME may transmit the response message to the UE and transmit the paging message including the first DRX-related second information to the eNB.

Figure 13:
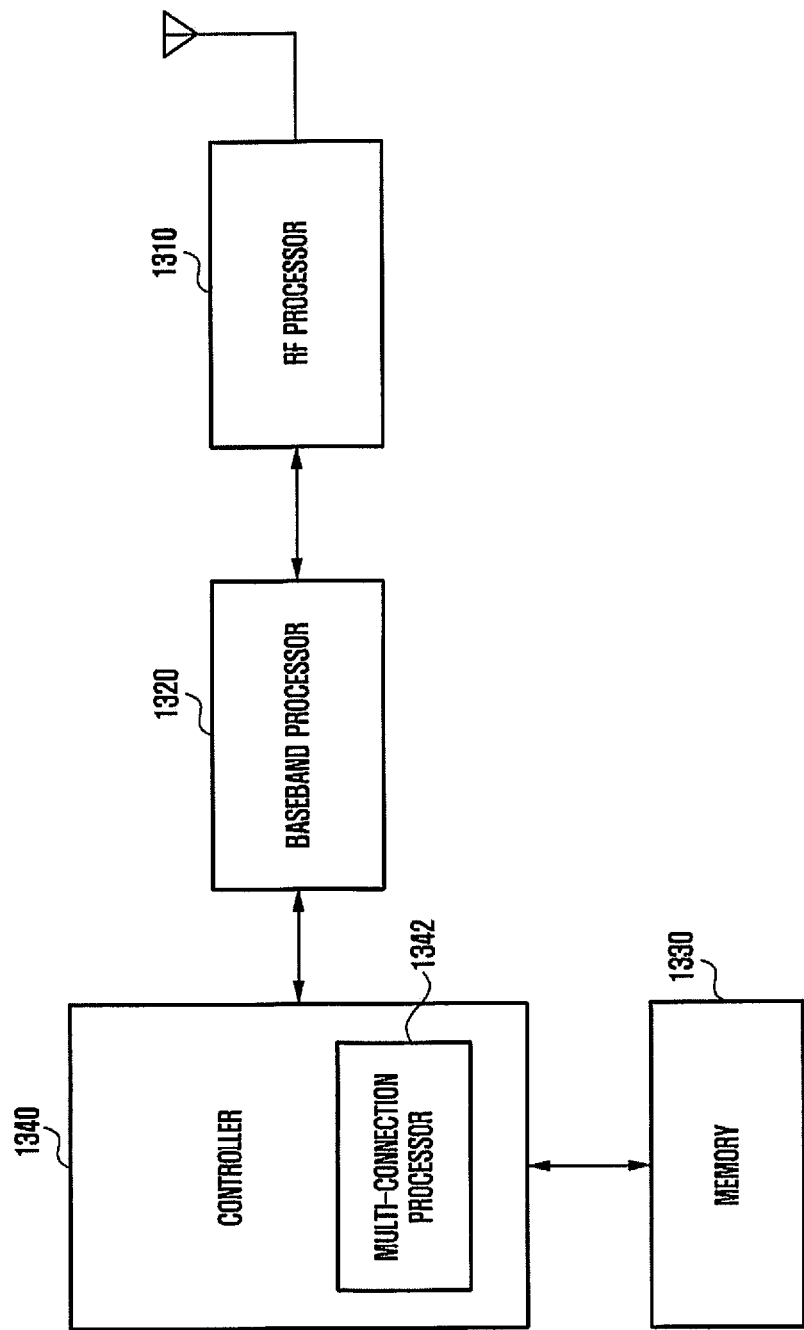
FIG. 13 illustrates a configuration of UE according to the present invention.

FIG. 13 illustrates a configuration of UE according to the present invention.

Referring to FIG. 13, the UE may include a radio frequency (RF) processor 1310, a baseband processor 1320, a storage 1330, and a controller 1340.

The RF processor 1310 may perform a function, such as band conversion and amplification of a signal, for transmitting and receiving the signal through a wireless channel. That is, the RF processor 1310 may up-convert a baseband signal provided from the baseband processor 1320 into an RF band signal to transmit the RF band signal through an antenna, and also down-convert an RF band signal received through the antenna into a baseband signal. For example, the RF processor 1310 may include a transmitter filter, a receiver filter, an amplifier, a mixer, an oscillator, a digital to analog converter (DAC), an analog to digital converter (ADC), and the like. Although FIG. 13 shows only one antenna, the UE may have a plurality of antennas. In addition, the RF processor 1310 may include a plurality of RF chains. Further, the RF processor 1310 may perform beamforming. For the beamforming, the RF processor 810 may adjust the phase and size of signals transmitted and received through a plurality of antennas or antenna elements.

The baseband processor 1320 may perform a conversion function between a baseband signal and a bit stream in accordance with a physical layer standard of the system. For example, in data transmission, the baseband processor 1320 may create complex symbols by encoding and modulating transmission bit streams. Also, in data reception, the baseband processor 1320 may restore reception bit streams by demodulating and decoding a baseband signal provided from the RF processor 1310. In case of complying with orthogonal frequency division multiplexing (OFDM) scheme, in data transmission, the baseband processor 1320 may generate complex symbols by encoding and modulating transmission bit streams, map the complex symbols to subcarriers, and construct OFDM symbols through an inverse fast Fourier transform (IFFT) operation and a cyclic prefix (CP) insertion. In addition, in data reception, the baseband processor 1320 may divide a baseband signal provided from the RF processor 1310 into OFDM symbol units, restore signals mapped to subcarriers through a fast Fourier transform (FFT) operation, and restore reception bit streams through demodulation and decoding.

The baseband processor 1320 and the RF processor 1310 may transmit and receive a signal as described above. Accordingly, the baseband processor 1320 and the RF processor 1310 may be referred to as a transmitting unit, a receiving unit, a transceiver, or a communication unit. In addition, at least one of the baseband processor 820 and the RF processor 1310 may include a plurality of communication modules to support a plurality of different wireless access technologies. Also, at least one of the baseband processor 1320 and the RF processor 1310 may include different communication modules for processing signals of different frequency bands. For example, the different wireless access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 1330 may store a basic program for the operation of the UE, an application program, and data such as setting information. In particular, the storage 1330 may store information associated with a second access node that performs wireless communication by using a second wireless access technology. Also, the storage 1330 may provide the stored data in response to a request of the controller 1340.

The controller 1340 may control overall operations of the UE. For example, the controller 1340 may transmit and receive a signal through the baseband processor 1320 and the RF processor 1310. Also, the controller 1340 writes and read data to and from the storage 1340. For this, the controller 1340 may include at least one processor. For example, the controller 1340 may include a communication processor (CP) for perform the control for communication and an application processor (AP) for controlling an upper layer such as an application program. According to an embodiment of the present invention, the controller 1340 may control the UE to perform the above-described operations and procedures of the UE.

Specifically, the controller 1340 may acquire system information from the eNB. Also, the controller 1340 may identify whether the second DRX configuration information is included in the system information. That is, the controller 1340 may determine whether the second DRX-related first information and the paging-related second parameter (the nB' value) are included in the system information.

Also, the controller 1340 may perform an RRC connection establishment process. In addition, the controller 1340 may transmit a request message. The request message may include, for example, an attach request message or a TAU request message. The controller 1340 may include the first DRX-related second information and the second DRX-related second information in the request message to be transmitted to the MME.

In addition, the controller 1340 may receive a response message (e.g., an ATTACH ACCEPT or TAU ACCEPT message) corresponding to the request message.

The controller 1340 may determine whether the second DRX-related third information (the allowed eDRX parameter) is included in the response message. The second DRX-related third information (the allowed eDRX parameter) may include information indicating whether the MME supports the second DRX (eDRX), or the second DRX cycle information (the eDRX cycle information) having to be applied by the UE. However, according to the second method for broadcasting the second DRX configuration information at the eNB only when all the eNBs and MMEs forming one TA support the second DRX, the controller 1340 may omit a process of determining whether the second DRX-related third information is included.

The controller 1340 may perform an RRC connection release process. The controller 1340 that releases the RRC connection may operate by applying the second DRX (eDRX).

Specifically, using the above-described method, the controller 1340 may derive the second DRX cycle (T') and the first DRX cycle (T) and then determine the PHF and the PF. This step may be performed previously before the RRC connection release.

In addition, the controller 1340 may attempt to receive the paging message thereof at the paging reception timing indicated by the determined PHF and PF.

On the other hand, if the eNB does not broadcast the second DRX-related first information and the paging-related second parameter (nB'), or if the MME does not transmit the second DRX-related third information (the allowed eDRX parameter, the controller may perform only the first DRX (typical DRX) process.

Figure 14A:
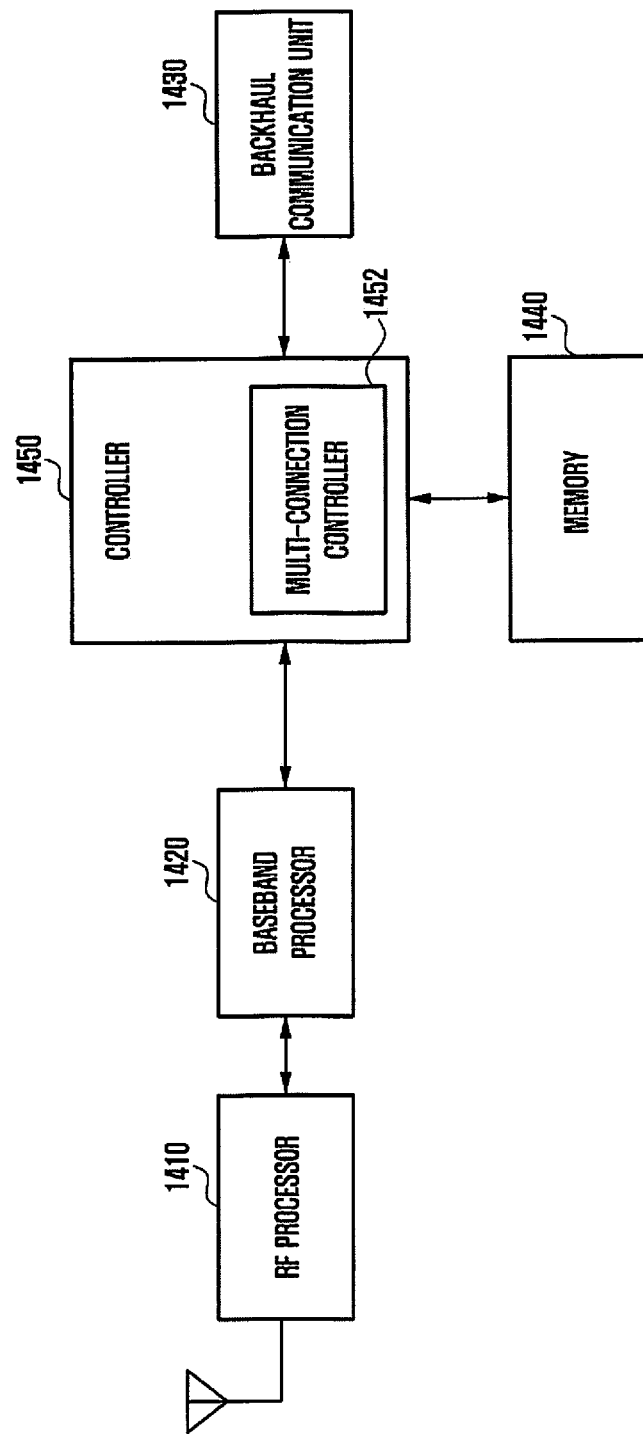
FIG. 14A illustrates a block configuration of eNB according to the present invention.

FIG. 14A illustrates a block configuration of eNB according to the present invention.

As shown in FIG. 14A, the eNB may include an RF processor 1410, a baseband processor 1420, a backhaul communication unit 1430, a storage 1440, and a controller 1450.

The RF processor 1410 may perform a function, such as band conversion and amplification of a signal, for transmitting and receiving the signal through a wireless channel. That is, the RF processor 1410 may up-convert a baseband signal provided from the baseband processor 1420 into an RF band signal to transmit the RF band signal through an antenna, and also down-convert an RF band signal received through the antenna into a baseband signal. For example, the RF processor 1410 may include a transmitter filter, a receiver filter, an amplifier, a mixer, an oscillator, a DAC, an ADC, and the like. Although FIG. 9 shows only one antenna, the first access node may have a plurality of antennas. In addition, the RF processor 1410 may include a plurality of RF chains. Further, the RF processor 1410 may perform beamforming. For the beamforming, the RF processor 1410 may adjust the phase and size of signals transmitted and received through a plurality of antennas or antenna elements.

The baseband processor 1420 may perform a conversion function between a baseband signal and a bit stream in accordance with a physical layer standard of the first wireless access technology. For example, in data transmission, the baseband processor 1420 may create complex symbols by encoding and modulating transmission bit streams. Also, in data reception, the baseband processor 1420 may restore reception bit streams by demodulating and decoding a baseband signal provided from the RF processor 1410. In case of complying with OFDM scheme, in data transmission, the baseband processor 1420 may generate complex symbols by encoding and modulating transmission bit streams, map the complex symbols to subcarriers, and construct OFDM symbols through an IFFT operation and a CP insertion. In addition, in data reception, the baseband processor 1420 may divide a baseband signal provided from the RF processor 1410 into OFDM symbol units, restore signals mapped to subcarriers through an FFT operation, and restore reception bit streams through demodulation and decoding. The baseband processor 1420 and the RF processor 1410 may transmit and receive a signal as described above. Thus, the baseband processor 1420 and the RF processor 1410 may be referred to as a transmitting unit, a receiving unit, a transceiver, a communication unit, or a wireless communication unit.

The backhaul communication unit 1430 may provide an interface for performing communication with other node in the network. That is, the backhaul communication unit 1430 may convert a bit stream transmitted from the main eNB to another node, e.g., a sub-eNB, a core network, etc., into a physical signal, and may also convert a physical signal received from such other node into a bit stream.

The storage 1440 may store a basic program for the operation of the main eNB, an application program, and data such as setting information. In particular, the storage 1440 may store information on a bearer allocated to connected UE, a measurement result reported from the connected UE, and the like. In addition, the storage 940 may store information for determining whether to provide or suspend multiple connections to or from the UE. Also, the storage 1440 may provide the stored data in response to a request of the controller 1450.

The controller 1450 may control overall operations of the main eNB. For example, the controller 1450 may transmit and receive a signal through the baseband processor 1420 and the RF processor 1410 or through the backhaul communication unit 1430. Also, the controller 1450 writes and reads data to and from the storage 1440. For this, the controller 1450 may include at least one processor. According to an embodiment of the present invention, the controller 1450 may include a multi-connection controller 1452 for performing control for providing multiple connections to the UE. For example, the controller 1450 may control the eNB to perform the above-described operations and procedures.

Specifically, the controller 1450 may determine whether the eNB supports the second DRX.

The controller 1450 may broadcast system information. If the eNB supports the second DRX, the controller 1450 may broadcast, to the UE, the system information including the second DRX-related first information and the paging-related second parameter (nB') as well as the first DRX-related first information and the paging-related first parameter which are the first DRX configuration information.

On the other hand, according to the second method, in case where all the eNBs and MMEs forming the TA to which the eNB belongs support the second DRX (eDRX), the controller 1450 may broadcast the system information including the second DRX configuration information.

If the eNB does not support the second DRX, the controller 1450 may broadcast the system information including only the first DRX configuration information. If the eNB does not support the second DRX, the controller 1450 may operate according to the first DRX.

If the eNB supports the second DRX, the controller 1450 may receive paging for specific UE from the MME.

In addition, the controller 1450 may determine whether the paging information includes the second DRX-related third information (the allowed eDRX parameter).

If the paging information includes the second DRX-related third information, the controller 1450 may determine the first DRX cycle (T) by selecting a smaller value between the first DRX-related first information (the default DRX) and the first DRX-related second information (the UE specific DRX value). In addition, the controller 1450 may select, as the second DRX cycle, the second DRX cycle information indicated by the second DRX-related third information included in the paging information.

Alternatively, the controller 1450 may determine the second DRX (eDRX) cycle (T') by selecting a smaller value (or larger value) between the second DRX-related first information and the second DRX-related third information (the allowed eDRX parameter) received from the MME.

If the paging information does not include the second DRX-related third information, the controller 1450 may determine the first DRX cycle (T) by selecting a smaller value between the first DRX-related first information (the default DRX) and the first DRX-related second information (the UE specific DRX value).

On the other hand, according to the second method, the controller 1450 may determine whether the second DRX-related second information is included in a paging message. Therefore, if the second DRX-related second information is included in the paging message, the controller 1450 may select, as the second DRX cycle, the second DRX-related second information. Alternatively, the controller 1450 may determine the second DRX (eDRX) cycle (T') by selecting a smaller value (or larger value) between the second DRX-related first information and the second DRX-related second information (the UE specific eDRX value). Also, the controller 1450 may determine the first DRX cycle (T) by selecting a smaller value between the first DRX-related first information (the default DRX) and the first DRX-related second information (the UE specific DRX value).

Thereafter, the controller 1450 may transmit the paging by calculating the PHF, PF, and PO based on at least one of the second DRX cycle (T') and the first DRX cycle (T). That is, if the second DRX-related third information (in case of the first method) or the second DRX-related second information (in case of the second method) is not included in the paging information received from the MME, the controller 1450 may transmit the paging by using only the first DRX cycle. Also, if the second DRX-related third information (in case of the first method) or the second DRX-related second information (in case of the second method) is included in the paging information received from the MME, the controller 1450 may transmit the paging based on the second DRX cycle (T') and the first DRX cycle (T). Specifically, when the second DRX cycle arrives, the controller 1450 may repeatedly transmit the paging in a specific period (PTW) according to the first DRX cycle. At this time, even when the second DRX cycle arrives, the starting point of the first DRX cycle may be changed depending on the UE.

Figure 14B:
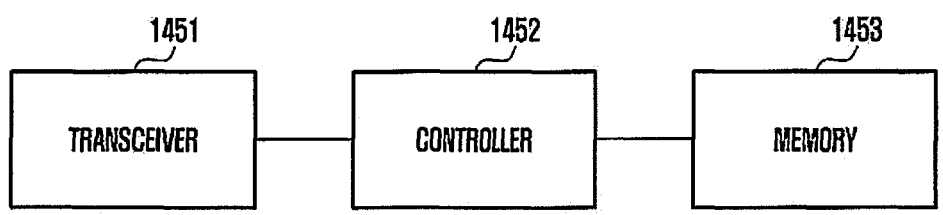
FIG. 14B is a diagram illustrating a configuration of an MME according to an embodiment of the present invention.

FIG. 14B is a diagram illustrating a configuration of an MME according to an embodiment of the present invention.

Referring to FIG. 14B, the MME may include a transceiver 1470, a controller 1471, and a storage 1472.

The transceiver 1470 may transmit and receive a signal to and from other network entity. The transceiver 1470 may receive a request message from the UE, transmit a response message to the UE, and transmit a paging message to the eNB.

The controller 1471 may receive a request message from the UE. The controller 1471 may determine whether the request message (the ATTACH REQUEST or TAU REQUEST message) including the second DRX-related second information (the UE specific eDRX) is received from the UE.

If the request message including the second DRX-related second information is received, the controller 1471 may determine whether the MME can support the second DRX (eDRX).

However, in case of the second method, the controller 1471 may omit the above step.

The controller 1471 may transmit a response message to the UE. At this time, the controller 1471 may include the second DRX-related third information (the allowed eDRX parameter) in the response message and transmit it to the UE. Alternatively, in case of the second method, the controller 1471 may include the second DRX-related second information in the response message and transmit it to the UE.

In addition, when the paging is triggered, the controller 1471 may further provide the second DRX-related third information (the allowed eDRX parameter) together with the paging to the eNB. That is, the controller 1471 may transmit the paging including the second DRX-related third information to the eNB. Alternatively, in the second method, the controller 1471 may further provide the second DRX-related second information (the UE specific eDRX value) together with the paging to the eNB. That is, the controller 1471 may transmit the paging including the second DRX-related second information to the eNB.

If the second DRX-related third information (in case of the first method) or the second DRX-related second information (in case of the second method) is not received from the UE, or if the MME does not support the second DRX (eDRX), the controller 1471 may perform an operation according to the first DRX. That is, the controller 1471 may transmit the response message to the UE and transmit the paging message including the first DRX-related second information to the eNB.

Meanwhile, in case where the UE operates according to the second DRX having the second DRX cycle, a problem may occur when the system information is changed. Specifically, a modification period (MP) may be set in the UE that operates in the DRX mode. If the system information is updated in the (m+1)-th MP, the eNB may notify a change of the system information to the UE in the preceding MP through a paging message. However, in case of the second DRX, the cycle of DRX may be extended and thus be longer than the maximum value of the MP, and the UE may not receive the paging in the preceding MP. Therefore, a method for notifying whether the system information is changed is needed.

Second Embodiment

Figure 15:
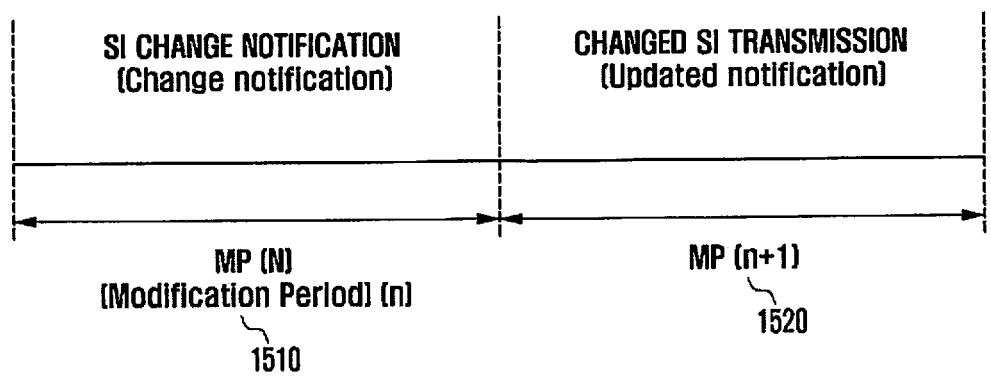
FIG. 15 is a diagram illustrating a process of changing system information.

FIG. 15 is a diagram illustrating a process of changing system information.

The system information broadcasted by the eNB may be changed, based on a modification period (MP). Excepting some system information, the eNB may broadcast newly changed system information from a start point of each MP. Also, in the MP before the newly changed system information is broadcasted, the eNB may notify the UEs that the changed system information will be broadcasted from the next MP. For example, if the changed system information is broadcasted from the (n+1)-th MP 1520, the eNB may notify, in the preceding n-th MP, the UEs that the system information will be changed from the next MP.

Using the paging message, the eNB may notify whether the system information is changed. In order to check whether the system information is changed, the UE should receive the paging at least once within the MP. If a system information change indicator (systemInfoModification IE) is included in the paging message, it means that newly updated system information will be transmitted from the next period of the MP in which the paging is transmitted. For example, the system information change indicator may be formed of one bit.

Excepting some system information, when the system information is changed, the eNB may increase, by one, system information change related information (hereinafter, systemInfoValueTag, valuetag, etc., may be used alternatively) included in the SIB1. The system information change related information (systemInfoValueTag) may be used for the UE, which camps on again from the out-of-coverage state, to determine whether the system information stored therein is identical with the system information currently being broadcasted. Using the paging message or the systemInfoValueTag of the SIB1, the UE may determine whether the system information is changed.

However, if the DRX cycle is extended longer than the maximum value of the MP so as to reduce power consumption, the UE may not receive the paging within the MP. In this case, the UE cannot check whether the system information is newly updated. In addition, when the system information is changed, the UE may not receive the paging message because the configuration information for the paging message is changed. Therefore, a method for solving this problem is needed.

This embodiment is characterized in that, for the second DRX (eDRX) UE, depending on the type of the system information, a method for including the system information change indicator in the paging and notifying it to the UE is applied in case of the update of the specific system information, and a method for checking (on-demand SIB1 checking) the update of the other system information by using the system information change related information is applied.

In the present invention, the UE that operates in the first DRX mode may be notified of the change of the system information through a first system information change indicator (systemInfoModification-DRX), and the UE that operates in the second DRX mode may be notified of the change of the system information through a second system information change indicator (systemInfoModification-eDRX).

Specifically, if the first system information is updated in the (m+1)-th MP, the paging message may be transmitted through all available PFs and POs of all available PHFs after the (m+1)-th MP. If the second system information is updated in the (m+1)-th MP, the eNB does not transmit a separate paging message for the second DRX (eDRX) UE. In this case, when the UE triggers the RRC connection, the UE may check the system information change related information (ValueTag information) contained in the SIB1 and thereby determine whether the system information is updated. As described above, the PO refers to a subframe for transmitting the paging message in the PF. The eNB may transmit the paging message in the PO of the corresponding PF. In the present invention, it may be represented that the paging message is transmitted in the PF and PO, in the PF/PO, in the PF, or in the PO.

In the present invention, the system information (SI) necessary for receiving the paging message at the UE may be defined as first system information. When the paging message is used to indicate whether the SI is updated, a messaging message should be transmitted for a long time. Therefore, in order to reduce the signaling overhead caused by this, most update of the SI complies with a method for using the system information change related information when the RRC connection of the UE is triggered.

However, in order to determine whether an RRC connection establishment is performed, the UE should be able to receive the paging message at a minimum. Therefore, only when the system information necessary for receiving the paging message is updated, this update may be notified to the UE through the paging message. In the present invention, system information other than the first system information may be defined as the second system information.

The first system information may include system information related to reception of the paging message and to mobility. For example, the first system information may include cell access related information (CellAccessRelatedInfo), paging control channel configuration information (PCCH-config), cell list information (intraFreqNeighCellList), and the like. The second system information may include system information related to the RRC connection configuration, for example, access barring configuration information (AC-BarringConfig), random access control channel configuration information (RACH-config), and the like.

Details of the first system information and the second system information will be described later.

When the first system information is updated in the (m+1)-th MP, the eNB may transmit the paging message through all available Pos of all available PFs in the m-th MP for the first DRX (typical DRX) UE. In addition, for the second DRX (eDRX) UE, the eNB may transmit the paging message through all available POs of all available PFs in all available PHFs after the MP [m+1].

In this case, DRX parameters (configurable parameter) may be introduced to control the number of available PHFs, available PFs, and available POs. In the DRX parameters, the parameter for the first DRX (typical DRX) and the parameter for the second DRX (eDRX) may be configured independently. Therefore, the PF and PO for the first DRX (typical DRX) and the PF and PO for the second DRX (eDRX) may be configured in different radio frames or subframes.

The DRX parameters (configurable parameter) may include the paging-related first parameter (nB). In the present invention, the paging-related first parameter (nB) for typical PF and PO, the paging-related second parameter (nB') for the PF and PO applied to the second DRX (eDRX), and the paging-related third parameter (nB") for the PHF may be defined individually. In the present invention, one of the following signaling options may be used.

Case 1: The eNB may transmit the paging-related first parameter (nB) and the first DRX-related first information (default DRX cycle) through the SIB2 and also transmit the second DRX-related first information through the SIBx.

Therefore, the UE may derive the PHF by using the paging-related first parameter (nB) and the first DRX-related first information (default DRX cycle) and also derive the PF and PO by using the paging-related first parameter (nB) and the first DRX-related first information (default DRX cycle).

The case 1 is characterized by applying the same paging-related first parameter (nB) to the first DRX (typical DRX) and the second DRX (eDRX), and has a disadvantage of being incapable of optimizing the number of PHFs.

Case 2-1: The eNB may transmit the paging-related first parameter (nB) and the first DRX-related first information (default DRX cycle) through the SIB2, and also transmit the paging-related second parameter (nB') and the second DRX-related first information through the SIBx.

Therefore, the UE may derive the PHF by using the paging-related second parameter (nB') and the second DRX-related first information. Also, the UE may derive the PF and PO by using the paging-related first parameter (nB) and the first DRX-related first information (default DRX cycle).

Accordingly, in the case 2-1, it is possible to optimize the number of PHFs by appropriately adjusting the paging-related second parameter (nB' value). However, it is impossible to optimize the number of PFs.

Case 2-2: The eNB may transmit the paging-related first parameter (nB) and the first DRX-related first information (default DRX cycle) through the SIB2, and also transmit the paging-related second parameter (nB') and the second DRX-related first information through the SIBx.

Therefore, the UE may derive the PHF by using the paging-related second parameter (nB') and the second DRX-related first information. Also, the UE may derive the PF and PO by using the paging-related second parameter (nB') and the first DRX-related first information (default DRX cycle for eDRX UE).

Accordingly, in the case 2-2, it is possible to optimize the number of PHFs and the number of PFs by appropriately adjusting the paging-related second parameter (nB' value). However, individual optimization is not possible.

Case 3: The eNB may transmit the paging-related first parameter (nB) and the first DRX-related first information (default DRX cycle) through the SIB2, and also transmit the paging-related second parameter (nB'), the paging-related third parameter (nB"), and the second DRX-related first information through the SIBx.

Therefore, the UE may derive the PHF by using the paging-related second parameter (nB') and the second DRX-related first information. Also, the UE may derive the PF and PO by using the paging-related third parameter (nB") and the first DRX-related first information (default DRX cycle for eDRX UE).

Accordingly, in the case 3, it is possible to optimize the number of PHFs by appropriately adjusting the paging-related second parameter (nB' value). Also, it is possible to optimize the number of PFs by appropriately adjusting the paging-related third parameter (nB" value).

When the second system information is updated in the (m+1)-th MP, the eNB may transmit the paging message through all available POs of all available PFs in the m-th MP for the first DRX (typical DRX) UE. However, the eNB may not transmit a separate paging message for the second DRX (eDRX) UE. Instead, when an actual RRC connection is required, the second DRX (eDRX) UE may acquire the MIB and the SIB1, check the system information change related information (systemInfoValueTag information) included in the SIB 1 to identify whether the system information is updated, and update the system information.

Figure 16A:
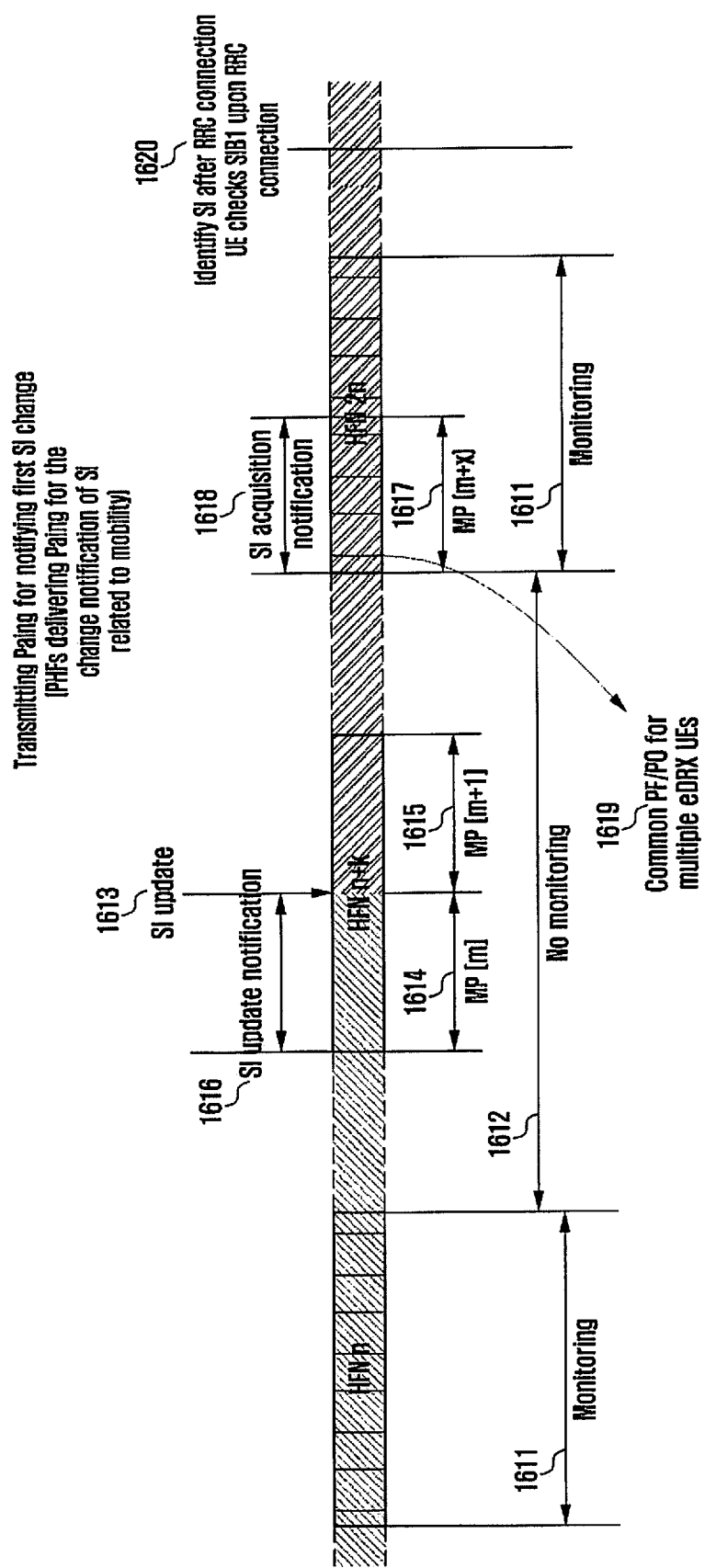
FIG. 16A is a diagram illustrating a method for notifying changed system information to UE according to a second embodiment of the present invention.

FIG. 16A is a diagram illustrating a method for notifying changed system information to UE according to a second embodiment of the present invention.

Referring to FIG. 16A, the UE that operates by applying the second DRX (eDRX) may perform paging monitoring only in a PHF 1611, based on a hyper SFN. In the PHF, the UE may receive paging in a PF and a PO derived by applying typical or separate DRX parameters.

Meanwhile, system information (SI) update 1613 may occur in a time interval 1612 other than the PHF. If the updated SI is broadcasted from the (m+1)-th MP 1615, the eNB may send SI update notification 1616 to the UEs in the m-th MP 1614 by using the paging.

However, the UE that applies the second DRX (eDRX) may not receive the paging because of being not the PHF in the corresponding time, and may not determine whether the SI is updated. Therefore, as described above, the eNB may operate differently depending on the type of the updated SI.

Specifically, when the first SI is updated, the eNB may transmit a paging message for notifying the first SI update in the extended MP. Specifically, during a certain period, e.g., the (m+x)-th MP 1617, in the upcoming PHF 1611 after the SI update, the eNB may transmit the paging 1618 for notifying the first SI update. At this time, the PF and PO 1619 in the PHF may be derived by applying typical or separate DRX parameters.

The first SI may include system information related to reception of the paging message and to mobility. For example, the first SI may include cell access related information (CellAccessRelatedInfo), paging control channel configuration information (PCCH-config), cell list information (intraFreqNeighCellList), and the like.

The reason to update the first SI as soon as possible by using the paging is that the UE being in an idle mode is related to the paging reception and mobility that should maintain the newest information.

Besides, the UE may check the system information change related information (ValueTag information) included in the SIB 1 before actually attempting the RRC connection, and thereby determine whether the second SI is updated. The second SI may include system information related to the RRC connection configuration, for example, access barring configuration information (AC-BarringConfig), random access control channel configuration information (RACH-config), and the like. The second SI need not maintain the newest information until the UE actually attempts the connection. Therefore, the eNB may notify the second SI update by using the SIB1 rather than using the paging.

The representative first SI is paging control channel configuration information (PCCH-config IE). This information may be included in the SIB2 and broadcasted.

The PCCH-config IE may include configuration information as shown in Table 1 below.

TABLE 1

| PCCH-Config ::= | SEQUENCE { |
| --- | --- |
| defaultPagingCycle | ENUMERATED { rf32, rf64, rf128, rf256), |
| nB | ENUMERATED { fourT, twoT, oneT, halfT, quarterT, oneEighthT, oneSixteenthT, oneThirtySecondT} |
| } | |
| PCCH-Config-v1310 ::= | SEQUENCE { |
| paging-narrowBands-r13 | INTEGER (1..maxAvailNarrowBands-r13), |
| mpdcch-NumRepetition-Paging-r13 | ENUMERATED {r1, r2, r4, r8, r16, r32, r64, r128, r256), |
| nB-v1310 | ENUMERATED {one64thT, one128thT, one256thT} OPTIONAL -- |
| Need OR | |
| } | |

The default paging cycle (defaultPagingCycle) may indicate a cell specific paging cycle. The paging-related first parameter (nB) is a variable used to derive the paging frame (PF).

In addition, in the machine type communication (MTC) technology, the eNB may repeatedly transmit a machine type physical downlink control channel (MPDCCH) for indicating paging and a paging message in a plurality of narrow bands, and related configuration information may be included in the PCH-config.

The paging-narrowband may be used to indicate the narrowband used for the paging, and the range of the paging-related first parameter (nB value) may be extended in consideration of repeated transmission.

Therefore, if a related cell supports the MTC, and if information of PCCH-Config-v1310 IE is changed, the present invention is characterized in that the eNB broadcasts a need of SI update by using the paging message.

In addition, when the subframe bitmap related information (fdd-DownlinkOrTddSubframeBitmapLC-r13) and the hopping related information (si-HoppingConfigCommon-r13) included in the SIB1 are changed, the present invention is characterized in that the eNB broadcasts a need of SI update by using the paging message.

The fdd-DownlinkOrTddSubframeBitmapLC-r13 may include subframe information that can be used by the UE that applies the MTC technology. Since the paging message delivered to the MTC UE is transmitted only in the subframe, this information is necessary for the UE to receive the paging message.

The si-HoppingConfigCommon-r13 may indicate whether the SI message and the paging message perform frequency hopping (frequency shift when transmitting a message). If there is no such information, the UE will have to perform blind decoding for all possible frequencies. Thus, this information is necessary for the UE to receive the paging message.

```
    bandwidthReducedAccessRelatedInfo-r13        SEQUENCE {
        si-WindowLength-BR-r13                      ENUMERATED {
                                                        ms20, ms40, ms60, ms80, ms120,
                                                        ms160, ms200, spare},
        si-RepetitionPattern-r13                    ENUMERATED {everyRF, every2ndRF, every4thRF,
                                                        every8thRF},
        schedulingInfoList-BR-r13                   SchedulingInfoList-BR-r13          OPTIONAL, --
Need OR
        fdd-DownlinkOrTddSubframeBitmapLC-r13       CHOICE (
            subframePattern10-r13                       BIT STRING (SIZE (10)),
            subframePattern40-r13                       BIT STRING (SIZE (40))
        }                                                                              OPTIONAL, --
Need OP
        fdd-UplinkSubframeBitmapLC-r13              BIT STRING (SIZE (10))             OPTIONAL, --
Need OP
        startSymbolLC-r13                           INTEGER (1..4),
        si-HoppingConfigCommon-r13                  ENUMERATED {on, off},
        si-ValidityTime-r13                         ENUMERATED {true}    OPTIONAL,                --
Need OP
        systemInfoValueTagList-r13                  SystemInfoValueTagList-r13         OPTIONAL  --
Need OR
    }                                                                    OPTIONAL,     -- Cond BW-
reduced
```

Figure 16B:
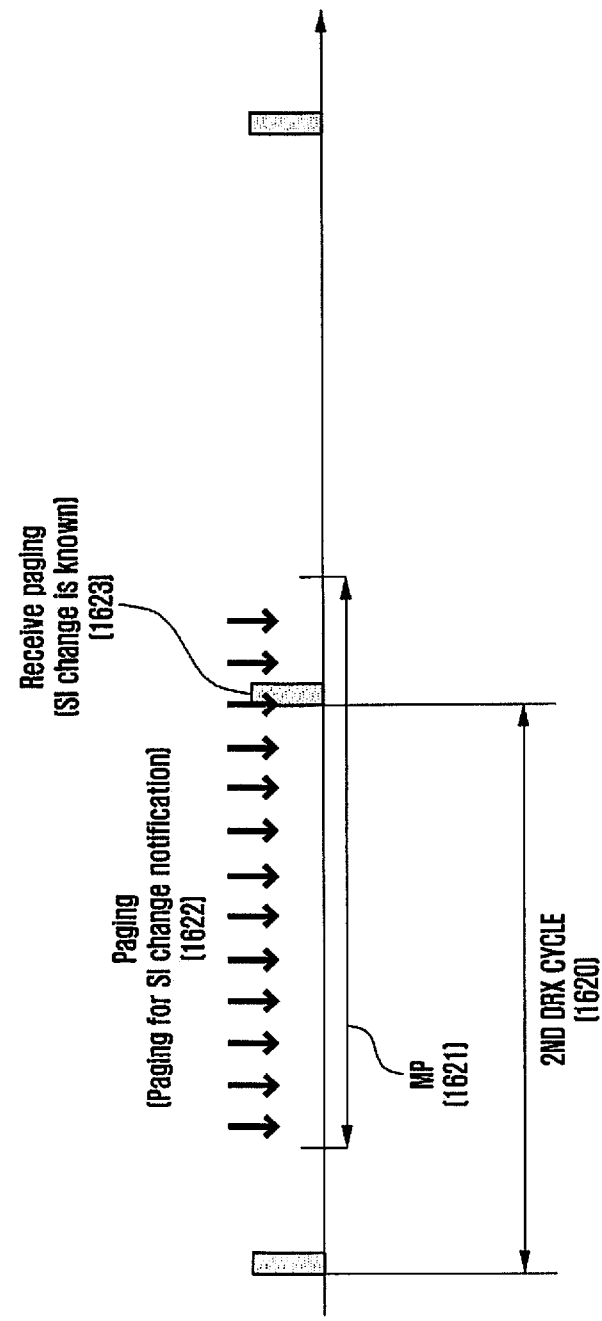
FIG. 16B is a diagram illustrating a modification period according to the second embodiment of the present invention.

FIG. 16B is a diagram illustrating a modification period according to the second embodiment of the present invention.

FIG. 16B is a diagram illustrating a method for extending the modification period (MP) so as to receive paging even when a very long DRX cycle is applied.

The MP may be extended so that at least one DRX timing is included in one MP 1621. That is, the MP 1621 may be set longer than the second DRX cycle 1620. In this case, the paging 1622 for SI change notification may be transmitted at the paging occasion during the extended MP, and the UE may receive it at least once 1623.

The MP value may be provided to the UE through SI (e.g., SIB2). Also, this MP may be operated separately from typical MP. Accordingly, when the MP is separately operated in the present invention, the typical MP may be referred to as the first MP, and the extended MP may be referred to as the second MP.

Figure 17:
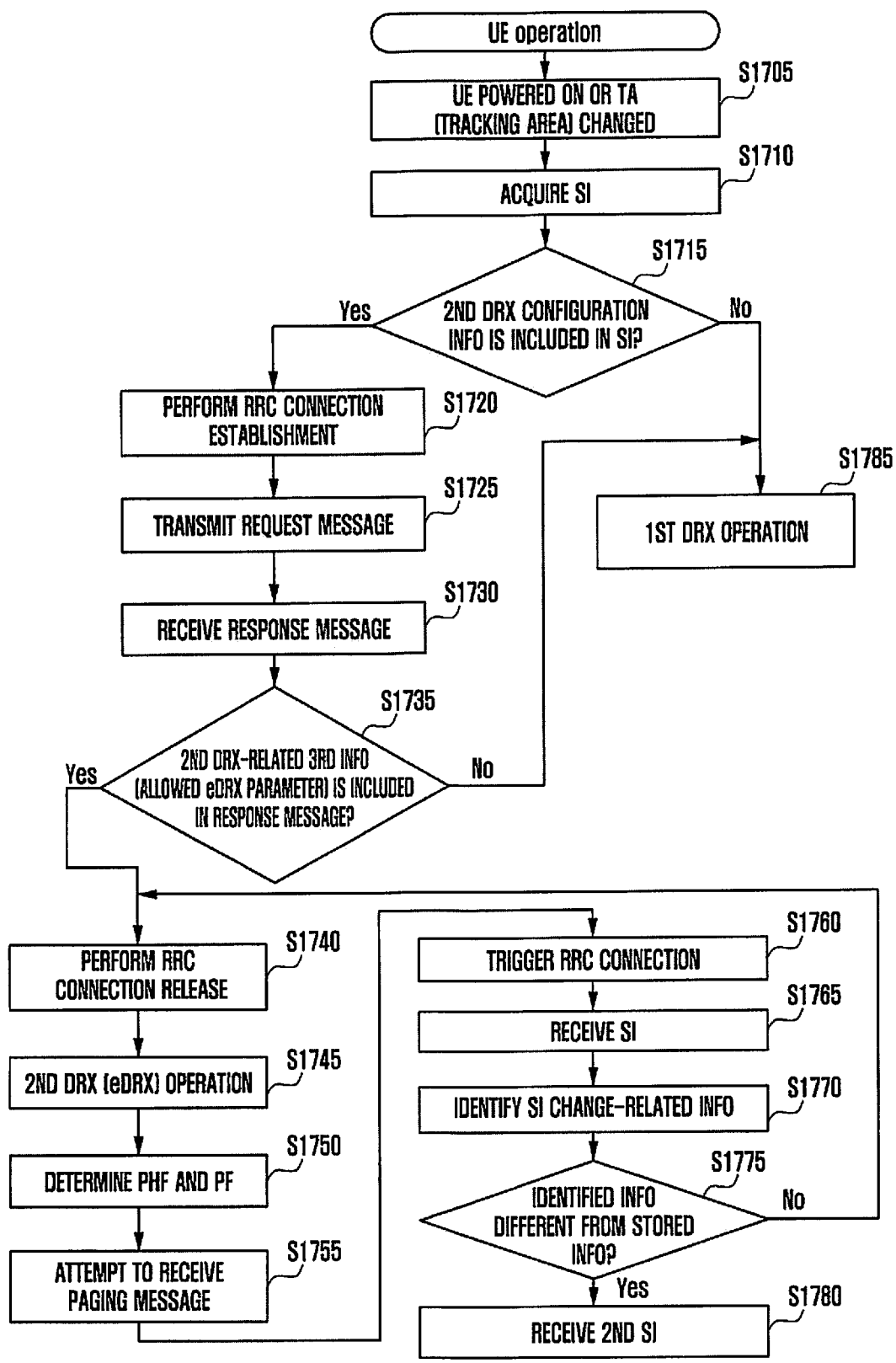
FIG. 17 is a diagram illustrating a UE operation according to the second embodiment of the present invention.

FIG. 17 is a diagram illustrating a UE operation according to the second embodiment of the present invention.

Referring to FIG. 17, at step S1705, the UE may be powered on, or the tracking area (TA) may be changed.

At step S1710, the UE may acquire system information from the eNB.

At step S1715, the UE that acquires the system information may identify whether the system information includes the second DRX configuration information. That is, the UE may determine whether the system information includes the second DRX-related first information and the paging-related second parameter (the nB' value).

Depending on cases described above, the second DRX configuration information (or the second DRX (eDRX) parameter value) included in the SIBx may be different. That is, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

If the second DRX-related first information and the paging-related second parameter (the nB' value) are included in the system information, the UE may perform an RRC connection establishment process at step S1720.

After the RRC connection is completed, the UE may transmit a request message to the MME at step S1725. If the UE prefers to apply the second DRX (eDRX) or if the UE supports the second DRX, the UE may include the first DRX-related second information (the UE specific DRX) and the second DRX-related second information (the UE specific eDRX value) in the request message (the ATTACH REQUEST or TAU REQUEST message) and transmit the request message to the MME. As described above, the first DRX-related second information may include the first DRX cycle information preferred by the UE, and the second DRX-related second information may include the second DRX cycle information preferred by the UE. The cycle information preferred by the UE may mean cycle information determined to be applied by the UE.

In addition, at step S1730, the UE may receive a response message (e.g., the ATTACH ACCEPT or TAU ACCEPT message) corresponding to the request message from the MME.

At step S1735, the UE that receives the response message may determine whether the second DRX-related third information (the allowed eDRX parameter) is included in the message. The second DRX-related third information (the allowed eDRX parameter) may include information indicating whether the MME supports the second DRX (eDRX), or the second DRX cycle information (the eDRX cycle information) having to be applied by the UE.

When the response message includes the second DRX-related third information, the UE may perform an RRC connection release process at step S1740.

At step S1745, the UE that releases the RRC connection may operate by applying the second DRX (eDRX).

For this, at step S1750, the UE may derive the second DRX cycle (T') and the first DRX cycle (T) by using the above-described method, and then determine the PHF and the PF. This step may be performed before the RRC connection release.

In addition, at step S1755, the UE may attempt to receive the paging message thereof at the paging reception timing indicated by the determined PHF and PF.

In this case, the modification period (MP) may be extended so that the paging message can be received even when a very long DRX cycle is applied to the second DRX. The MP may be extended so that at least one second DRX timing is included in one MP, and the UE may receive the paging at least once in the MP.

The paging message may include the second system information change indicator which is an indicator for notifying an update of the first system information.

If the paging message includes the second system information change indicator, the UE may receive the first system information being broadcasted currently.

Thereafter, the UE may trigger the RRC connection at step S1760.

After the RRC connection is triggered, the UE may sequentially receive the MIB and the system information (e.g., SIB1, SIBx) at step S1765.

At step S1770, the UE that receives the system information may identify the system information change related information (systemInfoValueTag or systemInfoValueTagExt value) in the SIB1.

At step S1775, the UE that identifies the system information change related information may determine whether the value of the identified information (IE) is different from the stored value.

If the identified information is not different from the information stored in the UE, the UE does not need to update the second system information.

On the other hand, the identified information is different from the information stored in the UE, the UE may receive at step S1780 the second system information being currently broadcasted by the eNB.

If the eNB does not broadcast the second DRX-related first information and the paging-related second parameter (nB') at step S1715, or if the MME does not transmit the second DRX-related third information (the allowed eDRX parameter) at step S1735, the UE may perform only the first DRX (typical DRX) process at step S1780.

Figure 18A:
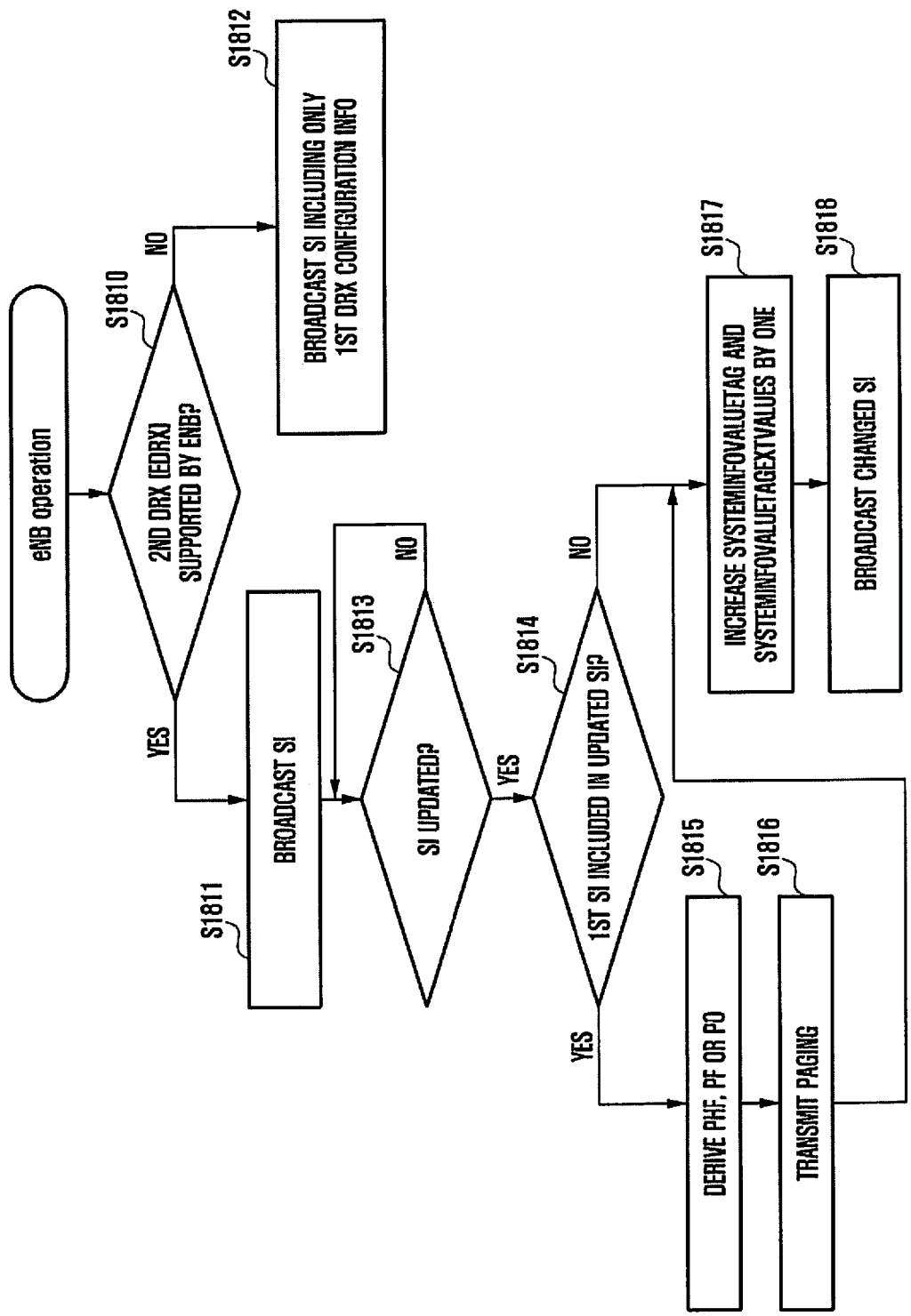
FIG. 18A is a diagram illustrating an eNB operation in the present invention.

FIG. 18A is a diagram illustrating an eNB operation in the present invention.

Referring to FIG. 18A, at step S1810, the eNB may determine whether the eNB supports the second DRX (eDRX).

At step S1811, the eNB may broadcast system information (SI). If the eNB supports the second DRX, the eNB may broadcast, to the UE, the SI including the second DRX-related first information and the paging-related second parameter (nB') as well as the first DRX-related first information and the paging-related first parameter which are the first DRX (typical DRX) configuration information.

Specifically, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

If the eNB does not support the second DRX, the eNB may broadcast the SI including only the first DRX (typical DRX) configuration information at step S1812. If the eNB does not support the second DRX, the eNB may operate according to the first DRX as described with reference to FIG. 4, and a detailed description will be omitted.

If the eNB supports the second DRX, the eNB may determine at step S1813 whether the SI is updated.

If the SI is updated, the eNB may determine at step S1814 whether the updated SI includes the first SI.

If the updated SI includes the first SI, the eNB may derive PHF, PF and PO at step S1815.

Thereafter, at step S1816, the eNB may transmit to the UE the paging message indicating whether the SI is updated. The eNB may transmit the paging message including the second SI change indicator indicating whether the SI is updated, based on the calculated PHF, PF and PO, to the UEs that operate by applying the second DRX (eDRX). That is, the eNB may transmit the paging message including the second SI change indicator to the UE at the paging occasion (PO) within the modification period (MP).

Thereafter, at step S1817, the eNB may increase the systemInfoValueTag and the second SI change related information (systemInfoValueTagExt) by one. Alternatively, the eNB may increase the value of the systemInfoValueTag by one and then, if wraparound occurs, increase the systemInfoValueTagExt by one.

Also, even when the updated SI is not included in the first SI (i.e., included in the second SI related to the RRC connection), the eNB may increase the values of the systemInfoValueTag and the systemInfoValueTagExt included in the SI change related information by one. Alternatively, the eNB may increase the value of the systemInfoValueTag by one and then, if wraparound occurs, increase the systemInfoValueTagExt by one.

Thereafter, at step S1818, the eNB may broadcast the SI (e.g., SIB1) including the changed SI change related information (IE value). The eNB may broadcast the updated SI from a specific time point (e.g., the time point when H-SFN mod 256=0).

Figure 18B:
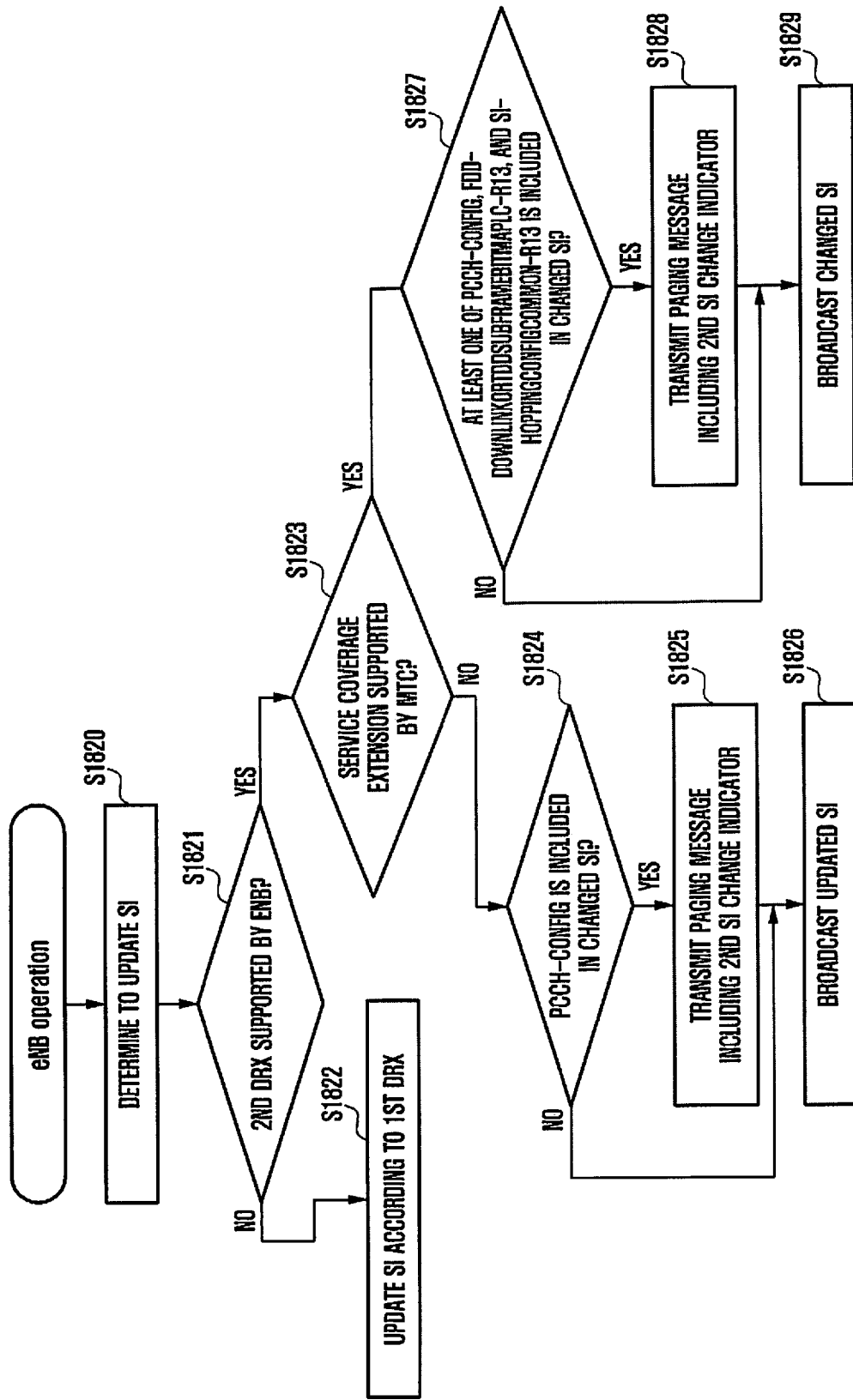
FIG. 18B is a diagram illustrating another eNB operation in the present invention.

FIG. 18B is a diagram illustrating another eNB operation in the present invention.

Referring to FIG. 18B, at step S1820, the eNB may determine to update the SI. At this time, the eNB may decide to update some or all of the SI.

At step S1821, the eNB may determine whether the eNB supports the second DRX (extended DRX cycle).

If the eNB does not support the second DRX, the eNB may perform the SI update according to the first DRX (typical technology) at step S1822.

On the other hand, if the eNB supports the second DRX, the eNB may determine at step S1823 whether the service coverage extension function is supported in the MTC technology.

If the eNB does not support the service coverage extension function in the MTC technology, the eNB may determine at step S1824 whether the changed SI includes at least paging control channel configuration information (PCCH-config).

If the changed SI includes the PCCH-config, the eNB may transmit at step S1825 the paging message or PDCCH including the second SI change indicator (or SI update indicator) to the UE in order to notify whether the SI is updated.

On the other hand, if the changed SI does not include the PCCH-config, the eNB may skip step S1825.

Thereafter, at step S1826, the eNB may broadcast the updated SI in the second DRX acquisition period. At this time, the eNB may broadcast the updated SI at the time point when the H-SFN mod 256=0 is satisfied.

Meanwhile, if the eNB supports the service coverage extension function in the MTC technology, the eNB may determine at step S1827 whether the changed SI includes at least one of the paging channel configuration information (pcch-config), the subframe bitmap related information (fdd-DownlinkOrTddSubframeBitmapLC-r13), and the hopping related information (si-HoppingConfigCommon-r13).

If at least one of the above information is included in the changed SI, the eNB may transmit at step S1828 the paging message or (M)PDCCH including the second SI change indicator (or SI update indicator) to the UE in order to notify whether the SI is updated.

However, if at least one of the above information is not included in the changed SI, the eNB may skip step S1828.

Thereafter, at step S1829, the eNB may broadcast the updated SI in the second DRX acquisition period. At this time, the eNB may broadcast the updated SI at the time point when the H-SFN mod 256=0 is satisfied.

Figure 19:
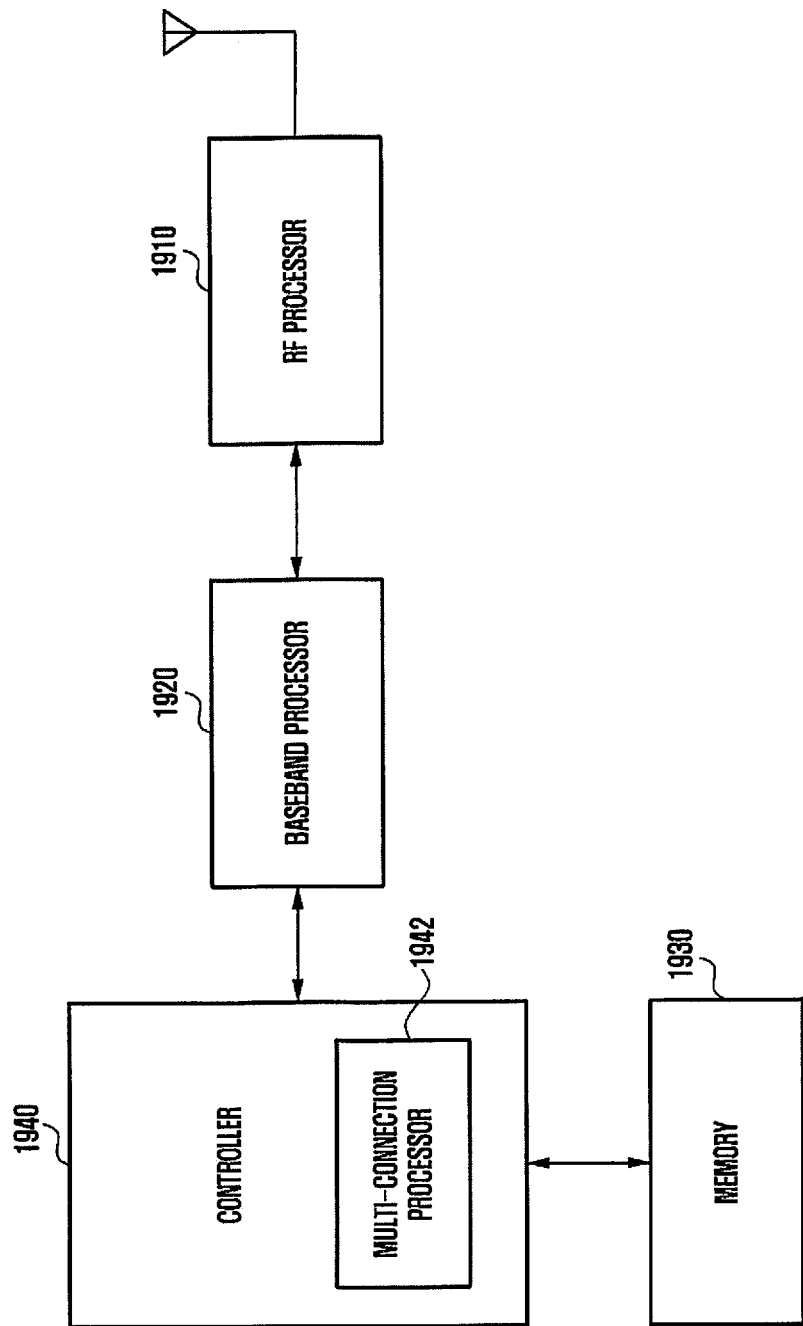
FIG. 19 illustrates a block configuration of UE according to the present invention.

FIG. 19 illustrates a block configuration of UE according to the present invention.

Referring to FIG. 19, the UE may include a radio frequency (RF) processor 1910, a baseband processor 1920, a storage 1930, and a controller 1940. The RF processor 1910 may perform a function, such as band conversion and amplification of a signal, for transmitting and receiving the signal through a wireless channel. That is, the RF processor 1910 may up-convert a baseband signal provided from the baseband processor 1920 into an RF band signal to transmit the RF band signal through an antenna, and also down-convert an RF band signal received through the antenna into a baseband signal. For example, the RF processor 810 may include a transmitter filter, a receiver filter, an amplifier, a mixer, an oscillator, a digital to analog converter (DAC), an analog to digital converter (ADC), and the like. Although the drawing shows only one antenna, the UE may have a plurality of antennas. In addition, the RF processor 810 may include a plurality of RF chains. Further, the RF processor 810 may perform beamforming. For the beamforming, the RF processor 810 may adjust the phase and size of signals transmitted and received through a plurality of antennas or antenna elements. The baseband processor 1920 may perform a conversion function between a baseband signal and a bit stream in accordance with a physical layer standard of the system. For example, in data transmission, the baseband processor 1920 may create complex symbols by encoding and modulating transmission bit streams. Also, in data reception, the baseband processor 1920 may restore reception bit streams by demodulating and decoding a baseband signal provided from the RF processor 1910. In case of complying with orthogonal frequency division multiplexing (OFDM) scheme, in data transmission, the baseband processor 1920 may generate complex symbols by encoding and modulating transmission bit streams, map the complex symbols to subcarriers, and construct OFDM symbols through an inverse fast Fourier transform (IFFT) operation and a cyclic prefix (CP) insertion. In addition, in data reception, the baseband processor 1920 may divide a baseband signal provided from the RF processor 1910 into OFDM symbol units, restore signals mapped to subcarriers through a fast Fourier transform (FFT) operation, and restore reception bit streams through demodulation and decoding. The baseband processor 1920 and the RF processor 1910 may transmit and receive a signal as described above. Accordingly, the baseband processor 1920 and the RF processor 1910 may be referred to as a transmitting unit, a receiving unit, a transceiver, or a communication unit. In addition, at least one of the baseband processor 1920 and the RF processor 1910 may include a plurality of communication modules to support a plurality of different wireless access technologies. Also, at least one of the baseband processor 1920 and the RF processor 1910 may include different communication modules for processing signals of different frequency bands. For example, the different wireless access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band. In addition, the storage 1930 may store a basic program for the operation of the UE, an application program, and data such as setting information. In particular, the storage 1930 may store information associated with an access node that performs wireless communication by using a second wireless access technology. Also, the storage 1930 may provide the stored data in response to a request of the controller 1940. The controller 1940 may control overall operations of the UE. For example, the controller 1940 may transmit and receive a signal through the baseband processor 1920 and the RF processor 1910. Also, the controller 1940 writes and read data to and from the storage 1940. For this, the controller 1940 may include at least one processor. For example, the controller 1940 may include a communication processor (CP) for perform the control for communication and an application processor (AP) for controlling an upper layer such as an application program. According to an embodiment of the present invention, the controller 1940 may control the UE to perform the above-described operations and procedures of the UE.

Specifically, the controller 1940 may acquire system information from the eNB. The controller 1940 may identify whether the system information includes the second DRX configuration information. That is, the UE may determine whether the system information includes the second DRX-related first information and the paging-related second parameter (the nB' value).

Depending on cases described above, the second DRX configuration information (or the second DRX (eDRX) parameter value) included in the SIBx may be different. That is, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

The controller 1940 may perform an RRC connection establishment process. After the RRC connection is completed, the controller 1940 may transmit a request message to the MME. If the UE prefers to apply the second DRX (eDRX) or if the UE supports the second DRX, the controller 1940 may include the first DRX-related second information (the UE specific DRX) and the second DRX-related second information (the UE specific eDRX value) in the request message and transmit the request message to the MME.

In addition, the controller 1940 may receive a response message corresponding to the request message from the MME.

The controller 1940 that receives the response message may determine whether the second DRX-related third information (the allowed eDRX parameter) is included in the message. The second DRX-related third information (the allowed eDRX parameter) may include information indicating whether the MME supports the second DRX (eDRX), or the second DRX cycle information (the eDRX cycle information) having to be applied by the UE.

When the response message includes the second DRX-related third information, the controller 1940 may perform an RRC connection release process.

The controller 1940 that releases the RRC connection may operate by applying the second DRX (eDRX).

For this, the controller 1940 may derive the second DRX cycle (T') and the first DRX cycle (T) by using the above-described method, and then determine the PHF and the PF. This step may be performed before the RRC connection release.

In addition, the controller 1940 may attempt to receive the paging message thereof at the paging reception timing indicated by the determined PHF and PF.

In this case, the modification period (MP) may be extended so that the paging message can be received even when a very long DRX cycle is applied to the second DRX. The MP may be extended so that at least one second DRX timing is included in one MP, and the UE may receive the paging at least once in the MP.

The paging message may include the second system information change indicator which is an indicator for notifying an update of the first system information.

If the paging message includes the second system information change indicator, the controller 1940 may receive the first system information being broadcasted currently.

Thereafter, the controller 1940 may trigger the RRC connection.

After the RRC connection is triggered, the controller 1940 may sequentially receive the MIB and the system information (e.g., SIB1, SIBx).

The controller 1940 may identify the system information change related information (systemInfoValueTag or systemInfoValueTagExt value) in the SIB1.

The controller 1940 may determine whether the value of the identified information (IE) is different from the stored value.

If the identified information is not different from the information stored in the UE, the controller 1940 does not need to update the second system information.

On the other hand, the identified information is different from the information stored in the UE, the controller 1940 may receive the second system information being currently broadcasted by the eNB.

If the eNB does not broadcast the second DRX-related first information and the paging-related second parameter (nB'), or if the MME does not transmit the second DRX-related third information (the allowed eDRX parameter), the controller 1940 may perform only the first DRX (typical DRX) process.

Figure 20:
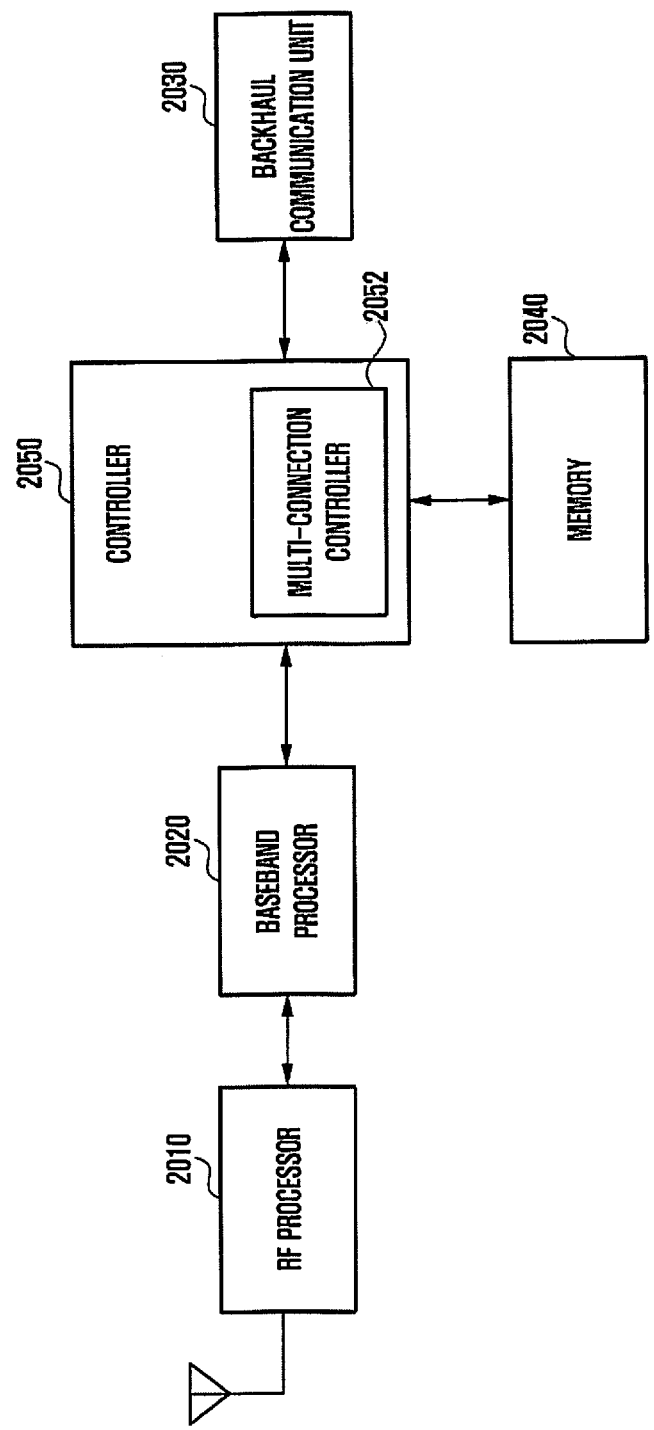
FIG. 20 is a diagram illustrating a configuration of eNB according to the present invention.

FIG. 20 is a diagram illustrating a configuration of eNB according to the present invention.

As shown in FIG. 20, the eNB may include an RF processor 2010, a baseband processor 2020, a backhaul communication unit 2030, a storage 2040, and a controller 2050. The RF processor 2010 may perform a function, such as band conversion and amplification of a signal, for transmitting and receiving the signal through a wireless channel. That is, the RF processor 2010 may up-convert a baseband signal provided from the baseband processor 2020 into an RF band signal to transmit the RF band signal through an antenna, and also down-convert an RF band signal received through the antenna into a baseband signal. For example, the RF processor 2010 may include a transmitter filter, a receiver filter, an amplifier, a mixer, an oscillator, a DAC, an ADC, and the like. Although the drawing shows only one antenna, the first access node may have a plurality of antennas. In addition, the RF processor 2010 may include a plurality of RF chains. Further, the RF processor 2010 may perform beamforming. For the beamforming, the RF processor 2010 may adjust the phase and size of signals transmitted and received through a plurality of antennas or antenna elements. The baseband processor 2020 may perform a conversion function between a baseband signal and a bit stream in accordance with a physical layer standard of the first wireless access technology. For example, in data transmission, the baseband processor 2020 may create complex symbols by encoding and modulating transmission bit streams. Also, in data reception, the baseband processor 2020 may restore reception bit streams by demodulating and decoding a baseband signal provided from the RF processor 2010. In case of complying with OFDM scheme, in data transmission, the baseband processor 2020 may generate complex symbols by encoding and modulating transmission bit streams, map the complex symbols to subcarriers, and construct OFDM symbols through an IFFT operation and a CP insertion. In addition, in data reception, the baseband processor 2020 may divide a baseband signal provided from the RF processor 2010 into OFDM symbol units, restore signals mapped to subcarriers through an FFT operation, and restore reception bit streams through demodulation and decoding. The baseband processor 2020 and the RF processor 2010 may transmit and receive a signal as described above. Thus, the baseband processor 2020 and the RF processor 2010 may be referred to as a transmitting unit, a receiving unit, a transceiver, a communication unit, or a wireless communication unit. The backhaul communication unit 2030 may provide an interface for performing communication with other node in the network. That is, the backhaul communication unit 2030 may convert a bit stream transmitted from the main eNB to another node, e.g., a sub-eNB, a core network, etc., into a physical signal, and may also convert a physical signal received from such other node into a bit stream. The storage 2040 may store a basic program for the operation of the main eNB, an application program, and data such as setting information. In particular, the storage 2040 may store information on a bearer allocated to connected UE, a measurement result reported from the connected UE, and the like. In addition, the storage 2040 may store information for determining whether to provide or suspend multiple connections to or from the UE. Also, the storage 2040 may provide the stored data in response to a request of the controller 2050. The controller 2050 may control overall operations of the main eNB. For example, the controller 2050 may transmit and receive a signal through the baseband processor 2020 and the RF processor 2010 or through the backhaul communication unit 2030. Also, the controller 2050 writes and read data to and from the storage 2040. For this, the controller 2050 may include at least one processor. According to an embodiment of the present invention, the controller 2050 may include a multi-connection controller 2052 for performing control for providing multiple connections to the UE. For example, the controller 2050 may control the eNB to perform the above-described operations and procedures.

Specifically, the controller 2050 may determine whether the eNB supports the second DRX (eDRX).

The controller 2050 may broadcast system information (SI). If the eNB supports the second DRX, the controller 2050 may broadcast, to the UE, the SI including the second DRX-related first information and the paging-related second parameter (nB') as well as the first DRX-related first information and the paging-related first parameter which are the first DRX (typical DRX) configuration information.

Specifically, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

If the eNB does not support the second DRX, the controller 2050 may broadcast the SI including only the first DRX (typical DRX) configuration information.

If the eNB supports the second DRX, the controller 2050 may determine whether the SI is updated.

If the SI is updated, the controller 2050 may determine whether the updated SI includes the first SI.

If the updated SI includes the first SI, the controller 2050 may derive PHF, PF and PO.

Thereafter, the controller 2050 may transmit to the UE the paging message indicating whether the SI is updated. The controller 2050 may transmit the paging message including the second SI change indicator indicating whether the SI is updated, based on the calculated PHF, PF and PO, to the UEs that operate by applying the second DRX (eDRX).

Thereafter, the controller 2050 may increase the systemInfoValueTag and the second SI change related information (systemInfoValueTagExt) by one. Alternatively, the controller 2050 may increase the value of the systemInfoValueTag by one and then, if wraparound occurs, increase the systemInfoValueTagExt by one.

Also, even when the updated SI is not included in the first SI (i.e., included in the second SI related to the RRC connection), the controller 2050 may increase the values of the systemInfoValueTag and the systemInfoValueTagExt included in the SI change related information by one. Alternatively, the controller 2050 may increase the value of the systemInfoValueTag by one and then, if wraparound occurs, increase the systemInfoValueTagExt by one.

Thereafter, the controller 2050 may broadcast the SI (e.g., SIB1) including the changed SI change related information (IE value). The controller 2050 may broadcast the updated SI from a specific time point (e.g., the time point when H-SFN mod 256=0).

In addition, the controller 2050 may determine to update the SI. At this time, the controller 2050 may decide to update some or all of the SI.

The controller 2050 may determine whether the eNB supports the second DRX.

If the eNB does not support the second DRX, the controller 2050 may perform the SI update according to the first DRX.

On the other hand, if the eNB supports the second DRX, the controller 2050 may determine whether the service coverage extension function is supported in the MTC technology.

If the eNB does not support the service coverage extension function in the MTC technology, the controller 2050 may determine whether the changed SI includes at least paging control channel configuration information (PCCH-config).

If the changed SI includes the PCCH-config, the controller 2050 may transmit the paging message or PDCCH including the second SI change indicator (or SI update indicator) to the UE in order to notify whether the SI is updated.

On the other hand, if the changed SI does not include the PCCH-config, the controller 2050 may skip a process of transmitting the second SI change indicator.

Thereafter, the controller 2050 may broadcast the updated SI in the second DRX acquisition period. At this time, the controller 2050 may broadcast the updated SI at the time point when the H-SFN mod 256=0 is satisfied.

Meanwhile, if the eNB supports the service coverage extension function in the MTC technology, the controller 2050 may determine whether the changed SI includes at least one of the paging channel configuration information (pcch-config), the subframe bitmap related information (fdd-DownlinkOrTddSubframeBitmapLC-r13), and the hopping related information (si-HoppingConfigCommon-r13).

If at least one of the above information is included in the changed SI, the controller 2050 may transmit the paging message or (M)PDCCH including the second SI change indicator (or SI update indicator) to the UE in order to notify whether the SI is updated.

However, if at least one of the above information is not included in the changed SI, the controller 2050 may skip the above process.

Thereafter, the controller 2050 may broadcast the updated SI in the second DRX acquisition period. At this time, the controller 2050 may broadcast the updated SI at the time point when the H-SFN mod 256=0 is satisfied.

Third Embodiment

The present invention proposes another method for determining whether the system information (SI) is updated, when the DRX cycle is set to be longer than the modification period (MP) in order to reduce power consumption.

When the SI is updated, the eNB should notify the SI update to all UEs that are in the idle mode. As described above, this is performed through a paging message. Since the eNB does not know which idle-mode UE exists in its area, the eNB may transmit the paging message through all possible POs during the MP. The MP may be an integer multiple of the first DRX cycle (the default DRX cycle).

On the other hand, in the second DRX (eDRX), the length of the second DRX cycle (the DRX cycle) may reach several tens of minutes. One of methods for notifying whether the SI is updated, for the UE that applies the second DRX (eDRX), is a method for continuously transmitting the paging message throughout the second DRX cycle (the DRX cycle).

Alternatively, since the SI update method applied to the normal DRX UE is a pre-notification, the UE may perform SI refresh or SI reacquisition in the next MP when recognizing the occurrence of the SI update. Therefore, the present invention is characterized in that the eNB transmits the paging message only in some HFs after the SI update occurs for the second DRX (eDRX) UE. That is, because of a post-notification, the UE may immediately perform SI reacquisition (SI refresh) when recognizing the occurrence of the SI update.

Specifically, when the SI is updated in the MP [m+1], the eNB may transmit the paging message through all available POs of all available PFs in the MP [m] for the first DRX (typical DRX) UE.

In addition, for the second DRX (eDRX) UE, the eNB may transmit the paging message through all available POs of all available PFs of all available PHFs during a certain period after the MP [m+1]. The paging message may include the second SI change indicator (systemInfoModification2) and system change related information (value tag).

The reason that the second SI change indicator (systemInfoModication2) is introduced is to instruct the UE to reacquire the SI from the moment that the UE receives the paging message. As described above, the UE that receives the first SI change indicator (typical systemInfoModification) may reacquire the SI from the next MP.

In the present invention, SI change related information (value tag) may be included in the paging message. This reason is to prevent the UE, which has already acquired the updated SI, from unnecessarily reacquiring the same SI by receiving the paging message.

In this case, DRX parameters (configurable parameter) may be introduced to control the number of available PHFs, available PFs, and available POs. In the DRX parameters, the parameter for the first DRX (typical DRX) and the parameter for the second DRX (eDRX) may be configured independently. Therefore, the PF and PO for the first DRX (typical DRX) and the PF and PO for the second DRX (eDRX) may be configured in different radio frames or subframes.

A method for configuring the DRX parameters is the same as the above-described methods (Case 1, 2, and 3), and a detailed description will be omitted.

Figure 21:
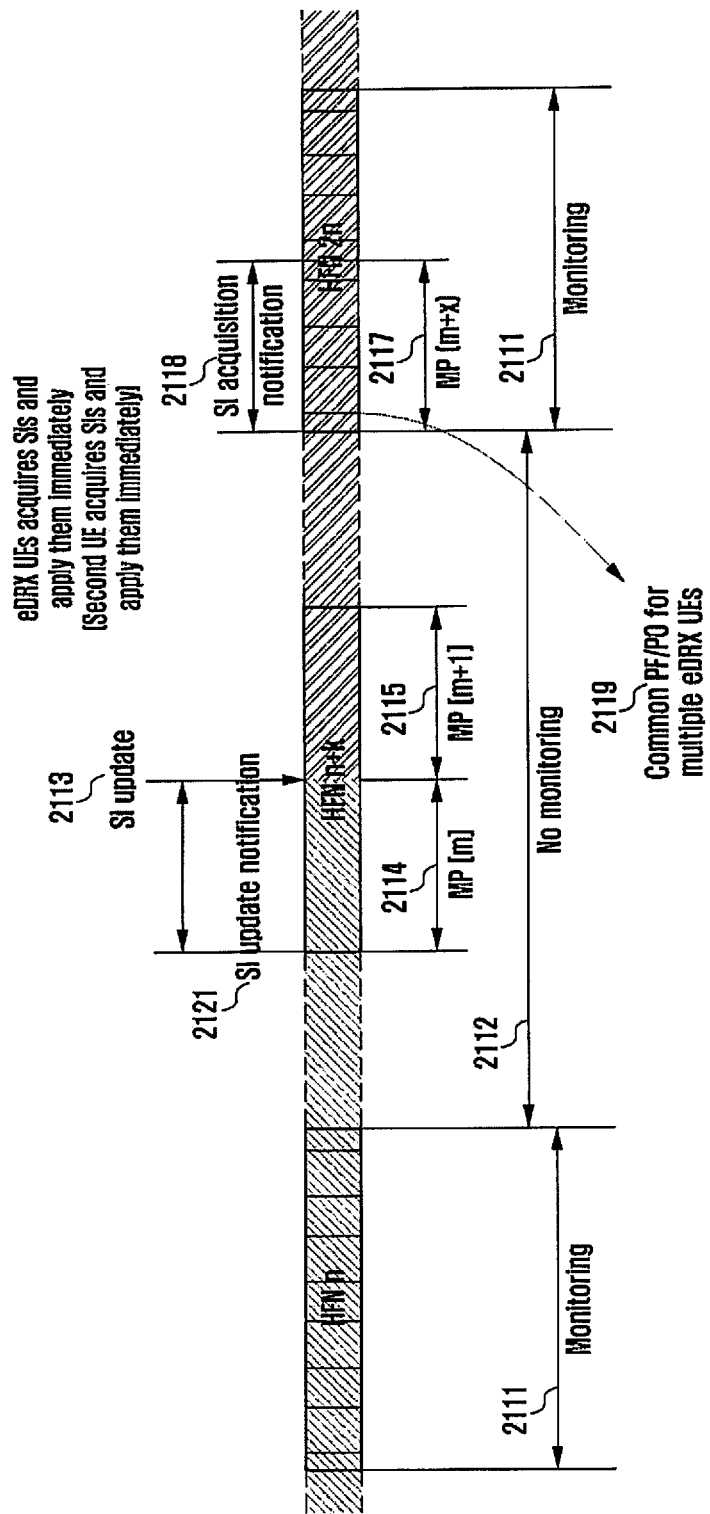
FIG. 21 is a diagram illustrating a method for notifying changed system information to UE according to a third embodiment of the present invention.

FIG. 21 is a diagram illustrating a method for notifying changed system information to UE according to a third embodiment of the present invention.

Referring to FIG. 21, the UE that applies the second DRX (eDRX) may perform paging monitoring only in a PHF 2111, based on a hyper SFN. In the PHF, the UE may receive paging in a PF and a PO derived by applying typical or separate DRX parameters.

Meanwhile, system information (SI) update 2113 may occur in a time interval 2112 other than the PHF. If the updated SI is broadcasted from the (m+1)-th MP 2115, the eNB may send SI update notification 2116 to the UEs in the m-th MP 2114 by using the paging.

However, the UE that applies the second DRX (eDRX) may not receive the paging because of being not the PHF in the corresponding time, and may not determine whether the SI is updated. In order to this, the eNB may transmit the paging 2118 for notifying the SI update during a certain period, e.g., the (m+x)-th MP 2117, in the upcoming PHF 2111 after the SI update. At this time, the PF and PO 2119 in the PHF may be derived by applying typical or separate DRX parameters.

Figure 22:
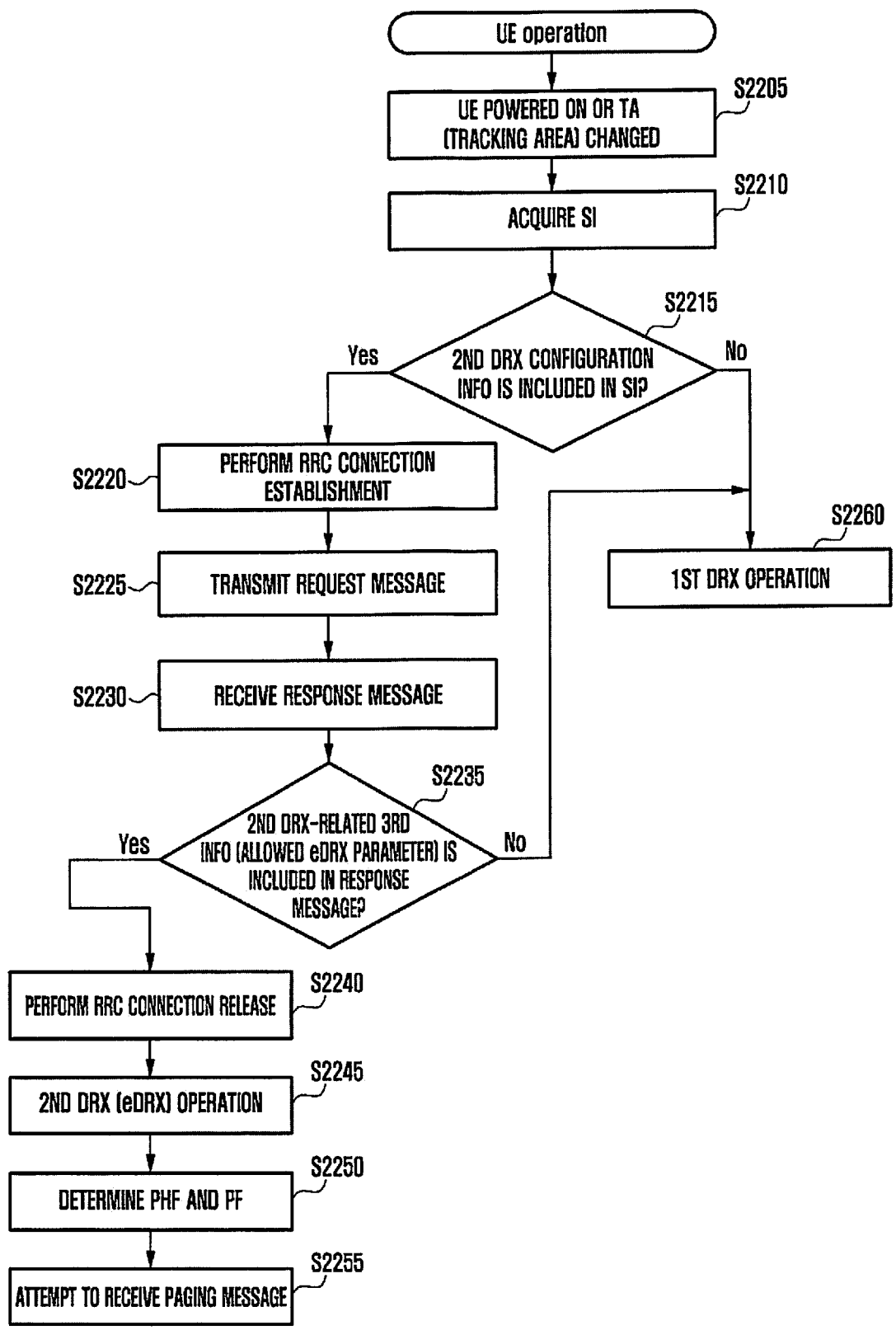
FIG. 22 is a diagram illustrating a UE operation according to the third embodiment of the present invention.

FIG. 22 is a diagram illustrating a UE operation according to the third embodiment of the present invention.

Referring to FIG. 22, at step S2205, the UE may be powered on, or the tracking area (TA) may be changed.

At step S2210, the UE may acquire system information from the eNB.

At step S2215, the UE that acquires the system information may identify whether the system information includes the second DRX configuration information (or the second DRX parameter). Specifically, the UE may determine whether the system information includes the second DRX-related first information and the paging-related second parameter (the nB' value).

Depending on cases described above, the second DRX (eDRX) parameter value included in the SIBx may be different. That is, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

If the second DRX-related first information and the paging-related second parameter (the nB' value) are included in the system information, the UE may perform an RRC connection establishment process at step S2220.

After the RRC connection is completed, the UE may transmit a request message to the MME at step S2225. If the UE prefers to apply the second DRX (eDRX) or if the UE supports the second DRX, the UE may include the first DRX-related second information (the UE specific DRX) and the second DRX-related second information (the UE specific eDRX value) in the request message (the ATTACH REQUEST or TAU REQUEST message) and transmit the request message to the MME. As described above, the first DRX-related second information may include the first DRX cycle information preferred by the UE, and the second DRX-related second information may include the second DRX cycle information preferred by the UE. The cycle information preferred by the UE may mean cycle information determined to be applied by the UE.

In addition, at step S2230, the UE may receive a response message (e.g., the ATTACH ACCEPT or TAU ACCEPT message) corresponding to the request message from the MME.

At step S2235, the UE that receives the response message may determine whether the second DRX-related third information (the allowed eDRX parameter) is included in the message. The second DRX-related third information (the allowed eDRX parameter) may include information indicating whether the MME supports the second DRX (eDRX), or the second DRX (eDRX) cycle information having to be applied by the UE.

When the response message includes the second DRX-related third information, the UE may perform an RRC connection release process at step S2240.

At step S2245, the UE that releases the RRC connection may operate by applying the second DRX (eDRX).

For this, at step S2250, the UE may derive the second DRX cycle (T') and the first DRX cycle (T) by using the above-described method, and then determine the PHF and the PF. This step may be performed before the RRC connection release.

In addition, at step S2255, the UE may attempt to receive the paging message thereof at the paging reception timing indicated by the determined PHF and PF.

If the first system information change indicator (SystemInfoModification) is included in the paging message, the UE may receive the system information from the start time point of the next modification period (MP). If the second system information change indicator (SystemInfoModification2) is included in the paging message, and if the system information change related information (value tag) is different from the stored value, the UE may receive the system information from the start time point of the next repetition period or from the time point of receiving the paging message. If the second system information change indicator (SystemInfoModification2) is contained in the paging message, and if the system information change related information (value tag) is identical with the stored value, the UE may not reacquire the system information.

Meanwhile, if the eNB does not broadcast the second DRX-related first information and the paging-related second parameter (nB') at step S2215, or if the MME does not transmit the second DRX-related third information (the allowed eDRX parameter) at step S2235, the UE may perform only the first DRX (typical DRX) process at step S2260.

Figure 23:
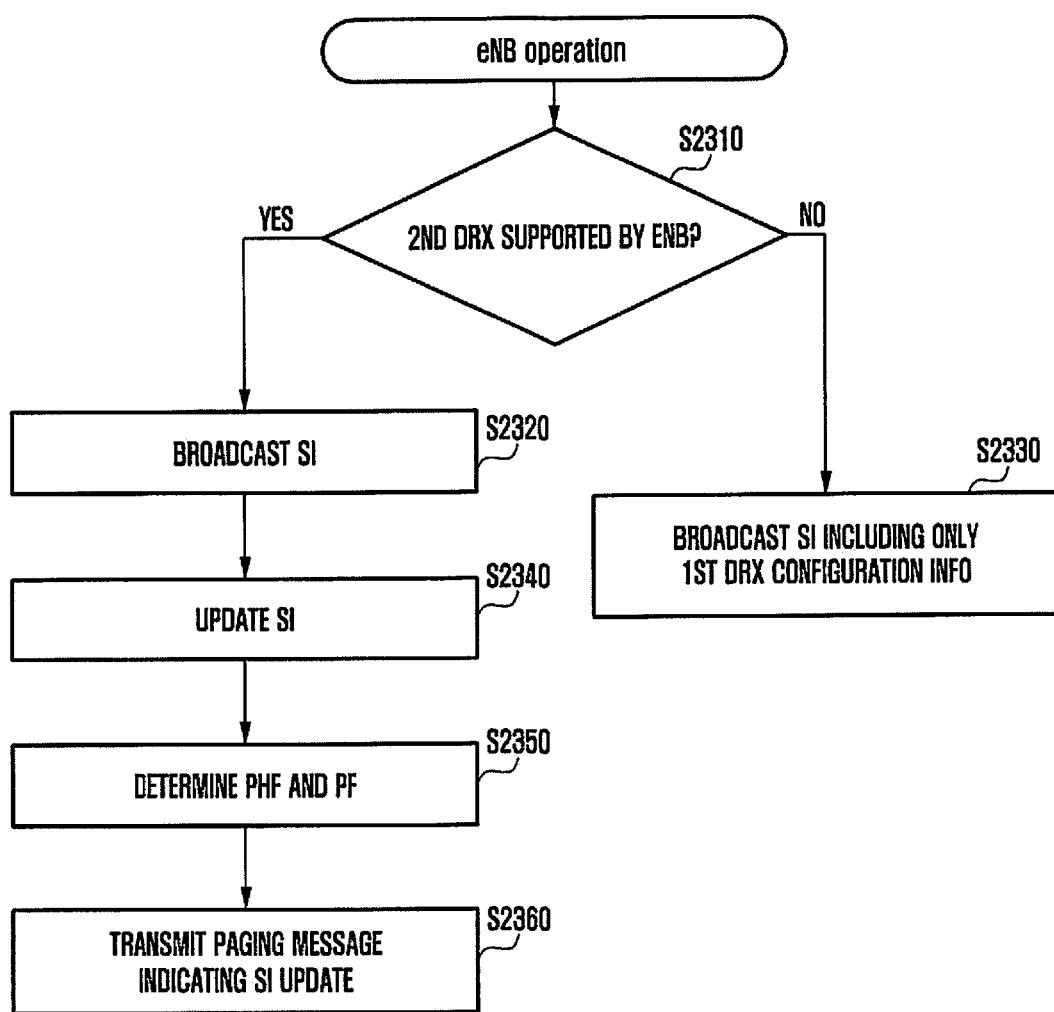
FIG. 23 is a diagram illustrating an eNB operation according to the third embodiment of the present invention.

FIG. 23 is a diagram illustrating an eNB operation according to the third embodiment of the present invention.

Referring to FIG. 23, at step S2310, the eNB may determine whether the eNB supports the second DRX (eDRX).

At step S2320, the eNB may broadcast system information (SI). If the eNB supports the second DRX, the eNB may broadcast, to the UE, the SI including the second DRX-related first information and the paging-related second parameter (nB') as well as the first DRX-related first information and the paging-related first parameter which are the first DRX (typical DRX) configuration information.

Specifically, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

If the eNB does not support the second DRX, the eNB may broadcast the SI including only the first DRX (typical DRX) configuration information at step S2330. If the eNB does not support the second DRX, the eNB may operate according to the first DRX as described with reference to FIG. 4, and a detailed description will be omitted.

In addition, at step S2340, the SI may be updated. When the SI is updated, the eNB may derive PHF, PF and PO at step S2350.

Thereafter, at step S2360, the eNB may transmit to the UE the paging message indicating whether the SI is updated. The eNB may transmit the paging message including the second SI change indicator indicating whether the SI is updated, based on the calculated PHF, PF and PO, to the UEs that operate by applying the second DRX (eDRX). The eNB may include the second SI change indicator (SystemInfoModification2) and the SI change related information (value tag) in the paging message.

Figure 24:
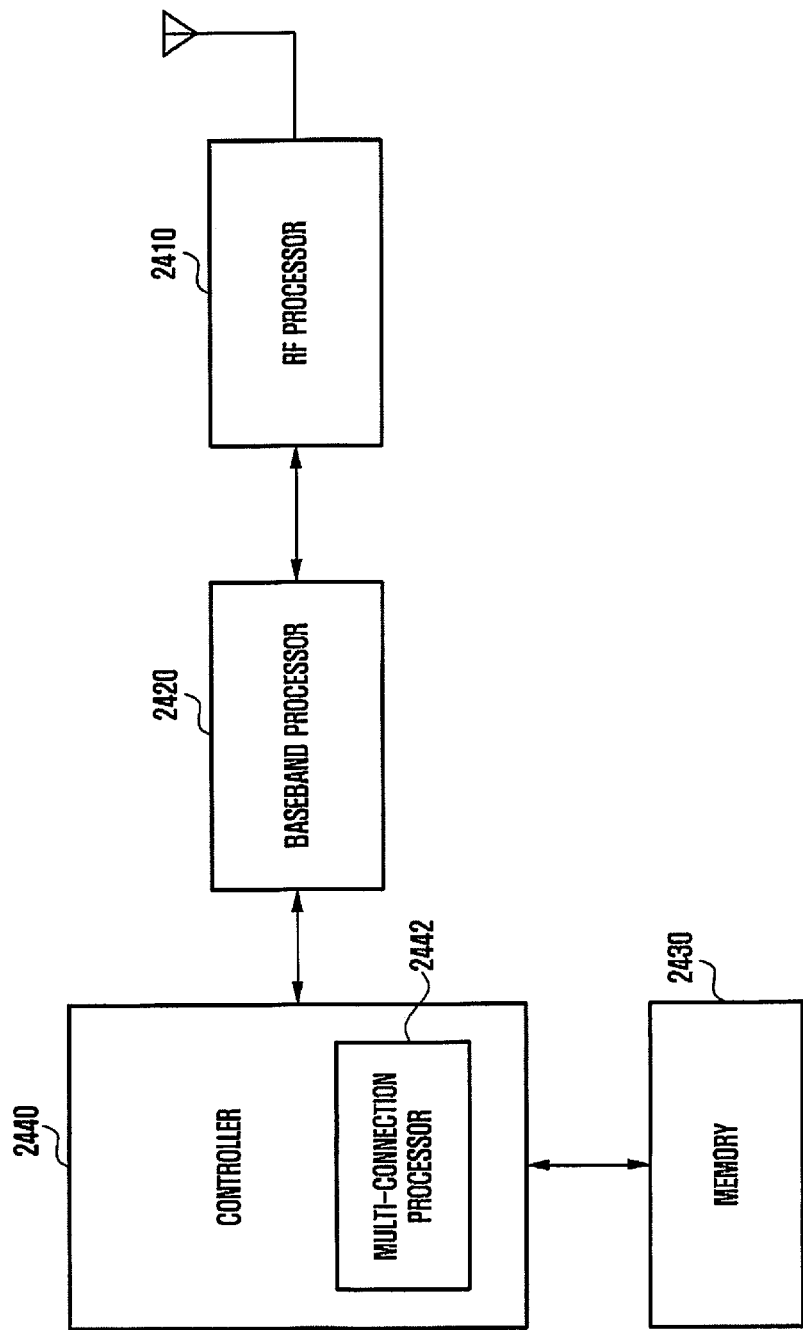
FIG. 24 illustrates a block configuration of UE according to the third embodiment of the present invention.

FIG. 24 illustrates a block configuration of UE according to the third embodiment of the present invention.

Referring to FIG. 24, the UE may include a radio frequency (RF) processor 2410, a baseband processor 2420, a storage 2430, and a controller 2440.

The RF processor 2410 may perform a function, such as band conversion and amplification of a signal, for transmitting and receiving the signal through a wireless channel. That is, the RF processor 2410 may up-convert a baseband signal provided from the baseband processor 2420 into an RF band signal to transmit the RF band signal through an antenna, and also down-convert an RF band signal received through the antenna into a baseband signal. For example, the RF processor 2410 may include a transmitter filter, a receiver filter, an amplifier, a mixer, an oscillator, a digital to analog converter (DAC), an analog to digital converter (ADC), and the like. Although the drawing shows only one antenna, the UE may have a plurality of antennas. In addition, the RF processor 2410 may include a plurality of RF chains. Further, the RF processor 2410 may perform beamforming. For the beamforming, the RF processor 2410 may adjust the phase and size of signals transmitted and received through a plurality of antennas or antenna elements.

The baseband processor 2420 may perform a conversion function between a baseband signal and a bit stream in accordance with a physical layer standard of the system. For example, in data transmission, the baseband processor 2420 may create complex symbols by encoding and modulating transmission bit streams. Also, in data reception, the baseband processor 2420 may restore reception bit streams by demodulating and decoding a baseband signal provided from the RF processor 2410. In case of complying with orthogonal frequency division multiplexing (OFDM) scheme, in data transmission, the baseband processor 2420 may generate complex symbols by encoding and modulating transmission bit streams, map the complex symbols to subcarriers, and construct OFDM symbols through an inverse fast Fourier transform (IFFT) operation and a cyclic prefix (CP) insertion. In addition, in data reception, the baseband processor 2420 may divide a baseband signal provided from the RF processor 2410 into OFDM symbol units, restore signals mapped to subcarriers through a fast Fourier transform (FFT) operation, and restore reception bit streams through demodulation and decoding.

The baseband processor 2420 and the RF processor 2410 may transmit and receive a signal as described above. Accordingly, the baseband processor 2420 and the RF processor 2410 may be referred to as a transmitting unit, a receiving unit, a transceiver, or a communication unit. In addition, at least one of the baseband processor 2420 and the RF processor 2410 may include a plurality of communication modules to support a plurality of different wireless access technologies. Also, at least one of the baseband processor 2420 and the RF processor 2410 may include different communication modules for processing signals of different frequency bands. For example, the different wireless access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 2430 may store a basic program for the operation of the UE, an application program, and data such as setting information. In particular, the storage 2430 may store information associated with a second access node that performs wireless communication by using a second wireless access technology. Also, the storage 2430 may provide the stored data in response to a request of the controller 2440.

The controller 2440 may control overall operations of the UE. For example, the controller 2440 may transmit and receive a signal through the baseband processor 2420 and the RF processor 2410. Also, the controller 2440 writes and read data to and from the storage 2440. For this, the controller 2440 may include at least one processor. For example, the controller 2440 may include a communication processor (CP) for perform the control for communication and an application processor (AP) for controlling an upper layer such as an application program. According to an embodiment of the present invention, the controller 2440 may control the UE to perform the above-described operations and procedures of the UE.

Specifically, the controller 2440 may acquire system information from the eNB.

The controller 2440 that acquires the system information may identify whether the system information includes the second DRX configuration information (or the second DRX parameter). Specifically, the controller 2440 may determine whether the system information includes the second DRX-related first information and the paging-related second parameter (the nB' value).

Depending on cases described above, the second DRX (eDRX) parameter value included in the SIBx may be different. That is, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

The controller 2440 may perform an RRC connection establishment process. After the RRC connection is completed, the controller 2440 may transmit a request message to the MME. If the UE prefers to apply the second DRX (eDRX) or if the UE supports the second DRX, the controller 2440 may include the first DRX-related second information (the UE specific DRX) and the second DRX-related second information (the UE specific eDRX value) in the request message and transmit the request message to the MME.

In addition, the controller 2440 may receive a response message corresponding to the request message from the MME.

The controller 2440 may determine whether the second DRX-related third information (the allowed eDRX parameter) is included in the response message. The second DRX-related third information (the allowed eDRX parameter) may include information indicating whether the MME supports the second DRX (eDRX), or the second DRX (eDRX) cycle information having to be applied by the UE.

When the response message includes the second DRX-related third information, the controller 2440 may perform an RRC connection release process.

The controller 2440 that releases the RRC connection may operate by applying the second DRX (eDRX).

For this, the controller 2440 may derive the second DRX cycle (T') and the first DRX cycle (T) by using the above-described method, and then determine the PHF and the PF. This step may be performed before the RRC connection release.

In addition, the controller 2440 may attempt to receive the paging message thereof at the paging reception timing indicated by the determined PHF and PF.

If the first system information change indicator (SystemInfoModification) is included in the paging message, the controller 2440 may receive the system information from the start time point of the next modification period (MP). If the second system information change indicator (SystemInfoModification2) is included in the paging message, and if the system information change related information (value tag) is different from the stored value, the controller 2440 may receive the system information from the start time point of the next repetition period or from the time point of receiving the paging message. If the second system information change indicator (SystemInfoModification2) is contained in the paging message, and if the system information change related information (value tag) is identical with the stored value, the controller 2440 may not reacquire the system information.

Meanwhile, if the eNB does not broadcast the second DRX-related first information and the paging-related second parameter (nB'), or if the MME does not transmit the second DRX-related third information (the allowed eDRX parameter), the controller 2440 may perform only the first DRX (typical DRX) process.

Figure 25:
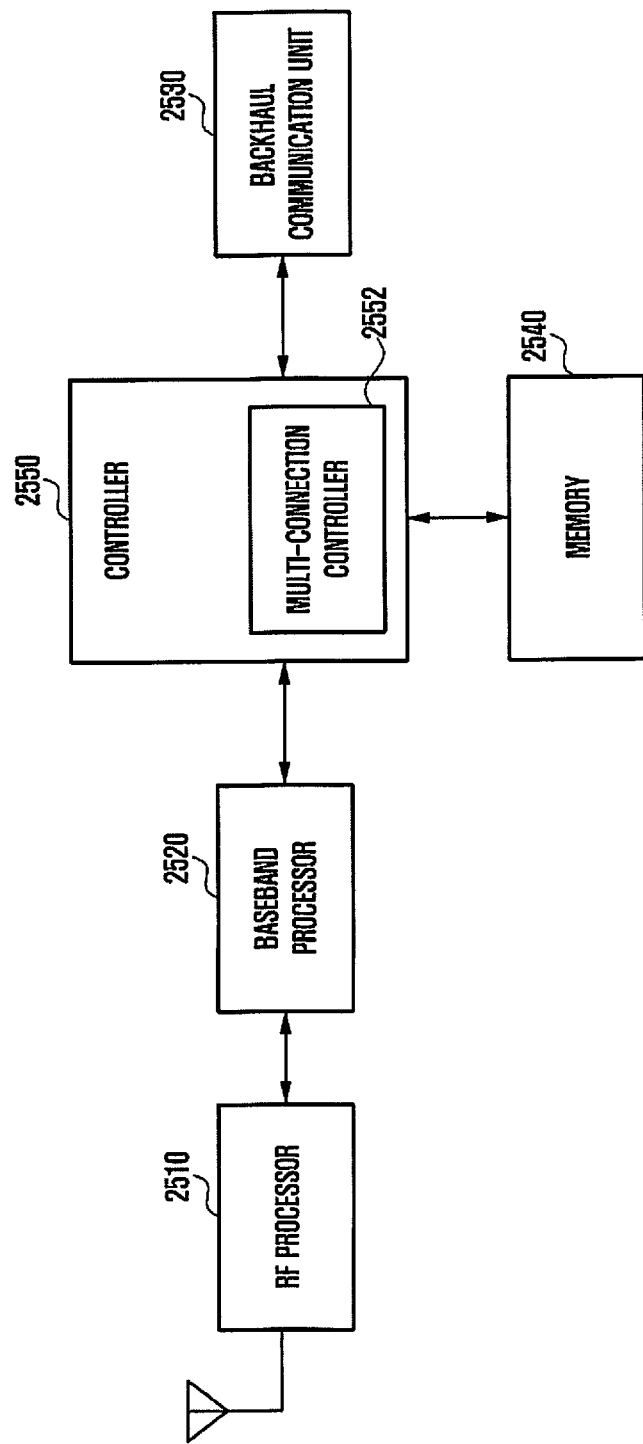
FIG. 25 illustrates a block configuration of eNB according to the third embodiment of the present invention.

FIG. 25 illustrates a block configuration of eNB according to the third embodiment of the present invention.

As shown in FIG. 25, the eNB may include an RF processor 2510, a baseband processor 2520, a backhaul communication unit 2530, a storage 2540, and a controller 2550.

The RF processor 2510 may perform a function, such as band conversion and amplification of a signal, for transmitting and receiving the signal through a wireless channel. That is, the RF processor 2510 may up-convert a baseband signal provided from the baseband processor 2520 into an RF band signal to transmit the RF band signal through an antenna, and also down-convert an RF band signal received through the antenna into a baseband signal. For example, the RF processor 2510 may include a transmitter filter, a receiver filter, an amplifier, a mixer, an oscillator, a DAC, an ADC, and the like. Although the drawing shows only one antenna, the first access node may have a plurality of antennas. In addition, the RF processor 2510 may include a plurality of RF chains. Further, the RF processor 2510 may perform beamforming. For the beamforming, the RF processor 2510 may adjust the phase and size of signals transmitted and received through a plurality of antennas or antenna elements.

The baseband processor 2520 may perform a conversion function between a baseband signal and a bit stream in accordance with a physical layer standard of the first wireless access technology. For example, in data transmission, the baseband processor 2520 may create complex symbols by encoding and modulating transmission bit streams. Also, in data reception, the baseband processor 2520 may restore reception bit streams by demodulating and decoding a baseband signal provided from the RF processor 2510. In case of complying with OFDM scheme, in data transmission, the baseband processor 2520 may generate complex symbols by encoding and modulating transmission bit streams, map the complex symbols to subcarriers, and construct OFDM symbols through an IFFT operation and a CP insertion. In addition, in data reception, the baseband processor 2520 may divide a baseband signal provided from the RF processor 2510 into OFDM symbol units, restore signals mapped to subcarriers through an FFT operation, and restore reception bit streams through demodulation and decoding. The baseband processor 2520 and the RF processor 2510 may transmit and receive a signal as described above. Thus, the baseband processor 2520 and the RF processor 2510 may be referred to as a transmitting unit, a receiving unit, a transceiver, a communication unit, or a wireless communication unit.

The backhaul communication unit 2530 may provide an interface for performing communication with other node in the network. That is, the backhaul communication unit 2530 may convert a bit stream transmitted from the main eNB to another node, e.g., a sub-eNB, a core network, etc., into a physical signal, and may also convert a physical signal received from such other node into a bit stream.

The storage 2540 may store a basic program for the operation of the main eNB, an application program, and data such as setting information. In particular, the storage 2540 may store information on a bearer allocated to connected UE, a measurement result reported from the connected UE, and the like. In addition, the storage 2540 may store information for determining whether to provide or suspend multiple connections to or from the UE. Also, the storage 2540 may provide the stored data in response to a request of the controller 2550.

The controller 2550 may control overall operations of the main eNB. For example, the controller 2550 may transmit and receive a signal through the baseband processor 2520 and the RF processor 2510 or through the backhaul communication unit 2530. Also, the controller 2550 writes and read data to and from the storage 2540. For this, the controller 2550 may include at least one processor. According to an embodiment of the present invention, the controller 2550 may include a multi-connection controller 2552 for performing control for providing multiple connections to the UE. For example, the controller 2550 may control the eNB to perform the above-described operations and procedures.

Specifically, the controller 2550 may determine whether the eNB supports the second DRX (eDRX).

The controller 2550 may broadcast system information (SI). If the eNB supports the second DRX, the controller 2550 may broadcast, to the UE, the SI including the second DRX-related first information and the paging-related second parameter (nB') as well as the first DRX-related first information and the paging-related first parameter which are the first DRX (typical DRX) configuration information.

Specifically, in the case 1, the second DRX-related first information may be included. In the case 2, the second DRX-related first information and the paging-related second parameter (nB') may be included. In the case 3, the second DRX-related first information, the paging-related second parameter (nB'), and the paging-related third parameter (nB") may be included.

If the eNB does not support the second DRX, the controller 2550 may broadcast the SI including only the first DRX (typical DRX) configuration information.

In addition, when the SI is updated, the controller 2550 may derive PHF, PF and PO.

Thereafter, the controller 2550 may transmit to the UE the paging message indicating whether the SI is updated. The eNB may transmit the paging message including the second SI change indicator indicating whether the SI is updated, based on the calculated PHF, PF and PO, to the UEs that operate by applying the second DRX (eDRX). The eNB may include the second SI change indicator (SystemInfoModification2) and the SI change related information (value tag) in the paging message.

Fourth Embodiment

The present invention proposes still another method for determining whether the system information (SI) is updated, when the DRX cycle is set to be longer than the modification period (MP) in order to reduce power consumption.

When the SI is updated, the eNB should notify the SI update to all UEs that are in the idle mode. As described above, this is performed through a paging message. Since the eNB does not know which idle-mode UE exists in its area, the eNB may transmit the paging message through all possible POs during the MP. The MP may be an integer multiple of the first DRX cycle (the default DRX cycle).

On the other hand, in the second DRX (eDRX), the length of the second DRX cycle (the DRX cycle) may reach several tens of minutes. Since the SI update method applied to the normal DRX UE is a pre-notification, the UE may perform SI reacquisition (SI refresh) in the next MP when recognizing the occurrence of the SI update. Therefore, the present invention is characterized in that, for the second DRX (eDRX) UE, the eNB checks whether the SI is updated, by identifying the SI (e.g., SIB1) in some HFs after the SI update occurs. That is, because of a post-notification, the UE may immediately perform SI reacquisition (SI refresh) when recognizing the occurrence of the SI update.

Specifically, when the SI is updated in the MP [m+1], the eNB may transmit the paging message through all available POs of all available PFs in the MP [m] for the first DRX (typical DRX) UE.

However, a separate paging message for the second DRX (eDRX) UE is not transmitted. Instead, the second DRX (eDRX) UE may acquire the MIB and the system information (SIB1) for each PHF and thereby identify system information change related information (systemInfoValueTag information) in the SIB1. An exact time point may be as follows.

Scheme 1: Acquire the first MIB and SIB1 in the PHF
Scheme 2: Acquire the MIB and SIB1 closest to the first PF and PO in the PHF FIG. 26 is a diagram illustrating a method for notifying changed system information to UE according to a fourth embodiment of the present invention.

Figure 26:
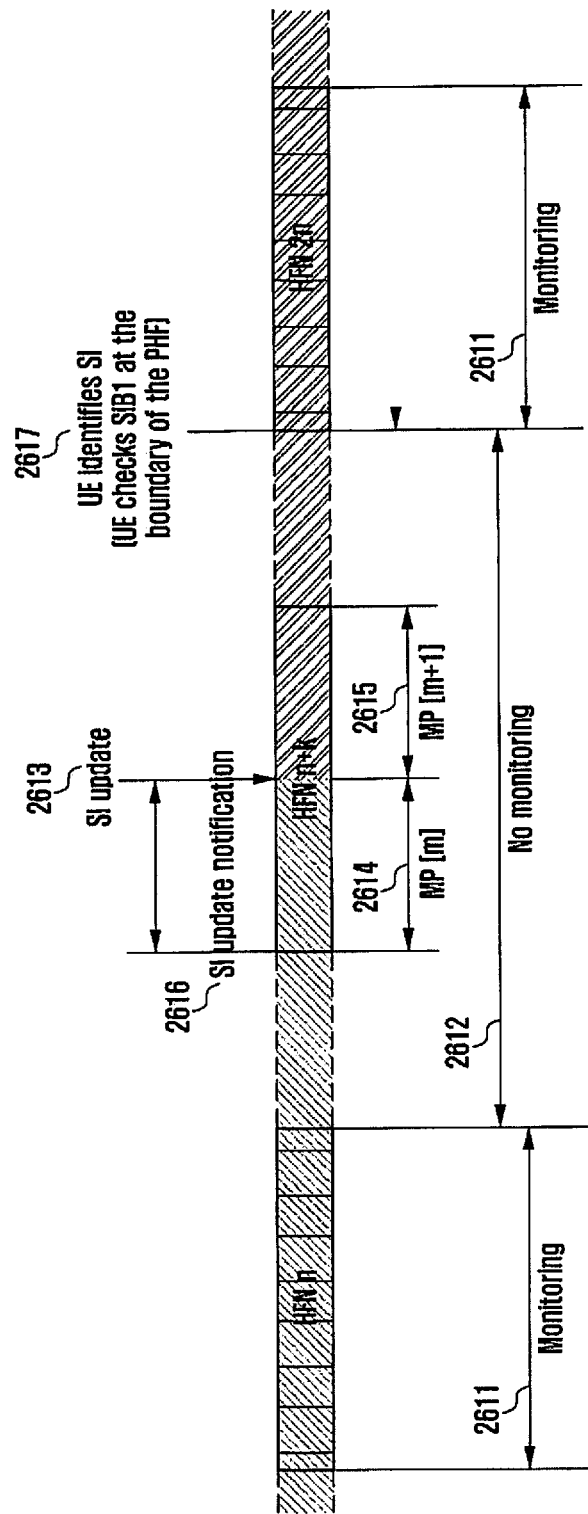
FIG. 26 is a diagram illustrating a method for notifying changed system information to UE according to a fourth embodiment of the present invention.

Referring to FIG. 26, the UE that applies the second DRX (eDRX) may perform paging monitoring only in a PHF 2611, based on a hyper SFN. In the PHF, the UE may receive paging in a PF and a PO derived by applying typical or separate DRX parameters.

Meanwhile, system information (SI) update 2613 may occur in a time interval 2612 other than the PHF. If the updated SI is broadcasted from the (m+1)-th MP 2615, the eNB may send SI update notification 2616 to the UEs in the m-th MP 2614 by using the paging.

However, the UE that applies the second DRX (eDRX) may not receive the paging because of being not the PHF in the corresponding time, and may not determine whether the SI is updated.

In order to this, the eNB may sequentially receive the MIB and the SIB1 in the upcoming PHF 2111 after the SI update, and check whether the SI change related information (systemInfoValueTag value) is identical with the value 2617 stored by the UE. At this time, if the SI change related information (systemInfoValueTag value) included in the newly received SIB1 is not identical with the stored value, the UE may regard the SI update as occurring in a period other than the PHF and then update with the SI being currently broadcasted.

The SI related information (systemInfoValueTag) may be reused by the second DRX (eDRX) UE, and a new systemInfoValueTagExt for the eDRX UE may be defined separately. The systemInfoValueTag has a value of integer (0, . . . , 31) (That is, it has a value from 0 to 31 and may be increased by 1 for each SI update. In case of exceeding 31, it may return to 0.), and the systemInfoValueTagExt may have a value of integer (0, . . . , 256). This is because the second DRX (eDRX) may have a very long DRX cycle during which the SI update may occur frequently.

Whenever the SI update occurs, the systemInfoValueTagExt may be increased by one. Alternatively, the systemInfoValueTag value may be reused, and, in case of wraparound of the above value, the systemInfoValueTagExt value may be increased by one. In this method, the systemInfoValueTagExt value may be set to a lower value than that in the previous method, such as integer (0, . . . , 15).

If the SI update occurs during the PHF, an indicator for indicating this may be included in the paging message for the second DRX (eDRX) UE, and an update of new SI may be performed from the next MP as in a typical manner.

Figure 27:
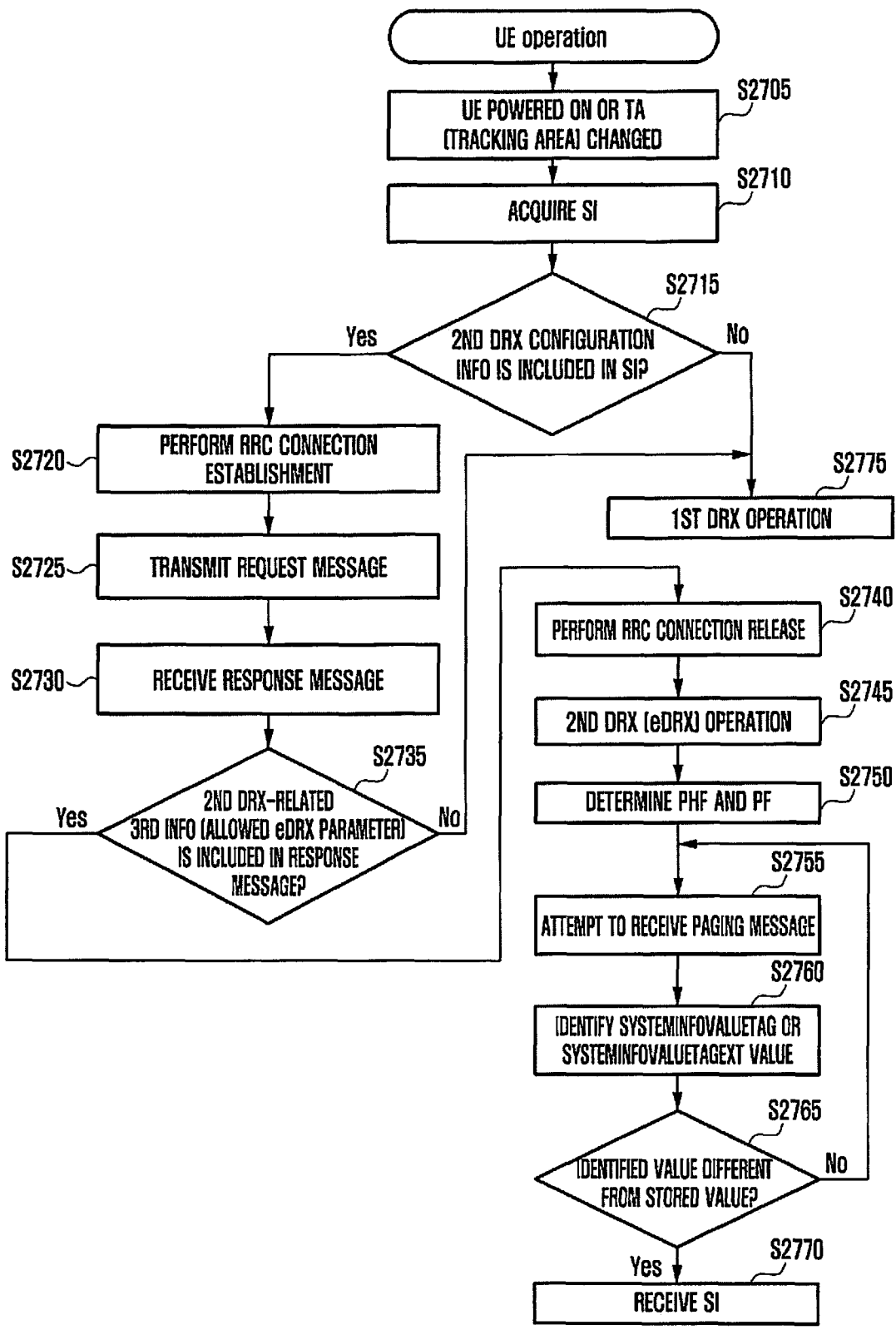
FIG. 27 is a diagram illustrating a UE operation according to the fourth embodiment of the present invention.

FIG. 27 is a diagram illustrating a UE operation according to the fourth embodiment of the present invention.

Referring to FIG. 27, at step S2705, the UE may be powered on, or the tracking area (TA) may be changed.

At step S2710, the UE may acquire system information from the eNB.

At step S2715, the UE that acquires the system information may identify whether the system information includes the second DRX configuration information. Specifically, the UE may determine whether the system information includes the second DRX-related first information and the paging-related second parameter (the nB' value).

If the second DRX-related first information and the paging-related second parameter (the nB' value) are included in the system information, the UE may perform an RRC connection establishment process at step S2720.

After the RRC connection is completed, the UE may transmit a request message to the MME at step S2225. If the UE prefers to apply the second DRX (eDRX) or if the UE supports the second DRX, the UE may include the first DRX-related second information (the UE specific DRX) and the second DRX-related second information (the UE specific eDRX value) in the request message (the ATTACH REQUEST or TAU REQUEST message) and transmit the request message to the MME. As described above, the first DRX-related second information may include the first DRX cycle information preferred by the UE, and the second DRX-related second information may include the second DRX cycle information preferred by the UE. The cycle information preferred by the UE may mean cycle information determined to be applied by the UE.

In addition, at step S2730, the UE may receive a response message (e.g., the ATTACH ACCEPT or TAU ACCEPT message) corresponding to the request message from the MME.

At step S2735, the UE that receives the response message may determine whether the second DRX-related third information (the allowed eDRX parameter) is included in the message. The second DRX-related third information (the allowed eDRX parameter) may include information indicating whether the MME supports the second DRX (eDRX), or the second DRX (eDRX) cycle information having to be applied by the UE.

When the response message includes the second DRX-related third information, the UE may perform an RRC connection release process at step S2740.

At step S2745, the UE that releases the RRC connection may operate by applying the second DRX (eDRX).

For this, at step S2750, the UE may derive the second DRX cycle (T') and the first DRX cycle (T) by using the above-described method, and then determine the PHF and the PF. This step may be performed before the RRC connection release.

In addition, when the calculated PHF arrives, the UE may sequentially receive the MIB and SIB1 at step S2755.

At step S2760, the UE that receives the system information may identify the systemInfoValueTag or systemInfoValueTagExt value included in the SIB1. The second DRX (eDRX) UE may receive the SIB1 at least once every T', which is the second DRX (eDRX) cycle, and then identify the systemInfoValueTag or systemInfoValueTagExt. In performing the DRX operation according to the second DRX (eDRX) cycle, the UE may receive the SIB1 closest to the first PF and PO of the PHF determined according to the second DRX (eDRX) cycle in the time domain. Alternatively, the UE may receive the closest SIB1 among SIB1s occurring after (or before) the first PF and PO of the PHF.

Thereafter, at step S2765, the UE may determine whether the identified value (of the IEs) and the stored value are different from each other.

If there is no difference, the UE does not need to update the system information.

On the other hand, if the stored value differs from the identified value, the UE may receive at step S2770 the system information being currently broadcasted by the eNB.

Meanwhile, if the eNB does not broadcast the second DRX-related first information and the paging-related second parameter (nB') at step S2705, or if the MME does not transmit the second DRX-related third information (the allowed eDRX parameter) at step S2235, the UE may perform only the first DRX (typical DRX) process at step S2775.

Although FIG. 27 relates the UE which is in the idle mode, the above operation may be similarly applied to the UE which is in a connected state. The connected UE may also operate with DRX, and a long DRX cycle and a short DRX cycle may be set in the UE. The UE may apply the short DRX cycle during data transmission and reception and apply the long DRX cycle during no data transmission and reception.

The long DRX cycle may be set from 10 ms to 10.24 sec, and be longer than the modification period. The connected UE may perform system (SIB1) checking, as follows.

The UE may establish an RRC connection with the eNB, and notify the eNB whether the second DRX (eDRX) is supported.

The eNB may set a long DRX cycle such as 10.24 seconds to the UE that supports the second DRX (eDRX).

The UE performs the first operation or the second operation, based on the length of the set DRX cycle.

If the length of the set long DRX cycle is smaller than the first value, the UE may perform the first operation. If the length is greater than the first value, the UE may perform the second operation. The first value may be a fixed value, for example, 2.56 seconds, or may be a specific value set for each cell, for example, the length of a modification period.

The first operation is as follows. The UE may identify system information (SIB1) at least once every modification period and thereby determine whether the SI is changed. The UE may determine whether the SI is changed, by identifying the first system information (SIB1) of the modification period. If it is determined that the SI is changed, namely, if the value tag is different from the stored value, the UE may receive SIBs again and replace the currently stored values with them.

The second operation is as follows. The UE may identify system information (SIB1) at least once every cycle, which is a longer value between the modification period and the long DRX cycle, and determine whether the SI is changed. In case of identifying the system information (SIB1) at intervals of the long DRX cycle, the UE may identify the system information (SIB1) closest in time to onDuration. If it is determined that the SI is changed, namely, if the value tag is different from the stored value, the UE may receive SIBs again and replace the currently stored values with them.

Figure 28:
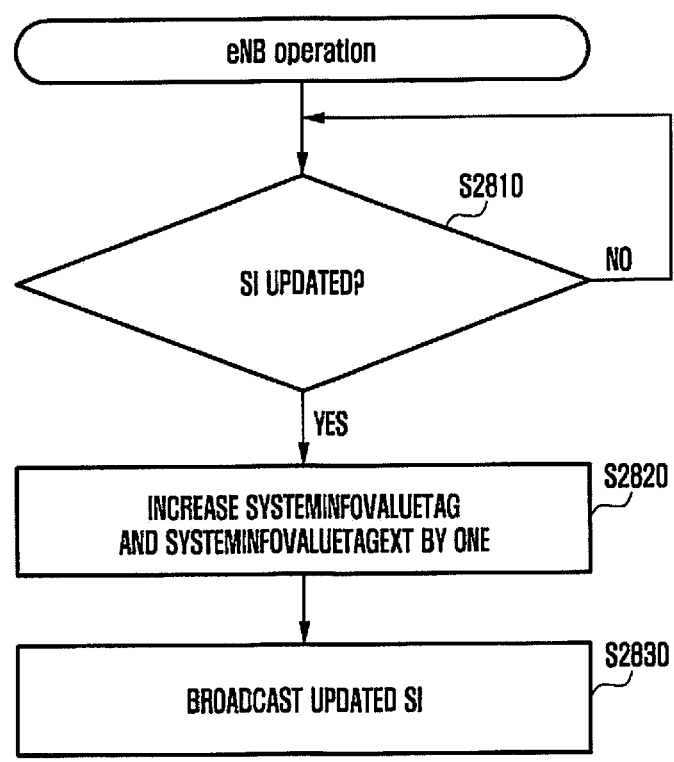
FIG. 28 is a diagram illustrating an eNB operation in the present invention.

FIG. 28 is a diagram illustrating an eNB operation in the present invention.

Referring to FIG. 28, at step S2810, the eNB may determine whether system information is updated.

If the system information is updated, the eNB may increase systemInfoValueTag and systemInfoValueTagExt by one at step S2820. Alternatively, the value of systemInfoValueTag may be increased by one, and then, if wraparound occurs, the systemInfoValueTagExt may be increased by one.

Thereafter, at step S2830, the eNB may broadcast the system information (SIB1) including the updated information (IE).

Figure 29:
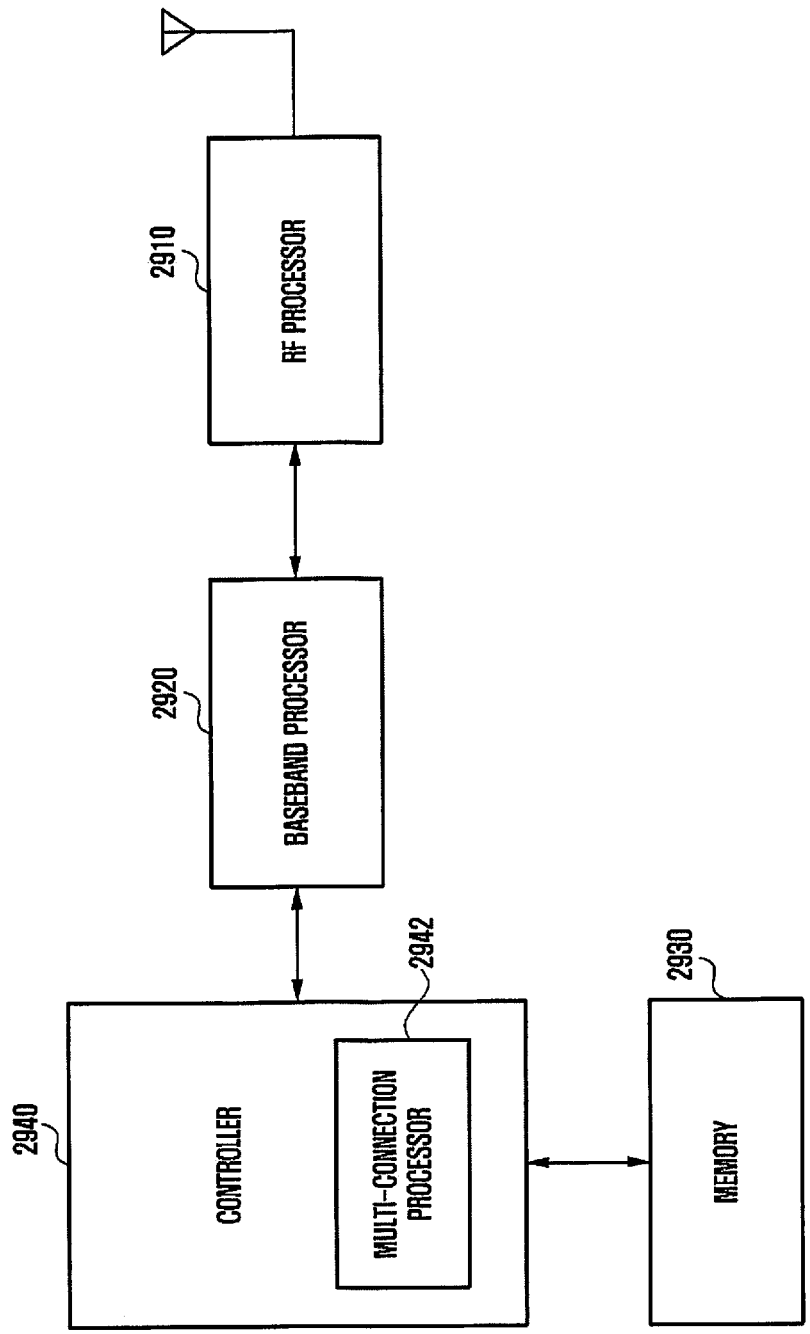
FIG. 29 illustrates a block configuration of UE according to the present invention.

FIG. 29 illustrates a block configuration of UE according to the present invention.

Referring to FIG. 29, the UE may include a radio frequency (RF) processor 2910, a baseband processor 2920, a storage 2930, and a controller 2940.

The RF processor 2910 may perform a function, such as band conversion and amplification of a signal, for transmitting and receiving the signal through a wireless channel. That is, the RF processor 2910 may up-convert a baseband signal provided from the baseband processor 2920 into an RF band signal to transmit the RF band signal through an antenna, and also down-convert an RF band signal received through the antenna into a baseband signal. For example, the RF processor 2910 may include a transmitter filter, a receiver filter, an amplifier, a mixer, an oscillator, a digital to analog converter (DAC), an analog to digital converter (ADC), and the like. Although the drawing shows only one antenna, the UE may have a plurality of antennas. In addition, the RF processor 2910 may include a plurality of RF chains. Further, the RF processor 2910 may perform beamforming. For the beamforming, the RF processor 2910 may adjust the phase and size of signals transmitted and received through a plurality of antennas or antenna elements.

The baseband processor 2920 may perform a conversion function between a baseband signal and a bit stream in accordance with a physical layer standard of the system. For example, in data transmission, the baseband processor 2920 may create complex symbols by encoding and modulating transmission bit streams. Also, in data reception, the baseband processor 2920 may restore reception bit streams by demodulating and decoding a baseband signal provided from the RF processor 2910. In case of complying with orthogonal frequency division multiplexing (OFDM) scheme, in data transmission, the baseband processor 2920 may generate complex symbols by encoding and modulating transmission bit streams, map the complex symbols to subcarriers, and construct OFDM symbols through an inverse fast Fourier transform (IFFT) operation and a cyclic prefix (CP) insertion. In addition, in data reception, the baseband processor 2920 may divide a baseband signal provided from the RF processor 2910 into OFDM symbol units, restore signals mapped to subcarriers through a fast Fourier transform (FFT) operation, and restore reception bit streams through demodulation and decoding.

The baseband processor 2920 and the RF processor 2910 may transmit and receive a signal as described above. Accordingly, the baseband processor 2920 and the RF processor 2910 may be referred to as a transmitting unit, a receiving unit, a transceiver, or a communication unit. In addition, at least one of the baseband processor 2920 and the RF processor 2910 may include a plurality of communication modules to support a plurality of different wireless access technologies. Also, at least one of the baseband processor 2920 and the RF processor 2910 may include different communication modules for processing signals of different frequency bands. For example, the different wireless access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 2930 may store a basic program for the operation of the UE, an application program, and data such as setting information. In particular, the storage 2930 may store information associated with a second access node that performs wireless communication by using a second wireless access technology. Also, the storage 2930 may provide the stored data in response to a request of the controller 2940.

The controller 2940 may control overall operations of the UE. For example, the controller 2940 may transmit and receive a signal through the baseband processor 2920 and the RF processor 2910. Also, the controller 2940 writes and reads data to and from the storage 2940. For this, the controller 2940 may include at least one processor. For example, the controller 2940 may include a communication processor (CP) for perform the control for communication and an application processor (AP) for controlling an upper layer such as an application program. According to an embodiment of the present invention, the controller 2940 may control the UE to perform the above-described operations and procedures of the UE.

Specifically, the controller 2940 may acquire system information from the eNB.

The controller 2940 that acquires the system information may identify whether the system information includes the second DRX configuration information. Specifically, the controller 2940 may determine whether the system information includes the second DRX-related first information and the paging-related second parameter (the nB' value).

The controller 2940 may perform an RRC connection establishment process. After the RRC connection is completed, the controller 2940 may transmit a request message to the MME. If the UE prefers to apply the second DRX (eDRX) or if the UE supports the second DRX, the controller 2940 may include the first DRX-related second information (the UE specific DRX) and the second DRX-related second information (the UE specific eDRX value) in the request message and transmit the request message to the MME.

In addition, the controller 2940 may receive a response message corresponding to the request message from the MME.

The controller 2940 that receives the response message may determine whether the second DRX-related third information (the allowed eDRX parameter) is included in the message. The second DRX-related third information (the allowed eDRX parameter) may include information indicating whether the MME supports the second DRX (eDRX), or the second DRX (eDRX) cycle information having to be applied by the UE.

When the response message includes the second DRX-related third information, the controller 2940 may perform an RRC connection release process. The controller 2940 that releases the RRC connection may operate by applying the second DRX (eDRX).

For this, the controller 2940 may derive the second DRX cycle (T') and the first DRX cycle (T) by using the above-described method, and then determine the PHF and the PF. This step may be performed before the RRC connection release.

In addition, when the calculated PHF arrives, the controller 2940 may sequentially receive the MIB and SIB1.

The controller 2940 that receives the system information may identify the systemInfoValueTag or systemInfoValueTagExt value included in the SIB1. The controller 2940 may receive the SIB1 at least once every T', which is the second DRX (eDRX) cycle, and then identify the systemInfoValueTag or systemInfoValueTagExt. In performing the DRX operation according to the second DRX (eDRX) cycle, the controller 2940 may receive the SIB1 closest to the first PF and PO of the PHF determined according to the second DRX (eDRX) cycle in the time domain. Alternatively, the controller 2940 may receive the closest SIB1 among SIB1s occurring after (or before) the first PF and PO of the PHF.

Thereafter, the controller 2940 may determine whether the identified value (of the IEs) and the stored value are different from each other.

If there is no difference, the controller 2940 does not need to update the system information.

On the other hand, if the stored value differs from the identified value, the controller 2940 may receive the system information being currently broadcasted by the eNB.

Meanwhile, if the eNB does not broadcast the second DRX-related first information and the paging-related second parameter (nB'), or if the MME does not transmit the second DRX-related third information (the allowed eDRX parameter), the controller 2940 may perform only the first DRX (typical DRX) process.

Meanwhile, the above operation may be similarly applied to the UE which is in the connected state, and the details are the same as described above. Therefore, a description thereof will is omitted hereinafter.

Figure 30:
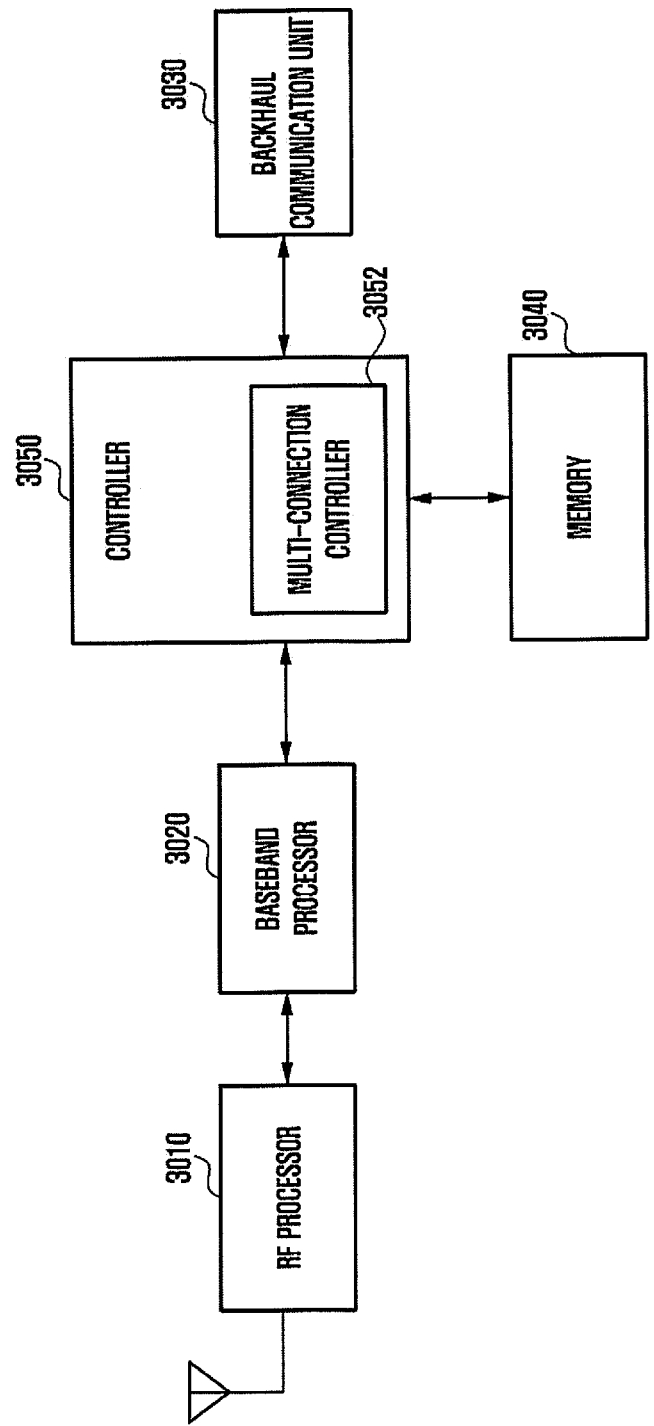
FIG. 30 illustrates a block configuration of eNB according to the present invention.

FIG. 30 illustrates a block configuration of eNB according to the present invention.

As shown in FIG. 30, the eNB may include an RF processor 3010, a baseband processor 3020, a backhaul communication unit 3030, a storage 3040, and a controller 3050.

The RF processor 3010 may perform a function, such as band conversion and amplification of a signal, for transmitting and receiving the signal through a wireless channel. That is, the RF processor 3010 may up-convert a baseband signal provided from the baseband processor 3020 into an RF band signal to transmit the RF band signal through an antenna, and also down-convert an RF band signal received through the antenna into a baseband signal. For example, the RF processor 3010 may include a transmitter filter, a receiver filter, an amplifier, a mixer, an oscillator, a DAC, an ADC, and the like. Although the drawing shows only one antenna, the first access node may have a plurality of antennas. In addition, the RF processor 3010 may include a plurality of RF chains. Further, the RF processor 3010 may perform beamforming. For the beamforming, the RF processor 3010 may adjust the phase and size of signals transmitted and received through a plurality of antennas or antenna elements.

The baseband processor 3020 may perform a conversion function between a baseband signal and a bit stream in accordance with a physical layer standard of the first wireless access technology. For example, in data transmission, the baseband processor 3020 may create complex symbols by encoding and modulating transmission bit streams. Also, in data reception, the baseband processor 3020 may restore reception bit streams by demodulating and decoding a baseband signal provided from the RF processor 3010. In case of complying with OFDM scheme, in data transmission, the baseband processor 3020 may generate complex symbols by encoding and modulating transmission bit streams, map the complex symbols to subcarriers, and construct OFDM symbols through an IFFT operation and a CP insertion. In addition, in data reception, the baseband processor 3020 may divide a baseband signal provided from the RF processor 3010 into OFDM symbol units, restore signals mapped to subcarriers through an FFT operation, and restore reception bit streams through demodulation and decoding. The baseband processor 3020 and the RF processor 3010 may transmit and receive a signal as described above. Thus, the baseband processor 3020 and the RF processor 3010 may be referred to as a transmitting unit, a receiving unit, a transceiver, a communication unit, or a wireless communication unit.

The backhaul communication unit 3030 may provide an interface for performing communication with other node in the network. That is, the backhaul communication unit 3030 may convert a bit stream transmitted from the main eNB to another node, e.g., a sub-eNB, a core network, etc., into a physical signal, and may also convert a physical signal received from such other node into a bit stream.

The storage 3040 may store a basic program for the operation of the main eNB, an application program, and data such as setting information. In particular, the storage 3040 may store information on a bearer allocated to connected UE, a measurement result reported from the connected UE, and the like. In addition, the storage 3040 may store information for determining whether to provide or suspend multiple connections to or from the UE. Also, the storage 3040 may provide the stored data in response to a request of the controller 3050.

The controller 3050 may control overall operations of the main eNB. For example, the controller 3050 may transmit and receive a signal through the baseband processor 3020 and the RF processor 3010 or through the backhaul communication unit 3030. Also, the controller 3050 writes and read data to and from the storage 3040. For this, the controller 3050 may include at least one processor. According to an embodiment of the present invention, the controller 3050 may include a multi-connection controller 3052 for performing control for providing multiple connections to the UE. For example, the controller 3050 may control the eNB to perform the above-described operations and procedures.

Specifically, the controller 3050 may determine whether system information is updated.

If the system information is updated, the controller 3050 may increase systemInfoValueTag and systemInfoValueTagExt by one. Alternatively, the value of systemInfoValueTag may be increased by one, and then, if wraparound occurs, the systemInfoValueTagExt may be increased by one.

Thereafter, the controller 3050 may broadcast the system information (SIB1) including the updated information (IE).

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

What is claimed is:

1. A method performed by a terminal in a wireless communication system, the method comprising:
    receiving, from a base station, first system information including information indicating that an extended discontinuous reception (DRX) mode is allowed in a cell associated with the base station;
    transmitting, to an entity for managing mobility of the terminal, a request message including first information on a first DRX cycle for an operation in the extended DRX mode to enable the extended DRX mode;
    receiving, from the entity, a response message based on the request message;
    identifying whether the response message includes second information on a second DRX cycle for the operation in the extended DRX mode;
    performing the operation in the extended DRX mode based on the second information, in case that the response message includes the second information; and
    performing an operation in a regular DRX mode based on third information on a default cycle, in case that the response message does not include the second information.

2. The method of claim 1, further comprising receiving, from the base station, second system information including the third information on the default cycle.

3. The method of claim 1, further comprising determining whether to request enablement of the extended DRX mode, wherein the request message includes the first information, in case that it is determined to request the enablement of the extended DRX mode.

4. A method performed by a base station in a wireless communication system; the method comprising:

transmitting, to a terminal, first system information including information indicating that an extended discontinuous reception (DRX) mode is allowed in a cell associated with the base station;

receiving, from an entity for managing mobility of the terminal, a paging message;

performing an operation in the extended DRX mode based on first information on a first DRX cycle for the operation in the extended DRX mode, in case that the paging message includes the first information; and performing an operation in a regular DRX mode based on second information on a default cycle, in case that the paging message does not include the first information.

5. The method of claim 4, further comprising transmitting, to the terminal, second system information including the second information on the default cycle.

6. A method performed by an entity for managing mobility of the terminal in a wireless communication system, the method comprising:

receiving, from a terminal, a request message including first information on a first discontinuous reception (DRX) cycle for an operation in an extended DRX mode to enable the extended DRX mode;

determining whether to accept use of the extended DRX mode based on the request message;

transmitting, to the terminal, a response message including second information on a second DRX cycle for the operation in the extended DRX mode, in case that the use of the extended DRX mode is accepted; and transmitting, to the terminal, a response message not including the second information, in case that the use of the extended DRX mode is rejected wherein the request message is generated based on first system information including information indicating that the extended DRX mode is allowed in a cell associated with a base station, wherein a paging message transmitted to the base station includes the second information in case that the use of the extended DRX mode is accepted, and wherein the paging message does not include the second information in case that the use of the extended DRX mode is rejected.

7. A terminal in a wireless communication system, the terminal comprising:

a transceiver; and
a controller configured to:
receive, via the transceiver, from a base station, first system information including information indicating that an extended discontinuous reception (DRX) mode is allowed in a cell associated with the base station, transmit, via the transceiver, to an entity for managing mobility of the terminal, a request message including first information on a first DRX cycle for an operation in the extended DRX mode to enable the extended DRX mode, receive, via the transceiver, from the entity, a response message based on the request message, identify whether the response message includes second information on a second DRX cycle for the operation in the extended DRX mode, perform the operation in the extended DRX mode based on the second information, in case that the response message includes the second information, and perform an operation in a regular DRX mode based on third information on a default cycle, in case that the response message does not include the second information.

8. The terminal of claim 7, wherein the controller is further configured to receive, via the transceiver, from the base station, second system information including the third information on the default cycle.

9. The terminal of claim 7, wherein the controller is further configured to determine whether to request enablement of the extended DRX mode, and wherein the request message includes the first information, in case that it is determined to request the enablement of the extended DRX mode.

10. A base station in a wireless communication system, the base station comprising:

a transceiver; and
a controller configured to:
transmit, via the transceiver, to a terminal, first system information including information indicating that an extended discontinuous reception (DRX) mode is allowed in a cell associated with the base station, receive, via the transceiver, from an entity for managing mobility of the terminal, a paging message, perform an operation in the extended DRX mode based on first information on a first DRX cycle for the operation in the extended DRX mode, in case that the paging message includes the first information, and perform an operation in a regular DRX mode based on second information on a default cycle, in case that the paging message does not include the first information.

11. The base station of claim 10, wherein the controller is further configured to transmit, via the transceiver, to the terminal, second system information including the second information on the default cycle.

12. An entity for managing mobility of a terminal in a wireless communication system, the entity comprising:

a transceiver; and
a controller configured to:
receive, via the transceiver, from the terminal, a request message including first information on a first discontinuous reception (DRX) cycle for an operation in an extended DRX mode to enable the extended DRX mode, determine whether to accept use of the extended DRX mode based on the request message, transmit, via the transceiver, to the terminal, a response message including second information on a second DRX cycle for the operation in the extended DRX mode, in case that the use of the extended DRX mode is accepted, and transmit, via the transceiver, to the terminal, a response message not including the second information, in case that the use of the extended DRX mode is rejected wherein the request message is generated based on first system information including information indicating that the extended DRX mode is allowed in a cell associated with a base station, wherein a paging message transmitted to the base station includes the second information in case that the use of the extended DRX mode is accepted, and wherein the paging message does not include the second information in case that the use of the extended DRX mode is rejected.

* * * * *